(12) United States Patent
Yamanouchi

(10) Patent No.: US 9,787,389 B2
(45) Date of Patent: Oct. 10, 2017

(54) TRANSMISSION DEVICE AND RADIO SIGNAL TRANSMISSION METHOD

(71) Applicant: NEC CORPORATION, Tokyo (JP)

(72) Inventor: Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 14/648,582

(22) PCT Filed: Dec. 2, 2013

(86) PCT No.: PCT/JP2013/082318
§ 371 (c)(1),
(2) Date: May 29, 2015

(87) PCT Pub. No.: WO2014/087956
PCT Pub. Date: Jun. 12, 2014

(65) Prior Publication Data
US 2015/0341080 A1     Nov. 26, 2015

(30) Foreign Application Priority Data

Dec. 7, 2012   (JP) ................................ 2012-268801

(51) Int. Cl.
*H04B 7/12*       (2006.01)
*H04B 1/74*       (2006.01)
(Continued)

(52) U.S. Cl.
CPC ................ *H04B 7/12* (2013.01); *H04B 1/74* (2013.01); *H04B 7/06* (2013.01); *H04B 1/005* (2013.01); *H04B 1/0483* (2013.01); *Y02B 60/50* (2013.01)

(58) Field of Classification Search
None
See application file for complete search history.

(56) References Cited

U.S. PATENT DOCUMENTS

2002/0152039 A1* 10/2002 Fujimoto ............... B62D 5/046
702/36
2003/0112066 A1* 6/2003 Posner ................... H03F 1/3235
330/52

(Continued)

FOREIGN PATENT DOCUMENTS

JP     63-266906 A     11/1988
JP     11-017644 A     1/1999

(Continued)

OTHER PUBLICATIONS

Communication dated Jun. 29, 2016 from the European Patent Office in counterpart Application No. 13861235.3.

(Continued)

*Primary Examiner* — Hassan Phillips
*Assistant Examiner* — Gautam Sharma
(74) *Attorney, Agent, or Firm* — Sughrue Mion, PLLC

(57) ABSTRACT

[Problem] To provide a transmission device that has an enhanced redundant structure in which RF signals having a plurality of frequencies are transmitted to continue transmission even in the event of failure and allows simultaneously both improvement in power efficiency and transmission power and high-speed communication.
[Solution] A signal generator 1102 generates RF signals 1201 to 1204. Each of the RF signals 1201 and 1202 is simultaneously input to a broadband/multiband power amplifier 1103, and each of the RF signals 1203 and 1204 are simultaneously input to a broadband/multiband power amplifier 1104. Specifically, the RF signals allocated in two different bands 1211 and 1212 are simultaneously input to each of the power amplifiers. The RF signals 1201 to 1204 are amplified by the broadband/multiband power amplifiers 1103 and 1104 and then transmitted via terminals 1105 and 1106.

17 Claims, 37 Drawing Sheets

(51) Int. Cl.
  *H04B 7/06* (2006.01)
  *H04B 1/00* (2006.01)
  *H04B 1/04* (2006.01)

(56) References Cited

U.S. PATENT DOCUMENTS

| | | |
|---|---|---|
| 2007/0243899 A1 | 10/2007 | Hermel et al. |
| 2009/0163157 A1 | 6/2009 | Zolfaghari |
| 2012/0177026 A1 | 7/2012 | Uyehara et al. |
| 2012/0182948 A1 | 7/2012 | Huang et al. |

FOREIGN PATENT DOCUMENTS

| | | |
|---|---|---|
| JP | 2000-197096 A | 7/2000 |
| JP | 2003-115793 A | 4/2003 |
| JP | 2003-198493 A | 7/2003 |
| JP | 2004-32450 A | 1/2004 |
| JP | 2006-524975 A | 11/2006 |
| JP | 2007-129422 A | 5/2007 |
| JP | 2007-258768 A | 10/2007 |
| JP | 2008-113202 A | 5/2008 |
| JP | 2009-147589 A | 7/2009 |
| JP | 2010-288067 A | 12/2010 |
| JP | 2012-175542 A | 9/2012 |
| WO | 2009/066200 A2 | 5/2009 |
| WO | 2012093685 A1 | 7/2012 |

OTHER PUBLICATIONS

Paolo Colantonio, et al., "A Design Technique for Concurrent Dual-Band Harmonic Tuned Power Amplifier", IEEE Transactions on Microwave Theory and Techniques, Nov. 2008, pp. 2545-2555, vol. 56, No. 11.

Shouhei Kousai, et al., "An Octave-Range Watt-Level Fully Integrated CMOS Switching Power Mixer Array for Linearization and Back-Off Efficiency Improvement", IEEE Journal of Solid-State Circuits, Feb. 2009, pp. 3376-3392, vol. 44, No. 12.

Paul Saad, et al., "Design of a Highly Efficient 2-4-GHz Octave Bandwidth GaN-HEMT Power Amplifier", IEEE Transactions on Microwave Theory and Techniques, Jul. 2010, pp. 1677-1685, vol. 58, No. 7.

International Search Report for PCT/JP2013/082318 dated Mar. 4, 2014 [PCT/ISA/210].

Written Opinion for PCT/JP2013/082318 dated Mar. 4, 2014 [PCT/ISA/237].

Communication dated Feb. 28, 2017 from the Japanese Patent Office in counterpart Japanese application No. 2013-107103.

\* cited by examiner

TWO BANDS/TWO CARRIER SIGNALS FOR TRANSMISSION

FIG. 3
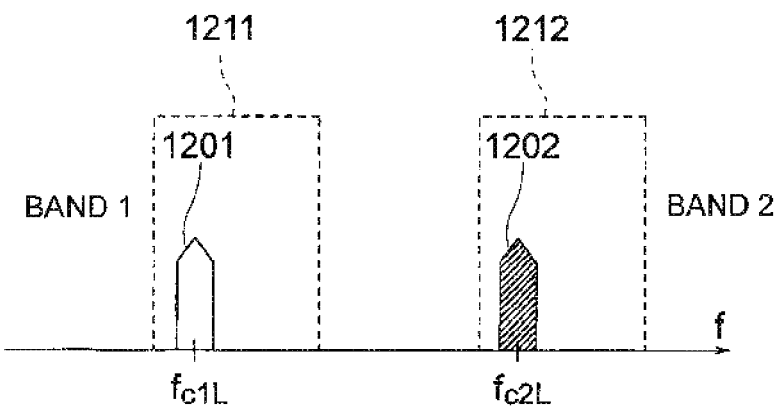
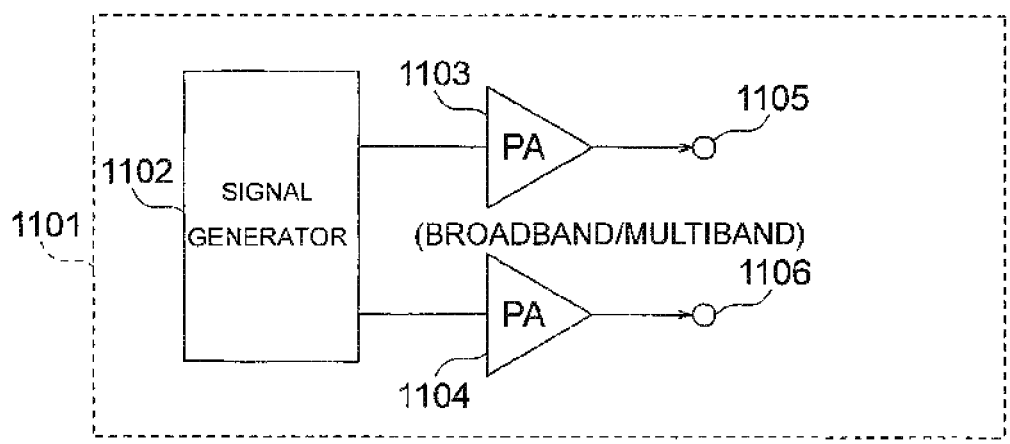
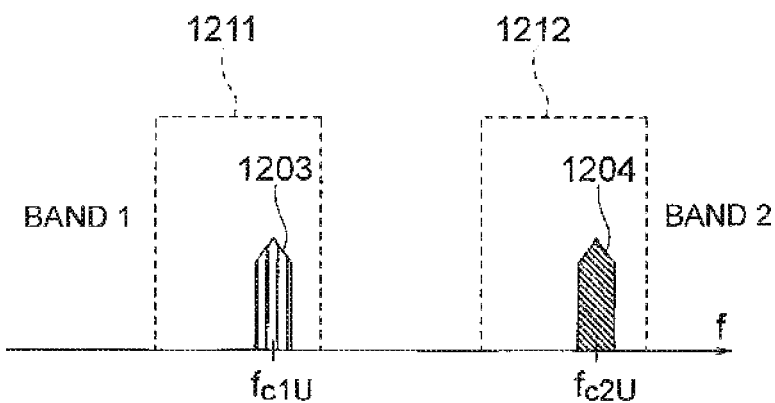

FIG. 4
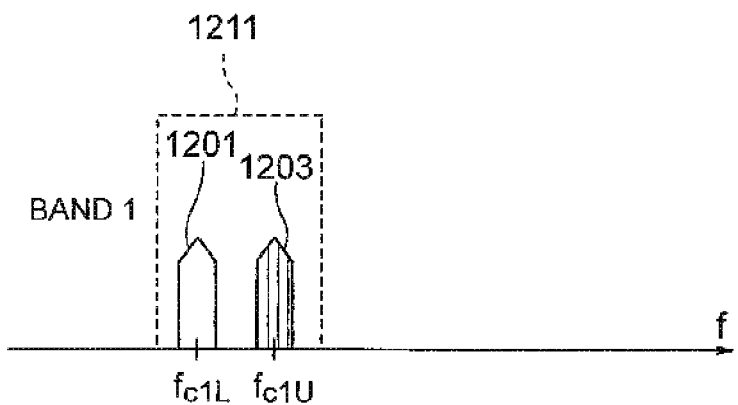
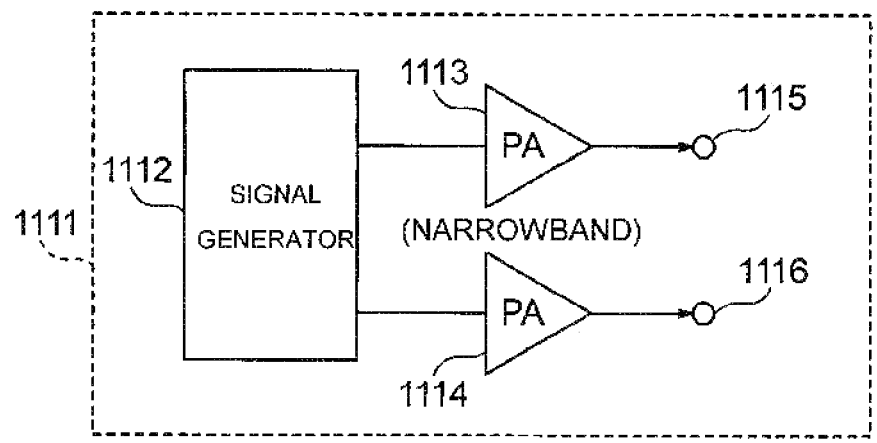
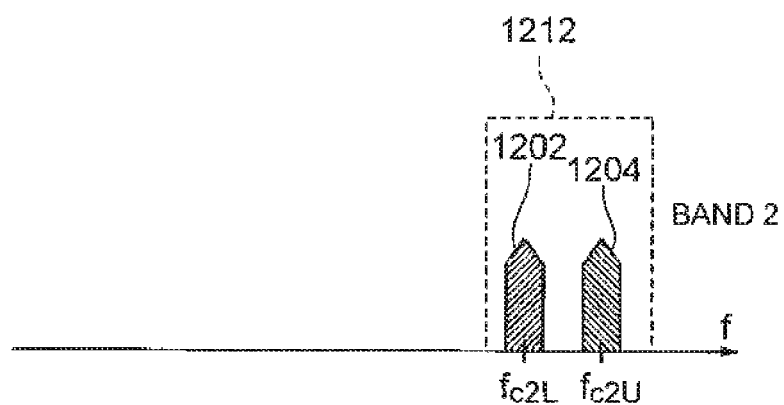

FIG. 5
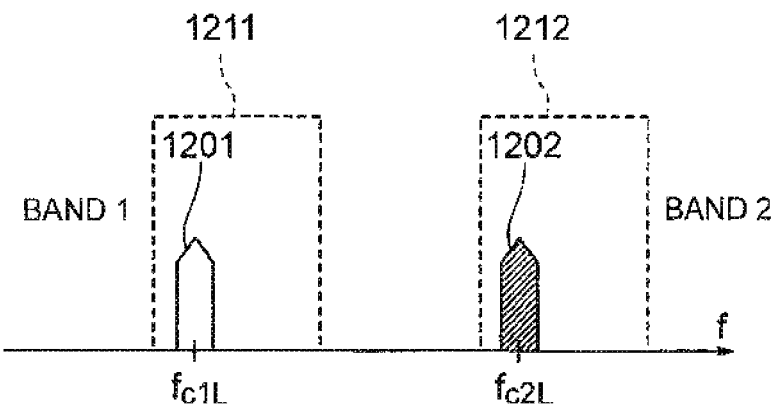
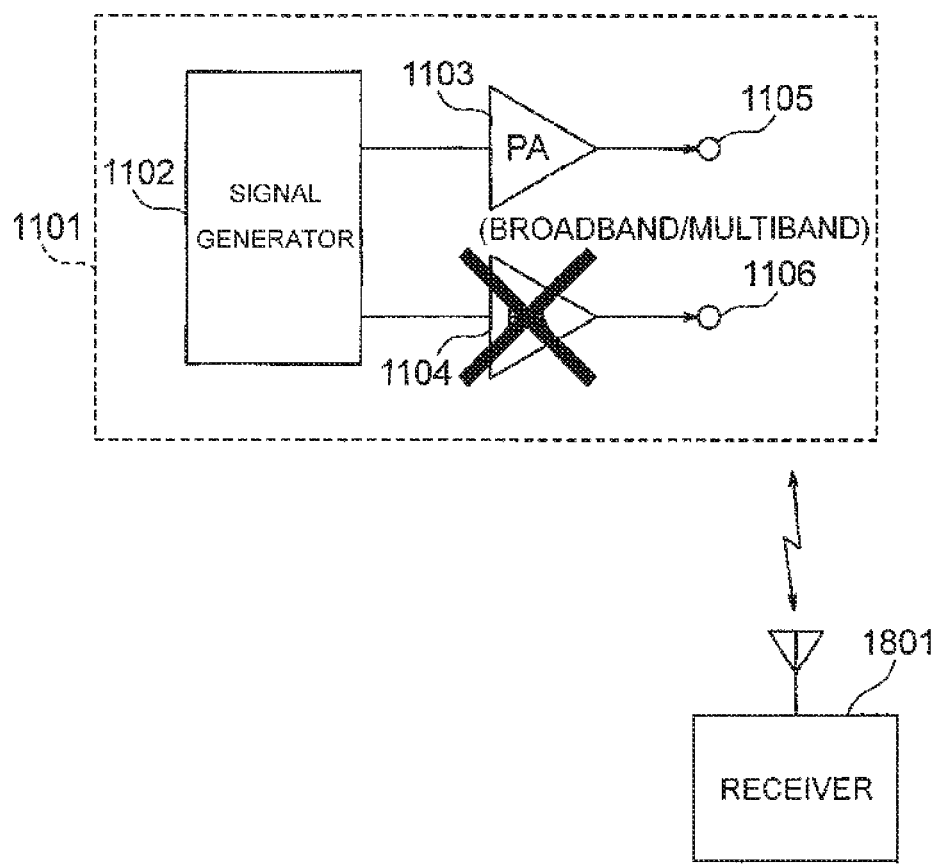

FIG. 6
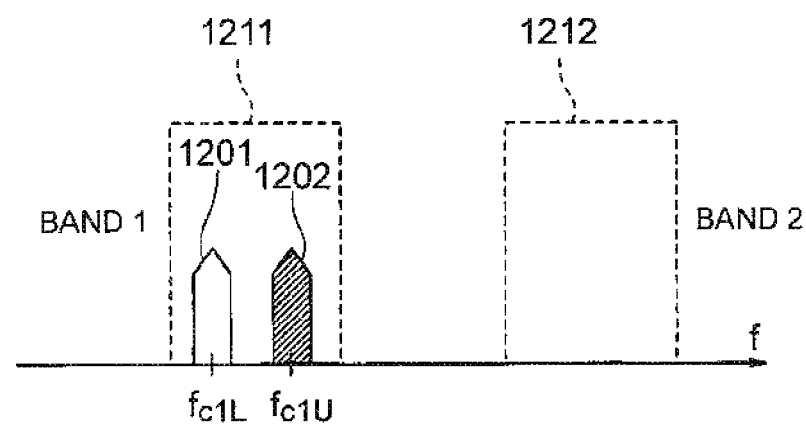
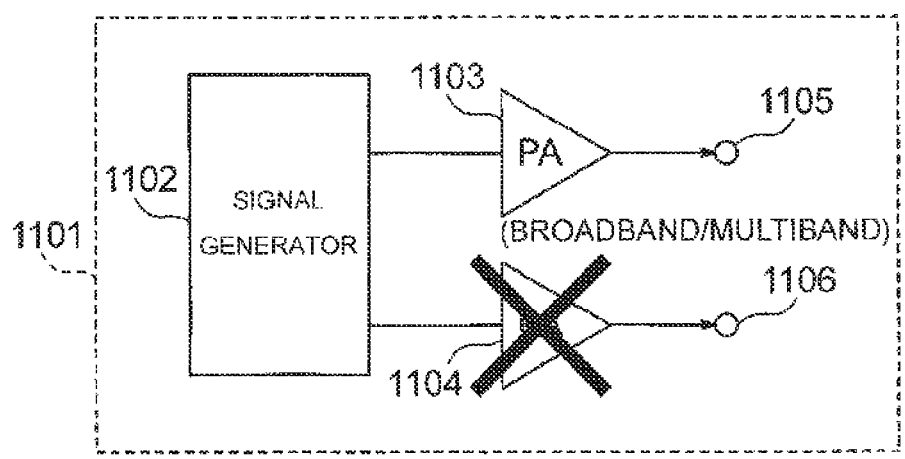

FIG. 7
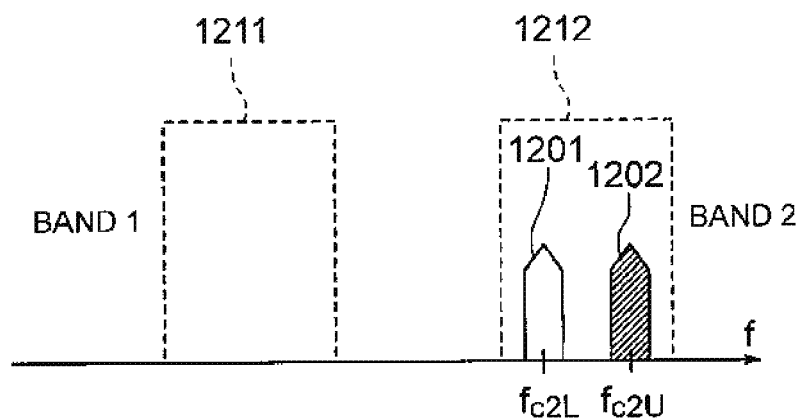
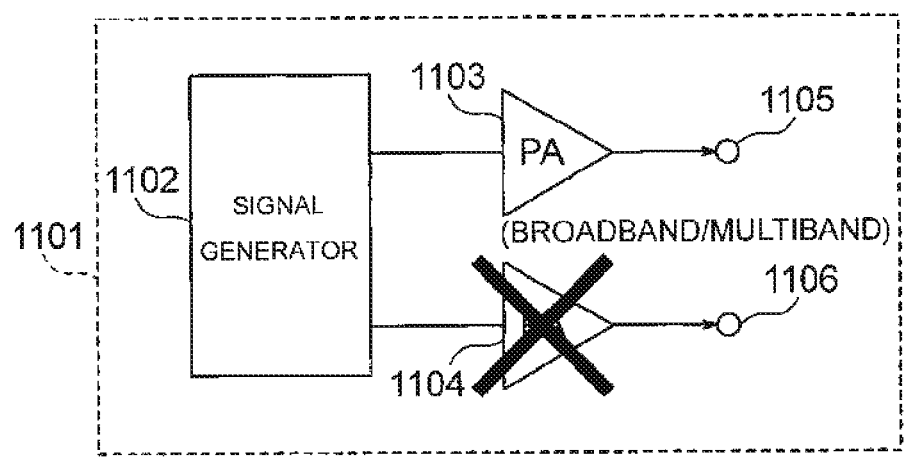

FIG. 9

| | FIRST RELATED ART (FIG. 4) | FIRST EXEMPLARY EMBODIMENT (FIG. 3) | AMOUNT OF IMPROVEMENT |
|---|---|---|---|
| BAND 1 AVERAGE OUTPUT POWER | 43.5dBm | 45.4dBm | +1.9dB |
| BAND 2 AVERAGE OUTPUT POWER | 42.3dBm | 45.7dBm | +3.4dB |
| TOTAL AVERAGE OUTPUT POWER | 46.0dBm | 48.6dBm | +2.6dB |
| WHOLE TRANSMITTER DRAIN EFFICIENCY | 20.6% | 27.3% | 1.33 TIMES |
| WHOLE TRANSMITTER PAE | 19.6% | 25.8% | 1.32 TIMES |
| BAND 1 AVERAGE GAIN | 12.5dB | 12.4dB | -0.1dB |
| BAND 2 AVERAGE GAIN | 13.7dB | 13.1dB | -0.6dB |

US 9,787,389 B2

TRANSMISSION DEVICE AND RADIO SIGNAL TRANSMISSION METHOD

CROSS REFERENCE TO RELATED APPLICATIONS

This application is a National Stage Entry of International Application No. PCT/JP2013/082318 filed Dec. 2, 2013, claiming priority based on Japanese Patent Application No. 2012-268801 filed Dec. 7, 2012, the contents of all of which are incorporated herein by reference in their entirety.

TECHNICAL FIELD

The present invention relates to a transmission device and a radio signal transmission method, and mainly relates to a transmission device and a radio signal transmission method used in radio communication and transmitting RF (Radio Frequency) signals of a plurality of bands.

BACKGROUND ART

Recently, the use of radio communication has become more prevalent. As a result, there is an increasing demand for communications and communication apparatuses that illustrate high performance in terms of many points such as high-speed communication, high level of reliability without disconnection of communication, and power saving in transmission device.

FIG. 33 is a functional structural diagram of a communication apparatus described in PTL 1. The communication apparatus depicted in FIG. 33 includes transmission devices 10A and 10B. The transmission device 10A includes transmitters 21-1A, 21-2A and a transmission mode switcher 22A. The transmission device 10B includes receivers 31-1B, 31-2B and a reception mode switcher 32B. In the communication apparatus of FIG. 33, the transmitter 21-1A has a function of outputting a radio signal having a frequency f1 to the receivers 31-1B and 31-2B. The transmitter 21-2A has a function of outputting a radio signal having a frequency f2 to the receivers 31-1B and 31-2B. In the communication apparatus of FIG. 33, when transmission failure occurs in a path of one of the two frequencies f1 and f2, operation of a transmitter for the frequency can be stopped and communication can be continued at the remaining frequency. For example, when transmission failure occurs at the frequency f1, communication can be continued by using the radio signal having the frequency f2 between the transmitter 21-2A and the receivers 31-1B and 31-2B. In other words, the transmission device achieves highly reliable communication without communication disconnection. In addition, in the communication apparatus of FIG. 33, when there is no transmission failure, a link aggregation function enabling high-speed communication is implemented by performing simultaneous communication at the two frequencies f1 and f2.

FIGS. 34 and 35 are functional structural diagrams of transmission devices described in PTL 2. The transmission device of FIG. 34 includes a baseband transmission signal processing unit 301, frequency converters 302 to 310, synthesizers 312 to 314, and transmission amplifiers 315 to 317. The frequency converters 302 to 304 are integrated into a single frequency conversion apparatus 321, the frequency converters 305 to 307 are integrated into a single frequency conversion apparatus 322, . . . and the frequency converters 308 to 310 are integrated into a single frequency conversion apparatus 323. The transmission device of FIG. 34 has a function of performing transmission to n pieces of sectors (transmission areas). In the transmission device of FIG. 34, a baseband signal transmitted from the baseband transmission signal processing unit 301 is converted into RF signals having frequencies f1 to fm in the frequency converters 302 to 304. The RF signals generated in the frequency converters 302 to 304 are synthesized in the synthesizer 312, then amplified in the transmission amplifier 315, and transmitted to the first sector. The frequency converters 305 to 307, the synthesizer 313, and the transmission amplifier 316 also perform the same processing for transmission to the second sector. In addition, the frequency converters 308 to 310, the synthesizer 314, and the transmission amplifier 317 also perform the same processing for transmission to the n-th sector.

FIG. 35 is a structure obtained by reforming the transmission device of FIG. 34. The transmission device of FIG. 35 is excellent in terms of a redundant structure ready for failure, as will be described below. In the transmission device of FIG. 34, frequency converters for different frequencies are aggregated into frequency conversion devices 321 to 323. In the structure of FIG. 34, there is a problem where when one of the frequency conversion devices 321 to 323 fails, communication becomes completely disconnected in the sector to which the frequency conversion device is assigned. Meanwhile, in the transmission device of FIG. 35, the frequency converters for the same frequency are aggregated into the frequency converters 102 to 104. The other constituent elements are all the same as those of FIG. 34. In the structure of FIG. 35, even when one of the frequency converters 102 to 104 is broken and communications cannot be performed at one frequency, communications in all the sectors are maintained by using another frequency. This technique also achieves highly reliable communication without communication disconnection.

FIGS. 36 and 37 are functional structural diagrams of communication apparatuses described in PTL 3. The communication apparatuses of FIGS. 36 and 37 perform transmission using two radio signals 221 and 222. The communication apparatus of FIG. 36 includes antennas 201 and 202, a duplexer unit 203, a filter unit 204, transmission amplification units 205 and 206, reception amplification units 207 and 208, frequency conversion units 209 and 210, and distribution synthesizers 211 to 215. In the communication apparatus of FIG. 36, the radio signal 221 is output from a Tx terminal of the frequency conversion unit 209 and the radio signal 222 is output from a Tx terminal of the frequency conversion unit 210, respectively. The distribution synthesizer 213 synthesizes the radio signals 221 and 222 output from the frequency conversion units 209 and 210 to generate two carrier signals and output the two carrier signals to the distribution synthesizer 212. The two carrier signals are input to both of the transmission amplification units 205 and 206 via the distribution synthesizer 212. The two carrier signals are amplified in each of the transmission amplification units 205 and 206 and then transmitted through the antenna 201 via the distribution synthesizer 211 and the duplexer unit 203. The structure of FIG. 36 is a redundant structure in which each of the transmission amplification units 205 and 206 amplifies the same two carrier signals. Such a redundant structure allows the continuous transmission of the two carrier signals even when one of the transmission amplification units 205 and 206 fails.

In the communication apparatus of FIG. 37, the distribution synthesizers 211 to 213 and the filter unit 204 are eliminated from the communication apparatus of FIG. 36 and a duplexer unit 401 is newly added. In the communication apparatus of FIG. 37, the radio signal 221 is input to the transmission amplification unit 205 from the Tx terminal of the frequency conversion unit 209. The radio signal 221 is amplified in the transmission amplification unit 205 and then transmitted through the antenna 201 via the duplexer unit 203. In addition, the radio signal 222 is input to the transmission amplification unit 206 from the Tx terminal of the frequency conversion unit 210. The radio signal 222 is amplified in the transmission amplification unit 206 and then transmitted through the antenna 202 via the duplexer unit 401. As described above, the transmission device of FIG. 37 is characterized in that each of the radio signals 221 and 222 as one carrier signal is amplified by respective individual transmission amplification units 205 and 206.

In the transmission amplification units 205 and 206, in order to suppress the occurrence of signal distortion, an average output power of the transmission amplification units 205 and 206 needs to be lower than a saturated output power (in other words, it is necessary to set a backoff amount). Suppression of the average output power of the transmission amplification units 205 and 206 at low level reduces power efficiency of the transmission amplification units 205 and 206, thus hindering power saving.

As compared to the two carrier signals (the synthesized signal of the radio signals 221 and 222) input to the transmission amplification units 205 and 206 of FIG. 36, the each one carrier signal (the individual radio signals 221 and 222) input to the transmission amplification units 205 and 206 of FIG. 37 can suppress a ratio of a signal peak power to an average power (a Peak-to-Average Power Ratio: hereinafter referred to as "PAPR") at lower level. As a result, the communication apparatus of FIG. 37 can more suppress a backoff amount needed to suppress signal distortion, as compared to the communication apparatus of FIG. 36. Thus, the communication apparatus of FIG. 37 can achieve a higher average transmission power and a higher power efficiency than in the communication apparatus of FIG. 36. As the transmission power becomes higher, communication distance can be more extended. In addition, improvement in the power efficiency of the transmission amplification units 205 and 206 leads to power saving of the communication apparatus.

CITATION LIST

Patent Literature

[PTL 1] Japanese Unexamined Patent Application Publication No. 2010-288067
[PTL 2] Japanese Unexamined Patent Application Publication No. 2000-197096
[PTL 3] Japanese Unexamined Patent Application Publication No. 2003-115793
[PTL 4] Japanese Unexamined Patent Application Publication No. 2012-175542
[PTL 5] Japanese Unexamined Patent Application Publication No. S63-266906
[PTL 6] Japanese Unexamined Patent Application Publication No. 2007-129422

Non-Patent Literature

[NPL 1] P. Colantonio, et al., "A Design Technique for Concurrent Dual-Band Harmonic Tuned Power Amplifier," IEEE Transactions on Microwave Theory and Techniques, vol. 56, no. 11, pp. 2545-2555, 2008

[NPL 2] S. Kousai, et al., "An Octave-Range, Watt-Level, Fully-Integrated CMOS Switching Power Mixer Array for Linearization and Back-Off-Efficiency," IEEE Journal of Solid-State Circuits, vol. 44, no. 12, pp. 3376-3392, 2009
[NPL 3] P. Saad, et al., "Design of a Highly Efficient 2-4-GHz Octave Bandwidth GaN-HEMT Power Amplifier," IEEE Transactions on Microwave Theory and Techniques, vol. 58, no. 7, pp. 1677-1685, 2010

SUMMARY OF INVENTION

Technical Problem

The following analysis will be given in the present invention.

In the communication apparatus of FIG. 33 described in PTL 1, there is a problem where when any one of the transmitters 21-1A and 21-2A fails, it is impossible to perform transmission in a band to which the failed transmitter is assigned. For example, when the transmitter 21-1A fails, transmission at the frequency f1 cannot be performed. The communication apparatus of FIG. 33 can perform transmission by selecting an optimum frequency according to temporal variation of a communication state, for example, due to fading or the like. However, when any one of the transmitters 21-1A and 21-2A fails, such a frequency selection cannot be made. Accordingly, in order to enhance communication stability, it is desirable to maintain communication at both frequencies f1 and f2 even when one of the transmitters fails.

In the transmission device of FIG. 34 described in PTL 2, there has been a problem where when any one of the frequency conversion devices 321 and 323 fails, transmission to the corresponding sector cannot be performed. On the other hand, in the transmission device of FIG. 35, even when any one of the frequency converters 102 to 104 fails, transmission to all the sectors can be performed. However, in the transmission device of FIG. 35, there is yet no solution to a problem where failure of any one of the transmission amplifiers 108 to 110 makes it impossible to perform transmission to the corresponding sector. Accordingly, in order to enhance communication stability, it is desirable to allow transmission to a specific sector to be maintained even when any one of the transmission amplifiers fails.

In the communication apparatus of FIG. 36 described in PTL 3, both of the transmission amplification units 205 and 206 amplify the two carrier signals generated by synthesizing the radio signals 221 and 222. In this case, as described in Background Art, the two carrier signals have higher PAPR than the each one carrier signal and thus need a more backoff amount correspondingly. As a result, there is a problem where average output power and power efficiency are reduced as compared to the communication apparatus of FIG. 37. In addition, the communication apparatus of FIG. 36 has the redundant structure in which the transmission amplification units 205 and 206 each amplify the same two carrier signals. In the case of this structure, failure of one of the transmission amplification units 205 and 206 reduces output power, although transmission of the two carrier signals can be continued. Reduction in the output power reduces the communication distance of the communication apparatus. Consequently, while communication with a user close to the communication apparatus can be performed, it is impossible to communicate with a user distant from the communication apparatus. Such a communication disconnection significantly damages user experience.

In the communication apparatus of FIG. 37 described in PTL 3, there is a problem where when one of the transmission amplification units 205 and 206 fails, transmission cannot be performed in a band to which the transmission amplification unit is assigned. This problem is common to the technique described in PTL 1, as well as to techniques described in PTL 4 to 6.

Solution to Problem

A transmission device according to an aspect of the present invention includes a signal generator for converting baseband signals of a plurality of channels into a plurality of RF signals allocated in a plurality of discrete bands to output the RF signals and the same number of power amplifiers as the number of the bands, the transmission device being mainly characterized in that at least one of the power amplifiers simultaneously amplifies a plurality of RF signals allocated in at least two different bands among the bands, and the transmission device performs transmission by simultaneously using the plurality of RF signals belonging to the plurality of discrete bands.

In addition to the above, the transmission device may be configured such that the signal generator includes a failure detector for detecting the presence or absence of failure of the power amplifiers, and when the failure detector detects failure of one of the power amplifiers, the failure detector controls the signal generator so as to stop the output of the RF signals to the power amplifier.

Alternatively, the transmission device may be configured such that when the failure detector detects failure of one of the power amplifiers, the failure detector controls the signal generator so as to output the RF signals of the plurality of bands to a power amplifier that is not in failure (a non-failing power amplifier) in the power amplifiers; the non-failing power amplifier amplifies the RF signals and then transmits the amplified RF signals; and the signal generator receives a reception state notification from a reception apparatus that has received the RF signals transmitted from the transmission device, and, based on the notification, selects a band in a best communication state (a best band) to switch frequencies of the RF signals to be input to the non-failing power amplifier to frequencies belonging to the best band.

Advantageous Effects of Invention

In the transmission device and the radio signal transmission method according to the present invention, the structure in which the plurality of power amplifiers amplify the RF signals allocated in the plurality of bands can provide advantageous effects that even when one of the power amplifiers fails, transmission can be continued by the RF signals allocated in the plurality of bands or the number of the bands usable for communication is not reduced, and also even when one of the power amplifiers fails, communication can be performed by selecting a band that allows a best communication from the plurality of bands. Furthermore, even when one of the power amplifiers fails, a transmission power of the RF signals per channel does not change. Thus, there can be obtained an advantageous effect that communication distance is not reduced, allowing the continuation of communication with a user distant from the transmission device. In addition, according to the present invention, there can be obtained an advantageous effect that each power amplifier can be assigned to the same sector, so that even when one of the power amplifiers fails, communication in the sector is not disconnected. Additionally, the structure of the transmission device described above can provide an advantageous effect that even when the number of the RF signals to be transmitted is increased, the PAPR does not increase, and thus both high-speed communication and improvement in output power and power efficiency can be simultaneously achieved.

BRIEF DESCRIPTION OF DRAWINGS

FIG. 3 A block structural diagram illustrating a transmission device of a first exemplary embodiment FIG. 4 A block structural diagram illustrating a transmission device of a first related art;

FIG. 5 A block structural diagram illustrating an example of operation in a case of failure of one of broadband/multiband power amplifiers in the transmission device of the first exemplary embodiment FIG. 6 A block structural diagram illustrating an example of operation in a case of failure of one of the broadband/multiband power amplifiers in the transmission device of the first exemplary embodiment FIG. 7 A block structural diagram illustrating an example of operation in a case of failure of one of the broadband/multiband power amplifiers in the transmission device of the first exemplary embodiment FIG. 8 A block structural diagram illustrating an example of operation in a case of failure of one of narrowband power amplifiers in the transmission device of the first related art FIG. 9 A table illustrating results of measurements and comparison of actual characteristics of the power amplifiers in the transmission device of the first related art and the transmission device of the first exemplary embodiment FIG. 10 A block structural diagram illustrating a transmission device of a second exemplary embodiment FIG. 11 A block structural diagram illustrating an example of operation in a case of failure of one of the broadband/multiband power amplifiers in the transmission device of the second exemplary embodiment FIG. 12 A block structural diagram illustrating an example of operation in a case of failure of one of the broadband/multiband power amplifiers in the transmission device of the second exemplary embodiment FIG. 13 A block structural diagram illustrating an example of operation in a case of failure of one of the broadband/multiband power amplifiers in the transmission device of the second exemplary embodiment FIG. 14 A block structural diagram illustrating a transmission device of a third exemplary embodiment FIG. 15 A block structural diagram illustrating an example of operation in a case of failure of one of broadband/multiband power amplifiers in the transmission device of the third exemplary embodiment FIG. 16 A block structural diagram illustrating an example of operation in a case of failure of one of the broadband/multiband power amplifiers in the transmission device of the third exemplary embodiment FIG. 17 A block structural diagram illustrating an example of operation in a case of failure of one of the broadband/multiband power amplifiers in the transmission device of the third exemplary embodiment FIG. 18 A block structural diagram illustrating a transmission device of a fourth exemplary embodiment FIG. 19 A block structural diagram illustrating an example of operation in a case of failure of one of broadband/multiband power amplifiers in the transmission device of the fourth exemplary embodiment FIG. 20 A block structural diagram illustrating an example of operation in a case of failure of one of the broadband/multiband power amplifiers in the transmission device of the fourth exemplary embodiment FIG. 21 A block structural diagram illustrating an example of operation in a case of failure of one of the broadband/multiband power amplifiers in the transmission device of the fourth exemplary embodiment FIG. 22 A block structural diagram illustrating a transmission device of a fifth exemplary embodiment FIG. 23 A block structural diagram illustrating an example of operation in a case of failure of one of broadband/multiband power amplifiers in the transmission device of the fifth exemplary embodiment FIG. 24 A block structural diagram illustrating an example of operation in a case of failure of one of the broadband/multiband power amplifiers in the transmission device of the fifth exemplary embodiment FIG. 25 A block structural diagram illustrating an example of operation in a case of failure of one of the broadband/multiband power amplifiers in the transmission device of the fifth exemplary embodiment FIG. 26 A block structural diagram illustrating a transmission device of a sixth exemplary embodiment FIG. 27 A block structural diagram illustrating an inner structure of a baseband unit in the transmission device of the sixth exemplary embodiment FIG. 28 A block structural diagram illustrating inner structures of remote radio units in the transmission device of the sixth exemplary embodiment FIG. 29 A block structural diagram illustrating a transmission device of a seventh exemplary embodiment FIG. 30 A block structural diagram illustrating an example of operation in a case of failure of one of remote radio units in the transmission device of the seventh exemplary embodiment FIG. 31 A block structural diagram illustrating an example of operation in a case of failure of one of the remote radio units in the transmission device of the seventh exemplary embodiment FIG. 32 A block structural diagram illustrating an example of operation in a case of failure of one of the remote radio units in the transmission device of the seventh exemplary embodiment FIG. 33 A block structural diagram illustrating a communication apparatus described in PTL 1

DESCRIPTION OF EMBODIMENTS

Figure 1:
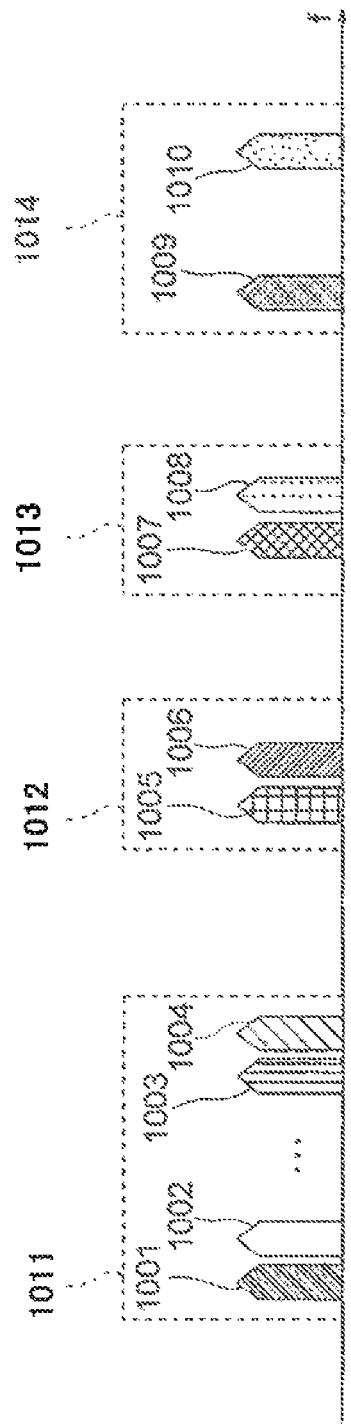
FIG. 1 A conceptual diagram illustrating the allocation of bands

Hereinafter, a description will be given of preferred exemplary embodiments of a transmission device and a radio signal transmission method according to the present invention with reference to the accompanying drawings. In each of the drawings illustrated below, the same or corresponding parts are denoted by the same reference signs, and a description thereof will not be repeated.

(Features of the Present Invention)

Before describing exemplary embodiments of the present invention, first, a summary of features of the present invention will be described. The present invention is mainly characterized by providing a transmission device that can improve network reliability and can achieve power saving by simultaneously transmission of signals having a plurality of frequencies generated by a signal generator and an enhanced redundant structure as compared to related art and the like.

In other words, the present invention is a transmission device that includes a signal generator for converting baseband signals of a plurality of channels into a plurality of RF signals allocated in a plurality of discrete bands and the same number of power amplifiers as the number of the bands, the transmission device being mainly characterized in that at least one of the power amplifiers simultaneously amplifies a plurality of RF signals allocated in at least two different bands among the bands, and the transmission device performs transmission by simultaneously using the plurality of RF signals belonging to the plurality of discrete bands.

Herein, the signal generator may include a failure detector for detecting the presence or absence of failure of the power amplifiers, and when the failure detector detects failure of one of the power amplifiers, the failure detector may control the signal generator so as to stop input of the RF signals to the power amplifier.

Alternatively, when the failure detector detects failure of one of the power amplifiers, the failure detector may control the signal generator so as to input the plurality of RF signals of the plurality of bands to a power amplifier that is not in failure (a non-failing power amplifier) in the power amplifiers; the non-failing power amplifier may amplify the RF signals and then transmit the amplified RF signals; and the signal generator may receive a reception state notification from a reception apparatus that has received the RF signals transmitted from the transmission device and select, based on the notification, a band in a best communication state (a best band) to switch frequencies of the RF signals to be input to the non-failing power amplifier to frequencies belonging to the best band.

Thus, in the present invention, there can be obtained advantageous effects that even when one of the power amplifiers fails, the structure in which the plurality of power amplifiers amplify the RF signals allocated in the plurality of bands allows the continuation of communication by the RF signals allocated in the plurality of bands; the number of the bands usable for communication is not reduced, and communication can be performed by selecting a band that allows good communication from the plurality of bands. Furthermore, even when one of the power amplifiers fails, transmission power of the RF signals per channel does not change. Thus, there can be obtained an advantageous effect that communication distance is not reduced and thereby communication with a user distant from the transmission device can be continued. In addition, according to the present invention, there can be obtained an advantageous effect that each power amplifier can be assigned to the same sector, and thus, even when one of the power amplifiers fails, communication in the sector is not disconnected. In addition, the structure of the transmission device described above can provide an advantageous effect that even when the number of the RF signals to be transmitted is increased, PAPR does not increase, so that both high-speed communication and improvement in power efficiency can be achieved simultaneously.

First Exemplary Embodiment

The present invention relates to a transmitter that transmits RF signals of a plurality of channels (carrier frequencies) allocated in a plurality of bands. First, a description will be given of concepts of band and channel (carrier frequency).

FIG. 1 is a conceptual diagram illustrating the allocation of bands. As illustrated in FIG. 1, in general, a band usable for each application is allocated. For example, a band 1011 is allocated for an application A; bands 1012 and 1013 are allocated for an application B; and a band 1014 is allocated for an application C. With regard to this example, a single band is allocated to a single application, as in the applications A and C, or, as in the application B, a plurality of separate bands are allocated to a single application. In a specific example, a band of 470 to 770 MHz is allocated to a terrestrial digital broadcasting as one application. In addition, a plurality of bands separated into 2110 to 2170 MHz, 1930 to 1990 MHz, 1805 to 1880 MHz, and the like are allocated to a downlink of 3GPP (mobile phone) as another application. As described above, an interval of continuous frequencies allocated to one application is referred to as "band" in the present specification.

In addition, a single band includes RF signals (channels) having a plurality of carrier frequencies, and communication is performed by the RF signals. For example, in the case of FIG. 1, the band 1011 includes RF signals 1001 to 1004; the band 1012 includes RF signals 1005 and 1006; the band 1013 includes RF signals 1007 and 1008; and the band 1014 includes RF signals 1009 and 1010, respectively. In a specific example, a band of 6 MHz per channel is allocated to the terrestrial digital broadcasting, and there are 50 channels in the band of 470 to 770 MHz. In addition, in the case of the 3GPP (mobile phone), a band of 5 MHz per channel is allocated and 12 channels (RF signals having 12 carrier frequencies) are assignable in the band of 2110 to 2170 MHz. While the terrestrial digital broadcasting and the 3GPP (mobile phone) have been mentioned as the specific examples of applications, the applicable range of the first exemplary embodiment is not limited to the above applications.

Figure 2:
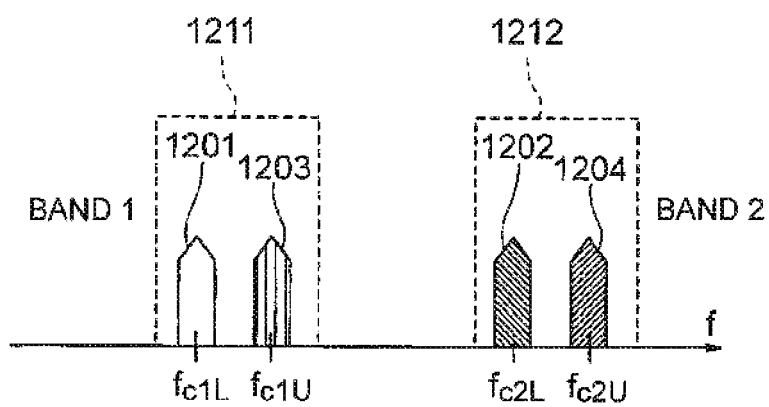
FIG. 2 A conceptual diagram illustrating the allocation of bands

The present first exemplary embodiment will describe, as illustrated in FIG. 2, one exemplary case in which there are two bands 1211 and 1212, the band 1211 including RF signals 1201 and 1203 at two carrier frequencies and the band 1212 including RF signals 1202 and 1204 at two carrier frequencies. As indicated in FIG. 2, the carrier frequencies of the RF signals 1201 to 1204 are different from one another in that the RF signal 1201 is at a frequency $f_{c1L}$, the RF signal 1203 is at a frequency $f_{c1U}$, the RF signal 1202 is at a frequency $f_{c2L}$, and the RF signal 1204 is at a frequency $f_{c2U}$.

FIG. 3 is a block structural diagram illustrating a transmission device 1101 of the present first exemplary embodiment. The transmission device 1101 of the present first exemplary embodiment is configured by including a signal generator 1102, broadband/multiband power amplifiers 1103 and 1104, and terminals 1105 and 1106. The signal generator 1102 generates the RF signals 1201 to 1204. The present invention is characterized in that a plurality of RF signals allocated in at least two different bands in a plurality of bands are simultaneously input to at least one of a plurality of broadband/multiband power amplifiers provided in a transmission device. For example, in the transmission device 1101 of the present first exemplary embodiment, the RF signals 1201 and 1202 allocated in the two different bands 1211 and 1212 are simultaneously input to the broadband/multiband power amplifier 1103, and the RF signals 1203 and 1204 allocated in the two different bands 1211 and 1212 are simultaneously input to the broadband/multiband power amplifier 1104. The RF signals 1201 and 1202 are amplified by the broadband/multiband power amplifier 1103 and then output to the terminal 1105. The RF signals 1203 and 1204 are amplified by the broadband/multiband power amplifier 1104 and then output to the terminal 1106. With the above operation, the transmission device 1101 transmits, from among the RF signals 1201 to 1204 illustrated in FIG. 2, the RF signals 1201 and 1202 via the terminal 1105 and the RF signals 1203 and 1204 via the terminal 1106.

As already described, the present invention is characterized in that a plurality of RF signals allocated in at least two different bands among the plurality of bands are simultaneously input to at least one of the plurality of broadband/multiband power amplifiers provided in the transmission device. Accordingly, as long as this condition is satisfied, the allocation of the frequencies of the RF signals may be an allocation other than that of FIG. 3. For example, the broadband/multiband power amplifier 1103 may amplify the RF signal 1203 (carrier frequency $f_{c1U}$) and the RF signal 1202 (carrier frequency $f_{c2L}$), and the broadband/multiband power amplifier 1104 may amplify the RF signal 1201 (carrier frequency $f_{c1L}$) and the RF signal 1204 (carrier frequency $f_{c2U}$). Alternatively, the broadband/multiband power amplifier 1103 may amplify the RF signal 1201 (carrier frequency $f_{c1L}$) and the RF signal 1204 (carrier frequency $f_{c2U}$), and the broadband/multiband power amplifier 1104 may amplify the RF signal 1203 (carrier frequency $f_{c1U}$) and the RF signal 1202 (carrier frequency $f_{c2L}$).

The broadband/multiband power amplifiers 1103 and 1104 need to be capable of amplifying the RF signals with the frequencies of at least the bands 1211 and 1212. Thus, the broadband/multiband power amplifiers 1103 and 1104 may be power amplifiers whose input/output impedance matching has been designed at two or more frequencies, as disclosed in the NPL 1. Alternatively, the broadband/multiband power amplifiers 1103 and 1104 may be power amplifiers for such a broadband that covers a frequency range of from a lower limit frequency of the band 1211 to an upper limit frequency of the band 1212. A structure of a power amplifier for such a broadband is disclosed in, for example, the NPL 2 or 3.

In order to facilitate the understanding of the transmission device 1101 of the first exemplary embodiment, there is illustrated a transmission device 1111 of the first related art of FIG. 4 as a comparative subject. The transmission device 1111 of the first related art of FIG. 4 is configured by including a signal generator 1112, narrowband power amplifiers 1113 and 1114, and terminals 1115 and 1116. The signal generator 1112 generates RF signals 1201 to 1204. The transmission device 1111 of the first related art of FIG. 4 is characterized in that only RF signals allocated in a single band are input to each of the narrowband power amplifiers. For example, the RF signals 1201 and 1203 allocated in the band 1211 are input to the narrowband power amplifier 1113, and the RF signals 1202 and 1204 allocated in the band 1212 are input to the narrowband power amplifier 1114. The RF signals 1201 and 1203 allocated in the band 1211 are amplified by the narrowband power amplifier 1113 and then transmitted via the terminal 1115. The RF signals 1202 and 1204 allocated in the band 1212 are amplified by the narrowband power amplifier 1114 and then transmitted via the terminal 1116.

It is enough for the narrowband power amplifier 1113 to have a function of amplifying only the frequencies of the band 1211, and it is enough for the narrowband power amplifier 1114 to have a function of amplifying only the frequencies of the band 1212.

Figure 33:
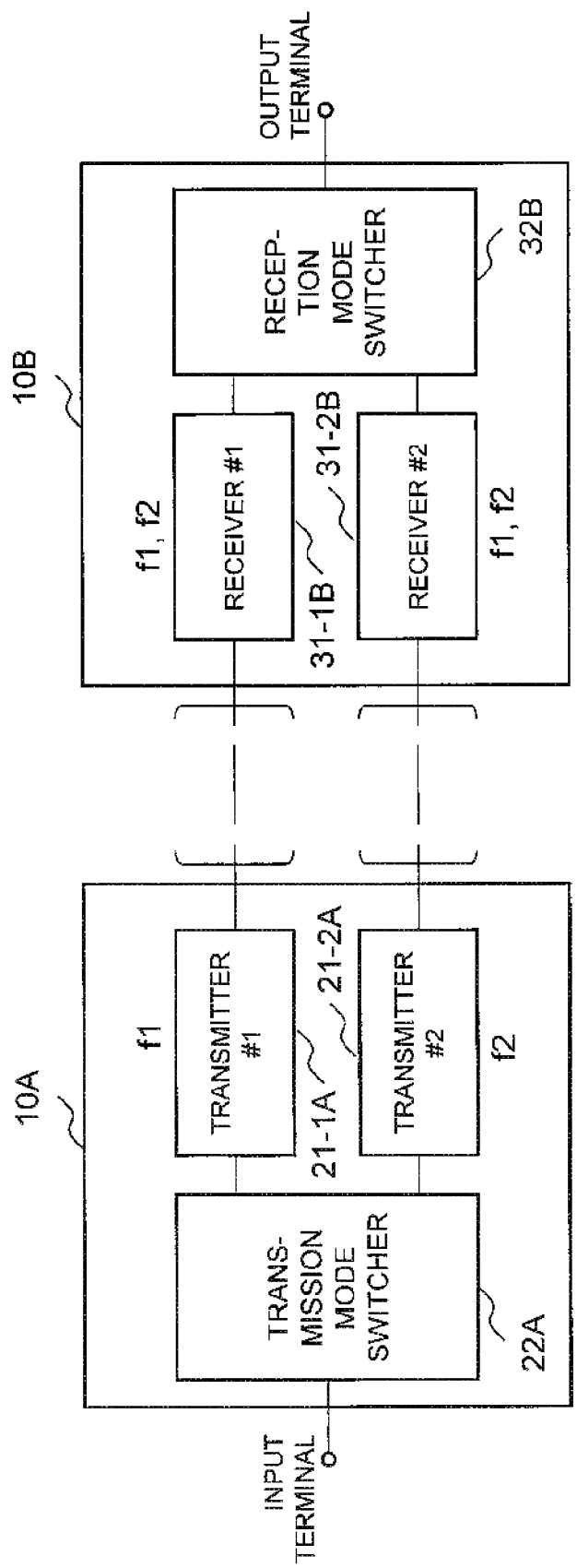

The transmission device 1111 of the first related art of FIG. 4 corresponds to, for example, the transmission device 10A of FIG. 33. A center frequency of the band 1211 of FIG. 4 corresponds to the transmission frequency f1 of the transmitter 21-1A in the transmission device 10A of FIG. 33, and a center frequency of the band 1212 of FIG. 4 corresponds to the transmission frequency f2 of the transmitter 21-2A in the transmission device 10A of FIG. 33.

Comparing the first exemplary embodiment of FIG. 3 with the first related art of FIG. 4 makes it understandable that the present invention is characterized, as already described, by the frequency allocation of the RF signals to be input to the power amplifiers, i.e., characterized in that a plurality of RF signals allocated in at least two different bands among the plurality of bands are simultaneously input to at least one of the plurality of broadband/multiband power amplifiers provided in the transmission device 1101.

Hereinafter, a description will be given of advantages of the transmission device 1101 of the first exemplary embodiment illustrated in FIG. 3 against the first related art of FIG. 4 and the techniques described in PTL 1 to PTL 3.

One of the advantages of the transmission device 1101 according to the first exemplary embodiment of FIG. 3 is that redundancy prepared for failure is more enhanced than in the methods of the first related art and the others.

FIGS. 5 to 7 are conceptual diagrams each illustrating an example of a case of failure of the broadband/multiband power amplifier 1104 in the transmission device 1101. As illustrated in FIG. 5, even when the broadband/multiband power amplifier 1104 fails, communication by the RF signal 1201 allocated in the band 1211 and the RF signal 1202 allocated in the band 1212 can be continued using the broadband/multiband power amplifier 1103 that is not in failure. In other words, according to the present first exemplary embodiment, even when one of the broadband/multiband power amplifiers fails, communication by the RF signals allocated in the plurality of bands can be continued using the non-failing broadband/multiband power amplifier. Alternatively, it can be said that even when one of the broadband/multiband power amplifiers fails, the number of the bands usable for communication is not reduced.

Furthermore, as illustrated in FIG. 6, communication can also be performed in a state where the RF signals 1201 and 1202 are allocated in the band 1211. Alternatively, as illustrated in FIG. 7, communication can also be performed in a state where the RF signals 1201 and 1202 are allocated in the band 1212. In other words, as illustrated in FIGS. 6 and 7, in the present first exemplary embodiment, even when one of the broadband/multiband power amplifiers fails, a band allowing good communication can be selected from the plurality of bands by using the non-failing broadband/multiband power amplifier and used for communication. When a band suitable for communication varies with time due to fading or the like, a band to be used for communication may be switched according to the variation.

The suitable band may be selected as follows. First, the transmission device 1101 transmits the RF signal 1201 allocated in the band 1211 and the RF signal 1202 allocated in the band 1212 to a reception apparatus 1801, as illustrated in FIG. 5. The reception apparatus 1801 compares radio wave intensities of the received RF signals 1201, 1202 and returns intensity information of the RF signals 1201 and 1202 to the transmission device 1101. The transmission device 1101 selects a band with strong radio wave intensity from the bands 1211 and 1212 on the basis of the returned intensity information of the RF signals 1201 and 1202 to switch to communication using the selected band, as illustrated in FIG. 6 and FIG. 7. More specific and detailed structures, and operations regarding FIG. 5 to FIG. 7 will be described in a second exemplary embodiment and thereafter.

Figure 8:
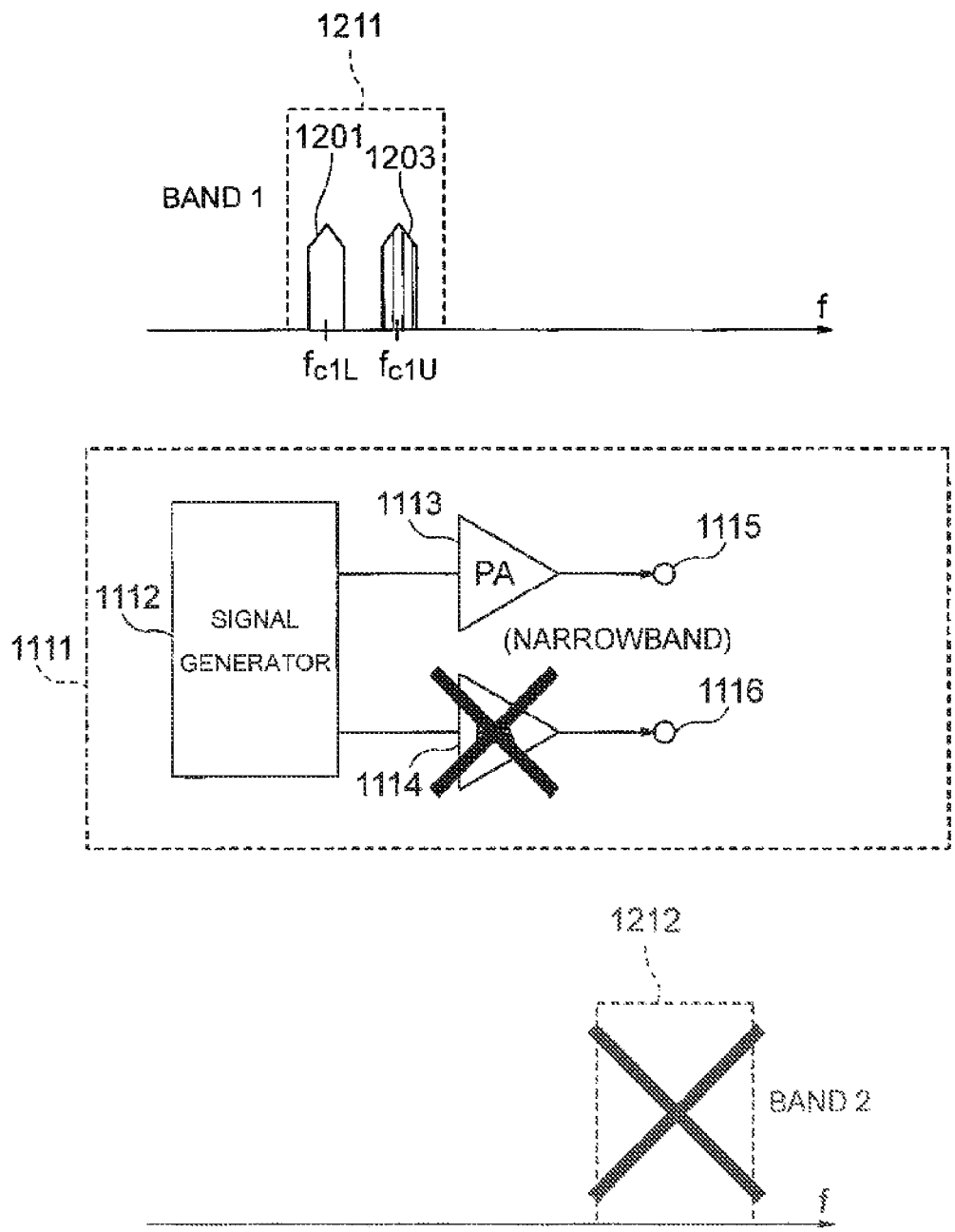

FIG. 8 is a conceptual diagram illustrating an example of a case of failure of the narrowband power amplifier 1114 in the transmission device 1111 of the first related art of FIG. 4. As illustrated in FIG. 8, when the narrowband power amplifier 1114 in the transmission device 1111 of the first related art fails, it is impossible to communicate in the band 1212 to which the narrowband power amplifier 1114 is assigned. In other words, the first related art of FIGS. 4 and 8 cannot provide the functions obtained in the present first exemplary embodiment, such as that "even when one of the power amplifiers fails, communication can be continued by the RF signals allocated in the plurality of bands or the number of the bands usable for communication is not reduced." and "even when one of the power amplifiers fails, a band allowing good communication can be selected from the plurality of bands and used for communication." This is one of the advantages of the transmission device 1101 of the present first exemplary embodiment.

Figure 37:
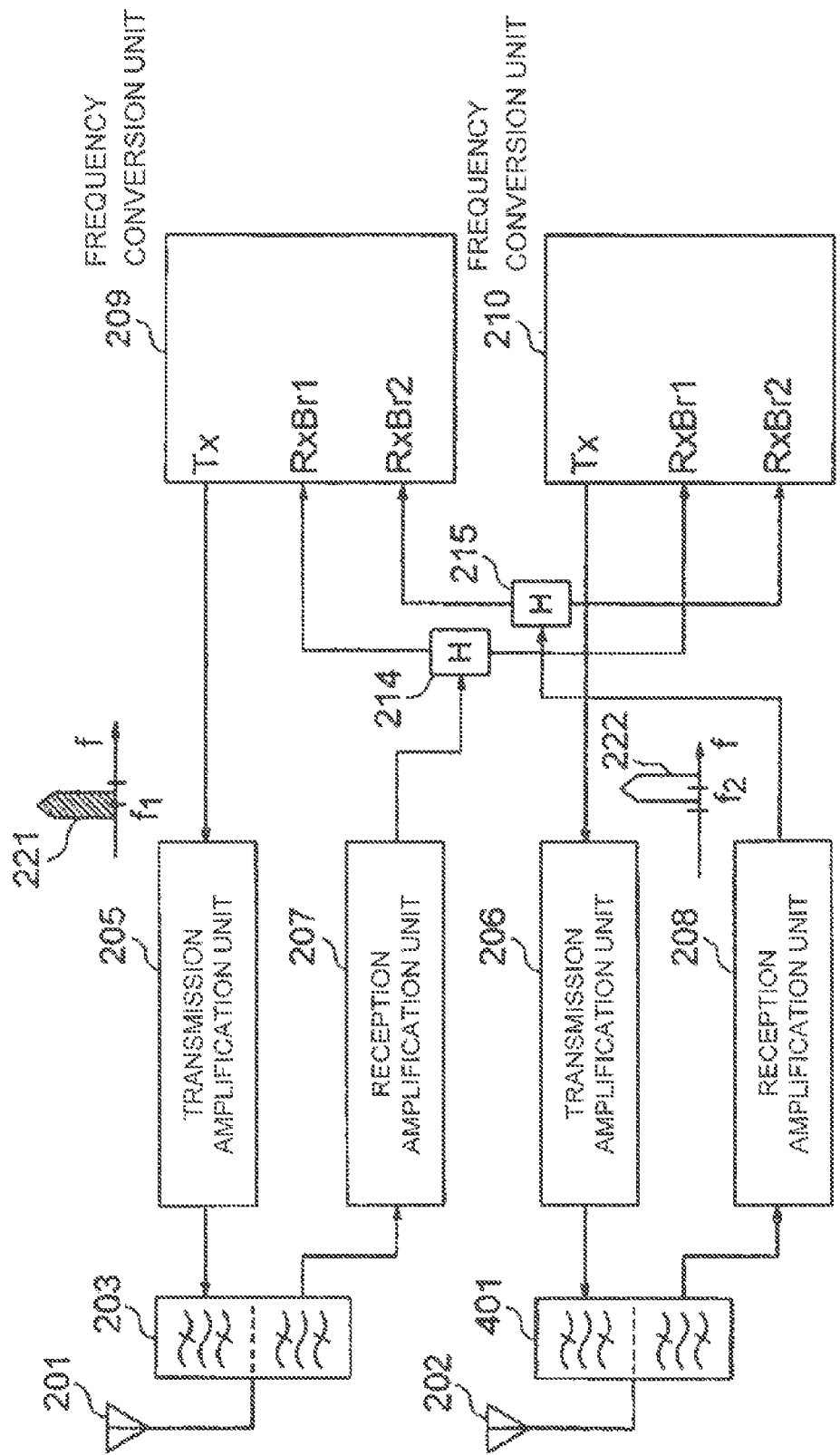
FIG. 37 A block structural diagram illustrating a communication apparatus described in PTL 3

Meanwhile, the problem of the first related art of FIGS. 4 and 8, i.e. the problem where when one of the power amplifiers or the transmitters fails, communication cannot be performed in the band to which the power amplifier or transmitter is assigned, is common also to the technique of FIG. 33 described in PTL 1 and the technique of FIG. 37 described in PTL 3.

Figure 34:
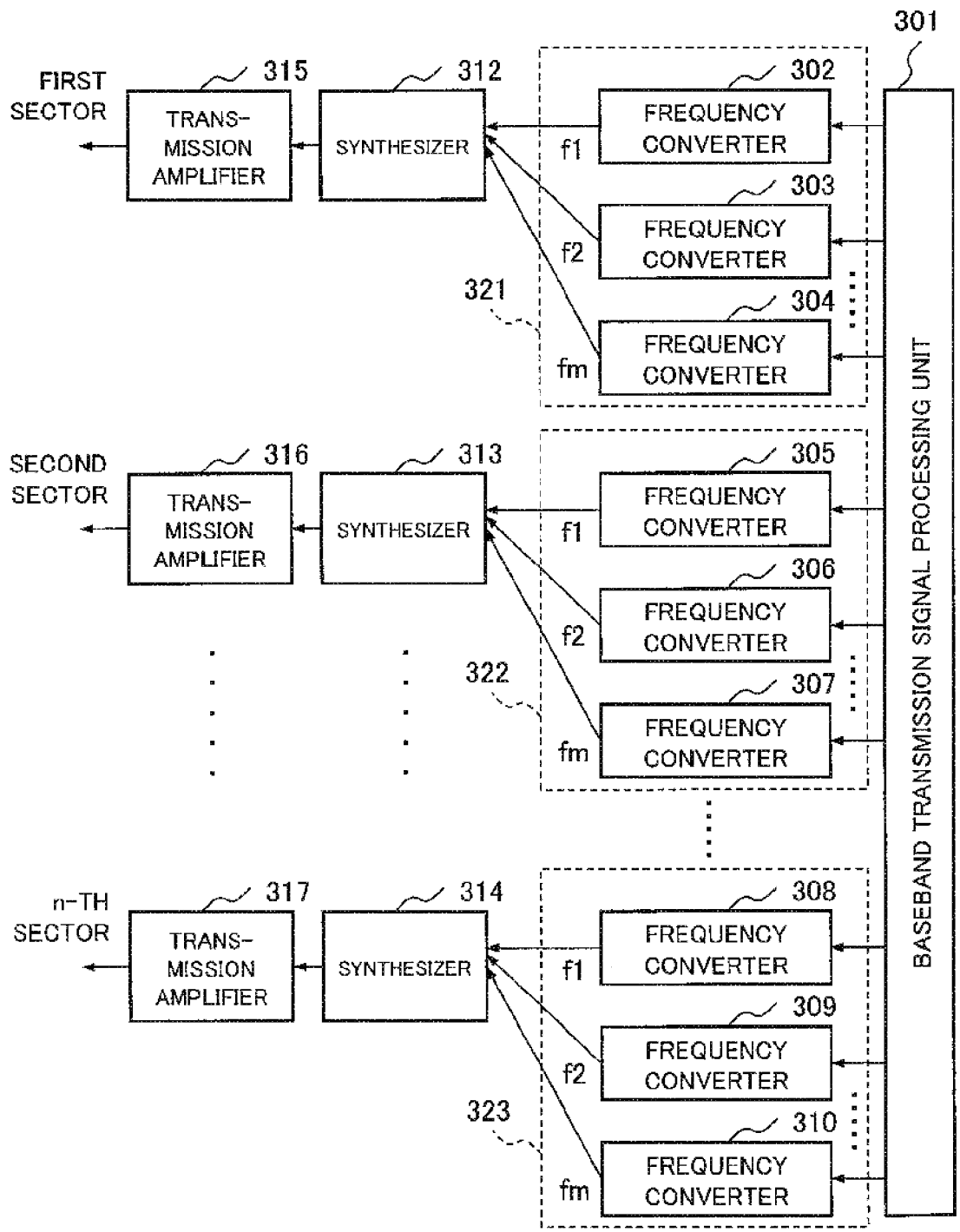
FIG. 34 A block structural diagram illustrating a transmission device described in PTL 2
Figure 35:
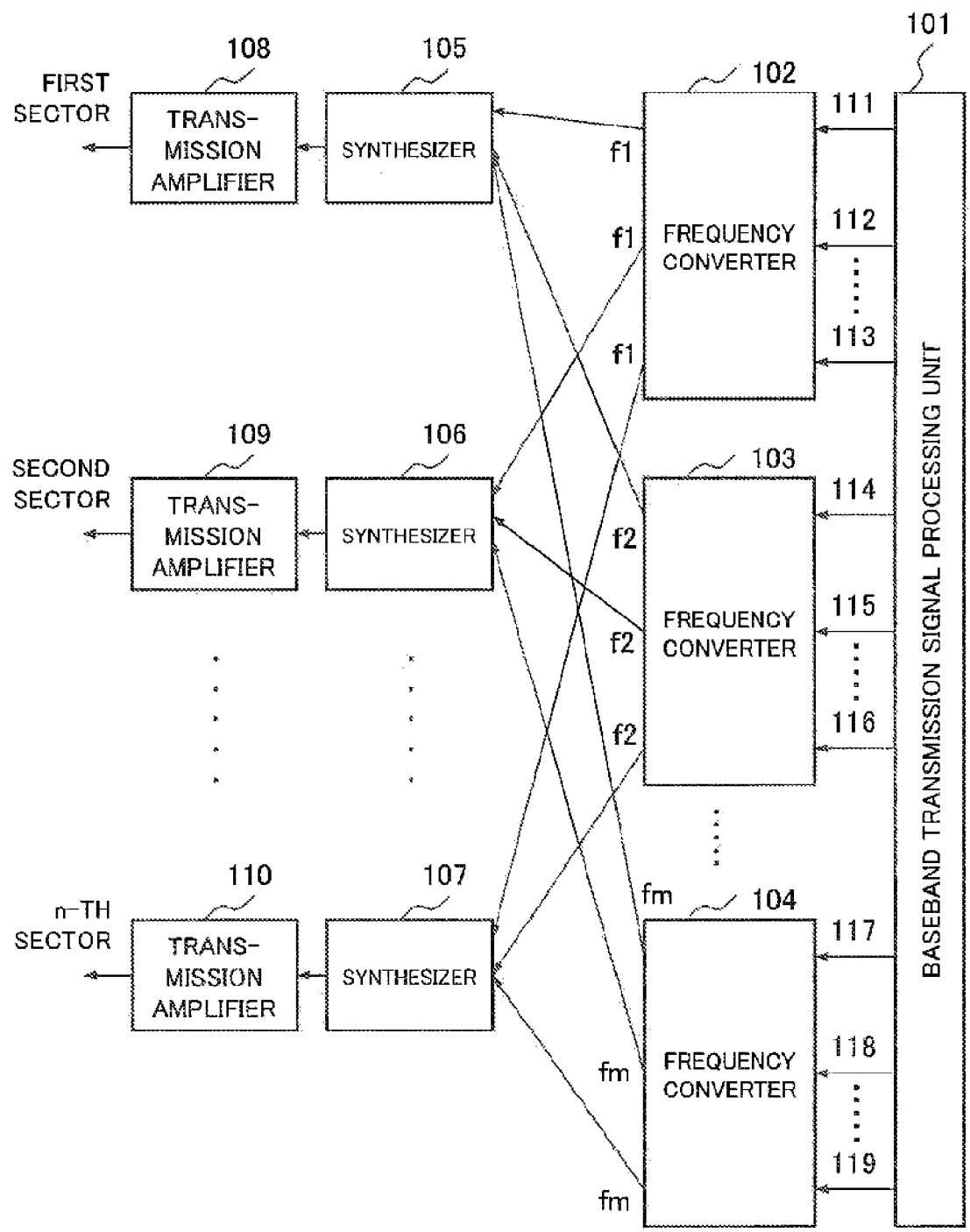
FIG. 35 A block structural diagram illustrating a transmission device described in PTL 2

In the technique of FIGS. 34 and 35 described in PTL 2, there has been a problem where when any one of transmission amplifiers 108 to 110 or transmission amplifiers 315 to 317 fails, transmission to a sector to which the failed transmission amplifier is assigned is completely shut off. The technique of FIGS. 34 and 35 described in PTL 2 is configured such that the transmission amplifiers 108 to 110 or the transmission amplifiers 315 to 317 each perform transmission at the same frequency (f1, f2, ..., fm). Thus, since each of the transmission amplifiers transmits at the same frequency, it has been impossible to assign a plurality of amplifiers of the transmission amplifiers 108 to 110 or the transmission amplifiers 315 to 317 to the same sector.

In the transmission device 1101 of the present first exemplary embodiment, the RF signals 1201 and 1202 with the carrier frequencies $f_{c1L}$ and $f_{c2L}$ are input to the broadband/multiband power amplifier 1103, and the RF signals 1203 and 1204 with the carrier frequencies $f_{c1U}$ and $f_{c2U}$ are input to the broadband/multiband power amplifier 1104, respectively. In other words, the RF signals with the different carrier frequencies are input to each of the broadband/multiband power amplifiers 1103 and 1104. Accordingly, transmission can also be performed by assigning the broadband/multiband power amplifiers 1103 and 1104 to the same sector. Assigning the broadband/multiband power amplifiers 1103 and 1104 to the same sector as mentioned above allows, even when any one of the broadband/multiband power amplifiers 1103 and 1104 fails, for continuous transmission to the sector by the broadband/multiband power amplifier as the non-failing side. In this manner, the present first exemplary embodiment achieves the function that has not been obtainable in the technique of FIGS. 34 and 35 described in PTL 2.

Figure 36:
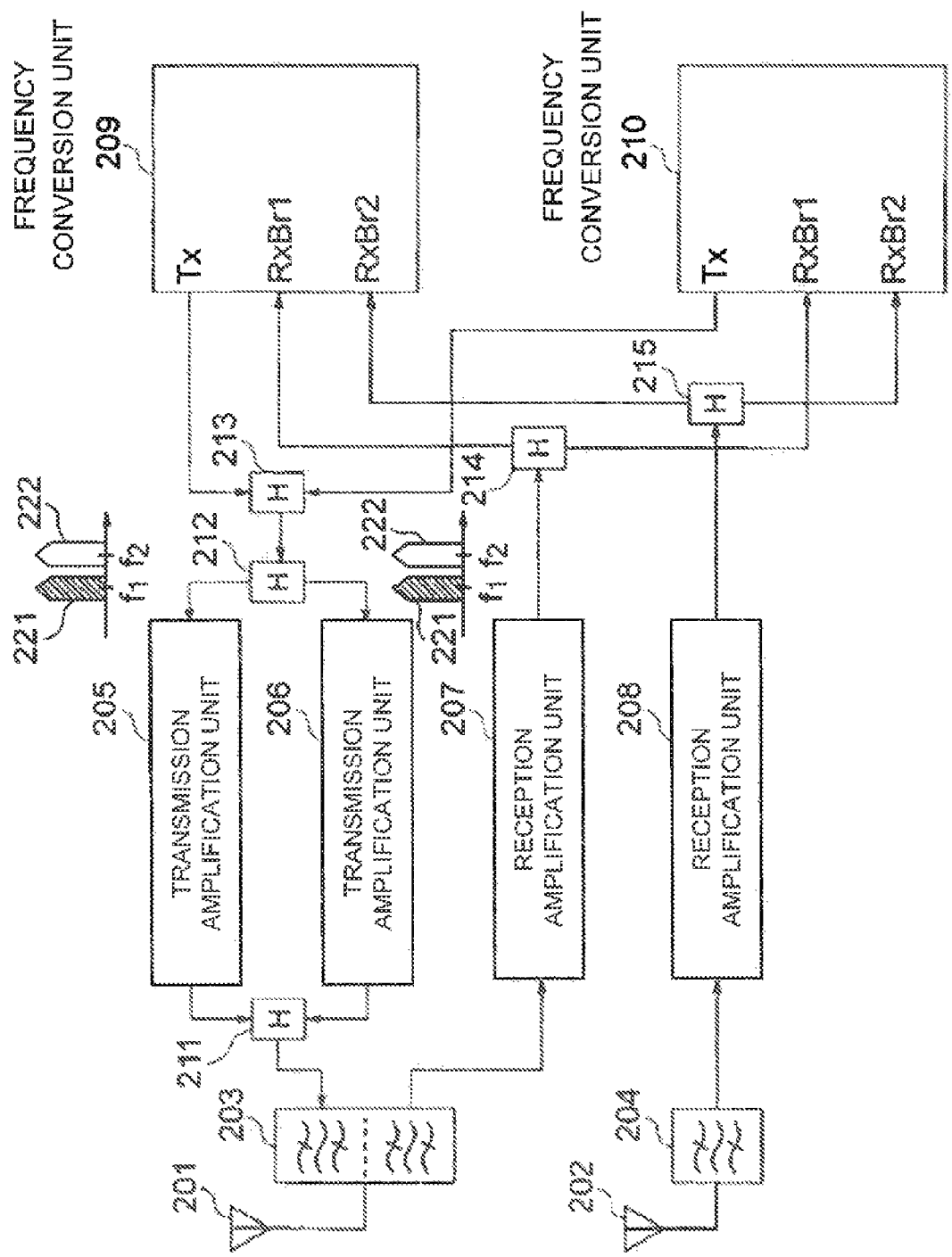
FIG. 36 A block structural diagram illustrating a communication apparatus described in PTL 3

In the technique of FIG. 36 described in PTL 3, when one of the transmission amplification units 205 and 206 fails, power of two carrier signals 221 and 222 to be transmitted is reduced although transmission of the two carrier signals 221 and 222 can be continued. Reduction in the power of the two carrier signals 221 and 222 to be transmitted reduces the communication distance of the communication apparatus. Thus, there has been a problem where it is impossible to communicate with a user distant from the communication apparatus.

In the transmission device 1101 of the present first exemplary embodiment, as the example of FIG. 5, when the broadband/multiband power amplifier 1104 fails, the broadband/multiband power amplifier 1103 continues communication by the RF signals 1201 and 1202 without any change before and after the failure. At this time, the power of the RF signals 1201 and 1202 does not change before and after the failure. In other words, since the power of each of the RF signals transmitted from the transmission device 1101 does not change, the communication distance does not change. Thus, the present first exemplary embodiment avoids the problem of the technique of FIG. 36 described in PTL 3, where it is impossible to communicate with a user distant from the communication apparatus.

In the transmission device 1101 of the present first exemplary embodiment, when the broadband/multiband power amplifier 1104 fails, the RF signals 1203 and 1204 cannot be transmitted. In other words, a modulation bandwidth of the RF signals to be transmitted is reduced, which makes communication speed slow. However, it can be said that maintaining communication even at low speed, as in the present first exemplary embodiment, is a better way for user experience than making it completely impossible to communicate with a user distant from the communication apparatus, as in the technique of FIG. 36 described in PTL 3.

Furthermore, the present first exemplary embodiment of FIG. 3 is more advantageous than the first related art of FIG. 4 in that the communication distance can be extended by increasing the output power of the RF signals 1201 and 1204 to be transmitted and also power saving can be achieved by increasing the power efficiency of the broadband/multiband power amplifiers 1103 and 1104. The principle of the advantage will be described below.

First, a discussion will be made on properties of the synthesized RF signal obtained by synthesizing the two RF signals with the different carrier frequencies. Consideration will be given to a synthetic RF signal waveform V(t) given by equation (1), where the two RF signals with the carrier frequencies $f_{c1}$ and $f_{c2}$ are synthesized:

[Math. 1]

$$v(t) = a_1(t)\cos[2\pi f_{c1}t + \theta_1(t)] + a_2(t)\cos[2\pi f_{c2}t + \theta_2(t)] \quad (1)$$

Herein, the synthetic RF signal waveform V(t) is assumed to have voltage dimensions. A baseband signal $a_1(t)\exp[j\theta_1(t)]$ of a channel 1 (carrier frequency $f_{c1}$) is assumed to have a modulation bandwidth $f_{BB1}$, and a baseband signal $a_2(t)\exp[j\theta_2(t)]$ of a channel 2 (carrier frequency $f_{c2}$) is assumed to have a modulation bandwidth $f_{BB2}$. In addition, the $f_{BB1}$ and the $f_{BB2}$ are assumed to be approximately equal in magnitude, i.e. $f_{BB} \equiv f_{BB1} \approx f_{BB2}$. A difference between the carrier frequencies is defined by $\Delta f \equiv f_{c2} - f_{c1}$, in which it is assumed to be $\Delta f > 0$.

A power P(t) obtained by applying the synthetic RF signal waveform V(t) to a resistor R is given by equation (2) below:

[Math. 2]

$$P(t) = \frac{1}{RT}\int_0^T [V(t)]^2 dt \quad (2)$$

T represents an average time for obtaining a power, and a different power is defined depending on how to set the T. The V(t) of the equation (1) is substituted in the equation (2) to obtain equation (3) below:

[Math. 3]

$$P(t) = \frac{1}{2RT}\int_0^T ([a_1(t)]^2 + [a_2(t)]^2)dt + \quad (3)$$
$$\frac{1}{RT}\int_0^T a_1(t)a_2(t)\cos[2\pi\Delta f t + \theta_2(t) - \theta_1(t)]dt +$$
$$\frac{1}{RT}\int_0^T a_1(t)a_2(t)\cos[2\pi(f_{c1} + f_{c2})t + \theta_2(t) + \theta_1(t)]dt +$$
$$\frac{1}{2RT}\int_0^T [a_1(t)]^2\cos[4\pi f_{c1}t + 2\theta_1(t)]dt +$$
$$\frac{1}{2RT}\int_0^T [a_2(t)]^2\cos[4\pi f_{c2}t + 2\theta_2(t)]dt$$

In the calculation of an average power $P_{ave}$, the average time T for power calculation is set to be infinite. When integration is executed by setting the T to be infinite in the equation (3), all the terms including cos are smoothed to 0, and only the first term of the right side of the equation (3) remains. As a result, the average power $P_{ave}$ is given by equation (4):

[Math. 4]

$$P_{ave} = \frac{1}{2R}(\langle a_1^2 \rangle + \langle a_2^2 \rangle) \quad (4)$$

Herein, $\langle a_1^2 \rangle$ represents a time average value of $\{a_1(t)\}^2$, and $\langle a_2^2 \rangle$ represents a time average value of $\{a_2(t)\}^2$. The average power $P_{ave}$ is always given by the equation (4) without depending on values of $\Delta f$ and $f_{BB}$.

Next, an instantaneous power of the synthetic RF signal waveform V(t) is derived.

In the first exemplary embodiment 1 of FIG. 3, in each of the bands 1211 and 1212 having the distant frequencies, there are allocated the RF signals 1201 and 1202 as signals to be input to the broadband/multiband power amplifier 1103 and the RF signals 1203 and 1204 as signals to be input to the broadband/multiband power amplifier 1104. In other words, in this case, the frequency difference $\Delta f$ between the RF signals to be input to the broadband/multiband power amplifiers 1103 and 1104 is sufficiently larger than the modulation bandwidth $f_{BB}$ of the RF signals ($\Delta f \gg f_{BB}$). In the derivation of an instantaneous power in the case where the allocation of the two RF signals is represented by $\Delta f \gg f_{BB}$, the average time T is set so as to satisfy: $1/f_{c2} \approx 1/f_{c1} \approx 1/\Delta f \ll T \ll 1/f_{BB}$. For such a T, the phase in cos varies at high speed within an integration time T in the second to the fifth terms of the right side of the equation (3), whereby the second to the fifth terms of the right side of the equation (3) are smoothed by integration to become 0. As a result, only the first term of the equation (3) remains, and the instantaneous power P(t) is given by equation (5) below:

[Math. 5]

$$P(t) = \frac{1}{2R}([a_1(t)]^2 + [a_2(t)]^2) \quad (5)$$

Herein, a PAPR of the synthetic RF signal waveform V(t) is calculated. For simplification, the average power and the amplitude peak value of each RF signal are assumed to be the same. In other words, it is assumed: $\langle a_1^2 \rangle = \langle a_2^2 \rangle = \langle a^2 \rangle$, and $\max[a_1(t)] = \max[a_2(t)] = a_{max}$. Under the above assumptions, the PAPR of the synthetic RF signal waveform V(t) is calculated from the equations (4) and (5), as in equation (6):

[Math. 6]

$$\text{PAPR} = \max[P(t)]/P_{ave} = a_{max}^2/\langle a^2 \rangle, \quad (6)$$

The discussion hereinabove will also be easily extended also to a case where there are a general number (n pieces) of the carrier frequencies. It is assumed that there are n pieces of RF signals with carrier frequencies $f_{c1}, f_{c2}, \ldots$ and $f_{cn}$, and the respective RF signals have amplitudes $a_1(t)$, $a_2(t), \ldots$ and $a_n(t)$. In addition, the respective carrier frequencies $f_{c1}, f_{c2}, \ldots$ and $f_{cn}$ are assumed to be distant from each other at a sufficiently larger frequency interval than the modulation bandwidth $f_{BB}$. In this case, the average power $P_{ave}$, the instantaneous power P(t), and the PAPR in the synthesis of the n pieces of RF signals will be given by equations (7) to (9) below:

[Math. 7]

$$P_{ave} = \frac{1}{2R}(\langle a_1^2 \rangle + \langle a_2^2 \rangle + \ldots + \langle a_n^2 \rangle), \quad (7)$$

[Math. 8]

$$P(t) = \frac{1}{2R}([a_1(t)]^2 + [a_2(t)]^2 + \ldots + [a_n(t)]^2), \quad (8)$$

[Math. 9]

$$PAPR = \max[P(t)]/P_{ave} = a_{max}^2/\langle a^2 \rangle, \quad (9)$$

As shown by the equation (9), when the respective carrier frequencies $f_{c1}, f_{c2}, \ldots$ and $f_n$ of the RF signals are distant from each other at the sufficiently larger frequency interval than the modulation bandwidth $f_{BB}$, the PAPR in synthesis of the RF signals becomes a constant value that does not depend on the number of pieces n of the RF signals.

Next, a discussion will be made on the case of the first related art of FIG. 4. In the first related art of FIG. 4, the plurality of RF signals are allocated at adjacent frequencies in a single band. For example, in the narrowband power amplifier 1113, the plurality of RF signals 1201 and 1203 are input in the single band 1211. In addition, in the narrowband power amplifier 1114, the plurality of RF signals 1202 and 1204 are input in the single band 1212. In such a case, the frequency difference $\Delta f$ between the two RF signals is approximately equal to the modulation bandwidth $f_{BB}$ of the RF signals ($\Delta f \approx f_{BB}$). In the derivation of an instantaneous power in a case where the allocation of the two RF signals is represented by $\Delta f \approx f_{BB}$, the average time T is set so as to satisfy: $1/f_{c2} \approx 1/f_{c1} \ll T \ll 1/\Delta f \approx 1/f_{BB}$. For such a T, the phase in cos varies at high speed within an integration time T in the third to the fifth terms of the right side of the equation (3), whereby the third to the fifth terms of the right side of the equation (3) are smoothed by integration to become 0. As a result, only the first and the second terms of the equation (3) remain, and the instantaneous power is given by equation (10) below:

[Math. 10]

$$P(t) = \frac{1}{2R}([a_1(t)]^2 + [a_2(t)]^2) + \frac{1}{R}a_1(t)a_2(t)\cos[2\pi\Delta f t + \theta_2(t) - \theta_1(t)] \quad (10)$$

From the average power $P_{ave}$ of the equation (4) and the instantaneous power P(t) of the equation (10), a PAPR of the synthetic RF signal waveform V(t) in the case where the allocation of the two RF signals is represented by $\Delta f \approx f_{BB}$ is calculated as in equation (11) below:

[Math. 11]

$$\text{PAPR} = \max[P(t)]/P_{ave} = 2a_{max}^2/\langle a^2 \rangle \quad (11)$$

In addition, consideration will be given to a case where there are n pieces of RF signals and the respective carrier frequencies $f_{c1}, f_{c2}, \ldots$ and $f_{cn}$ are adjacent to each other at approximately the same extent as the modulation bandwidth $f_{BB}$. The PAPR in this case is given by equation (12) below:

[Math. 12]

$$\text{PAPR} = n \cdot a_{max}^2/\langle a^2 \rangle, \quad (12)$$

As shown by the equation (12), the PAPR in the case where the carrier frequencies $f_{c1}, f_{c2}, \ldots$ and $f_{cn}$ of the n pieces of RF signals are adjacent to each other at approximately the same extent as the modulation bandwidth $f_{BB}$ is proportional to the number of pieces n of the RF signals. In the case of the equation (11), the PAPR is one obtained in the case where the carrier frequencies of the two RF signals are adjacent to each other, and a coefficient 2 in the PAPR of the equation (11) is derived from the number of the RF signals.

From the PAPR, given by the equation (9), in the case where the carrier frequencies of the respective RF signals are distant from each other and the PAPR, given by the equation (12), in the case where the carrier frequencies of the respective RF signals are adjacent to each other, advantages of the present first exemplary embodiment of FIG. 3 against the first related art of FIG. 4 will be described as follows.

In the present first exemplary embodiment of FIG. 3, the RF signals to be input to the broadband/multiband power amplifiers 1103 and 1104 are allocated so as to satisfy: $\Delta f \gg f_{BB}$, as already described. Accordingly, the PAPR in this case is given by the equation (9), and even when the number of pieces n of the RF signals is increased, the PAPR does not increase.

On the other hand, in the first related art of FIG. 4, the RF signals to be input to the narrowband power amplifiers 1113 and 1114 are allocated so as to satisfy: $\Delta f \approx f_{BB}$, as already described. Accordingly, the PAPR in this case is given by the equation (12), and the PAPR increases proportionally to the number of pieces n of the RF signals. Furthermore, when the number of the RF signals is plural (n≥2), the PAPR in this case always exceeds the PAPR of the present first exemplary embodiment given by the equation (9).

Accordingly, the present first exemplary embodiment of FIG. 3 can reduce the PAPR as compared to the first related art of FIG. 4. As a result, the present first exemplary embodiment of FIG. 3 can more suppress a backoff amount needed to suppress signal distortion than the first related art of FIG. 4. Thus, the present first exemplary embodiment of FIG. 3 can achieve higher average transmission power and higher power efficiency than in the first related art of FIG. 4.

FIG. 9 illustrates results obtained by measurements and comparison of actual characteristics of power amplifiers in the structure of the first related art of FIG. 4 and the structure of the present first exemplary embodiment of FIG. 3. In the measurements of the characteristics in FIG. 9, regarding the narrowband power amplifiers 1113 and 1114 of FIG. 4 and the broadband/multiband power amplifiers 1103 and 1104 of FIG. 3, the measurements were performed using the same power amplifiers. The above measurements allow comparison to be made regarding only advantageous effects, which do not include the difference between the characteristics of the power amplifiers, resulting from the difference of structure between the first related art and the present first exemplary embodiment. The RF signals 1201 to 1204 used were WCDMA (registered trademark) down-link signals with a modulation bandwidth $f_{BB}$ of 4 MHz. In the structure of the present first exemplary embodiment of FIG. 3, the measurements were performed by setting the frequency difference $\Delta f$ between the band 1 (band 1211) and the band 2 (band 1212) to 300 MHz so as to satisfy the condition: $\Delta f \gg f_{BB}$. In addition, in the structure of the first related art of FIG. 4, the measurements were performed by setting the frequency interval between the RF signals 1201 and 1203 and the frequency interval between the RF signals 1202 and 1204, respectively, to the same value $\Delta f=5$ MHz so as to satisfy the condition: $\Delta f \approx f_{BB}$. FIG. 9 illustrates best characteristics within a range that satisfies distortion standards (adjacent-channel power ratio: ACPR←−44.2 dBc) of the WCDMA down-link signals.

As illustrated in the measurement results of FIG. 9, regarding the characteristics satisfying the distortion standards, the present first exemplary embodiment is superior to the first related art of FIG. 4. For example, in the present first exemplary embodiment of FIG. 3, the average output power of the power amplifiers has been improved by 2 to 3 dB, as compared to the first related art of FIG. 4. The improvement in the average output power results from the fact that the present first exemplary embodiment of FIG. 3 can exhibit a lower PAPR than the first related art of FIG. 4, as already discussed. In the case of the two bands, the PAPR of the present first exemplary embodiment of FIG. 3 is halved as compared to the first relate art of FIG. 4. This is equivalent to a reduction of 3 dB. In response to the reduction of 3 dB in the PAPR, the average output power in the present first exemplary embodiment of FIG. 3 illustrates an improvement of 2 to 3 dB, as compared to the first related art of FIG. 4. Additionally, along with the improvement in the average output power, power efficiency (drain efficiency and PAE) also improves. Actually, as indicated in FIG. 9, the present first exemplary embodiment of FIG. 3 can illustrate a power efficiency 1.3 times higher than that of the first related art of FIG. 4.

In other words, the present first exemplary embodiment of FIG. 3 is advantageous in that communication distance can be extended by increasing the output power of the RF signals 1201 to 1204 to be transmitted and power saving can be achieved by increasing the power efficiency of the broadband/multiband power amplifiers 1103 and 1104, as compared to the first related art of FIG. 4.

A comparison will be made between a PAPR reduction method of the present first exemplary embodiment and a PAPR reduction method in the technique of FIG. 37 described in PTL 3. In the technique of FIG. 37, PAPR is reduced by reducing the number of pieces of the RF signals to be input to the power amplifiers 205 and 206. This is a PAPR reduction method effective to a case where the condition: $f \approx f_{BB}$ is satisfied and PAPR is proportional to the number of pieces n of the RF signals as in the equation (12).

On the other hand, in the present first exemplary embodiment of FIG. 3, PAPR is reduced as compared to the first related art of FIG. 4 by utilizing that, by determining the frequency allocation of the RF signals so as to satisfy the condition: $\Delta f \gg f_{BB}$, PAPR does not depend on the number of pieces n of the RF signals as in the equation (9), i.e. PAPR does not increase even when the number of pieces n of the RF signals is increased.

As described above, the principle of the PAPR reduction is different between the present first exemplary embodiment and the technique of FIG. 37 described in PTL 3. In addition, based on the difference of the principle of the PAPR reduction described above, the present first exemplary embodiment can provide the advantage that is not obtainable in the technique of FIG. 37 described in PTL 3. In other words, the only way to reduce PAPR by the technique of FIG. 37 described in PTL 3 is to reduce the number of the RF signals to be input to the power amplifiers 205 and 206. Reducing the number of the RF signals leads to reduction in the modulation bandwidth of the signals, consequently reducing communication speed. Specifically, in the technique of FIG. 37 described in PTL 3, there is a trade-off between PAPR reduction and communication speed. On the other hand, in the present first exemplary embodiment of FIG. 3, the PAPR of the signals is reduced by setting the frequency interval $\Delta f$ of the RF signals to be sufficiently larger than the modulation bandwidth $f_{BB}$ of the RF signals, without reducing the number of the RF signals from the first related art of FIG. 4. In short, the present first exemplary embodiment can reduce the PAPR of the signals without reducing communication speed, and thus is successful in overcoming the trade-off seen in the technique of FIG. 37 described in PTL 3.

Second Exemplary Embodiment

Figure 10:
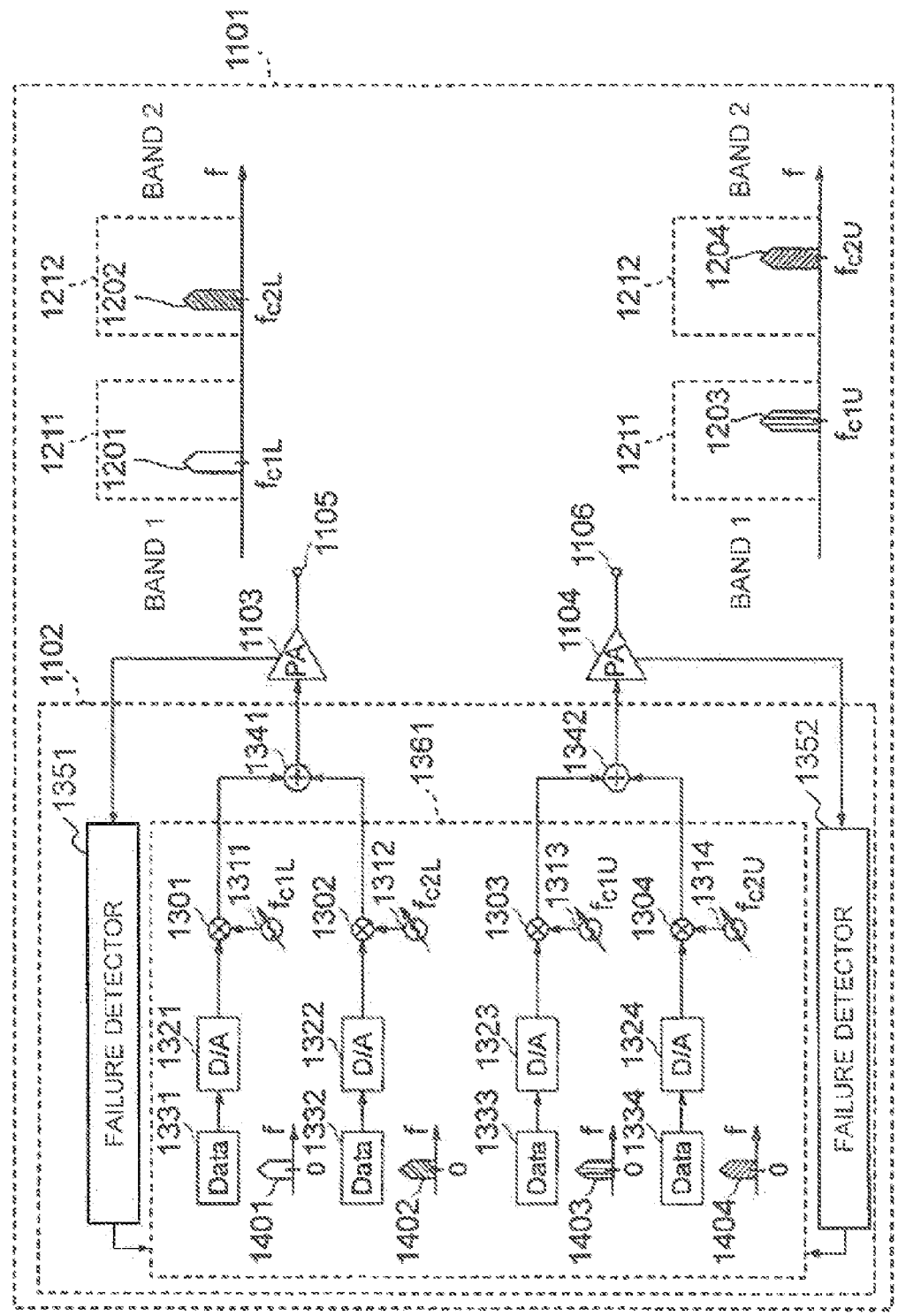

FIG. 10 is a block structural diagram illustrating a transmission device 1101 in the present second exemplary embodiment. In the present second exemplary embodiment of FIG. 10, the inner structure of the signal generator 1102 will be described in more detail.

In the present second exemplary embodiment, the signal generator 1102 is configured by including digital baseband signal generation units 1331 to 1334, digital/analog converters 1321 to 1324, mixers 1301 to 1304, variable local oscillator signal generators (hereinafter referred to as "variable LO (local oscillator) signal generator") 1311 to 1314, synthesizers 1341 and 1342, and failure detectors 1351 and 1352. In an inside part of the signal generator 1102, a region except for the synthesizers 1341, 1342 and the failure detectors 1351, 1352 is aggregated as an each channel RF signal generator 1361.

In the structure of FIG. 10, the digital baseband signal generation units 1331 to 1334 transmit digital baseband signals 1401 to 1404 of each channel. The digital baseband signals 1401 to 1404, respectively, are converted into analog baseband signals in the digital/analog converters 1321 to 1324. The variable LO signal generators 1311 to 1314, respectively, output LO signals having frequencies $f_{c1L}$, $f_{c2L}$, $f_{c1U}$, and $f_{c2U}$ to the mixers 1301 to 1304. The respective analog baseband signals are up-converted into LO frequencies $f_{C1L}$, $f_{C2L}$, $f_{C1U}$, and $f_{C2U}$ by the variable LO signal generators 1311 to 1314 and the mixers 1301 to 1304. With the structure and the operation described above, the digital baseband signals 1401 to 1404, respectively, are converted into RF signals 1201 to 1204. The RF signals 1201 and 1202 are synthesized in the synthesizer 1341 and then simultaneously input to the broadband/multiband power amplifier 1103. The input RF signals 1201 and 1202 are amplified in the broadband/multiband power amplifier 1103 and then transmitted via the terminal 1105. In addition, the RF signals 1203 and 1204 are synthesized in the synthesizer 1342 and then simultaneously input to the broadband/multiband power amplifier 1104. Then, the input RF signals 1203 and 1204 are amplified in the broadband/multiband power amplifier 1104 and then transmitted via the terminal 1106.

In the structure of FIG. 10, the failure detector 1351 has a function of detecting failure of the broadband/multiband power amplifier 1103, and the failure detector 1352 has a function of detecting failure of the broadband/multiband power amplifier 1104. As one example, the failure detectors 1351 and 1352 may detect a current supplied from a power supply provided in the broadband/multiband power amplifiers 1103 and 1104 to detect failure from the presence or absence of abnormality in a value of the current. The failure detectors 1351 and 1352 have a function of controlling the each channel RF signal generator according to the presence or absence of failure of the broadband/multiband power amplifiers 1103 and 1104.

Figure 11:
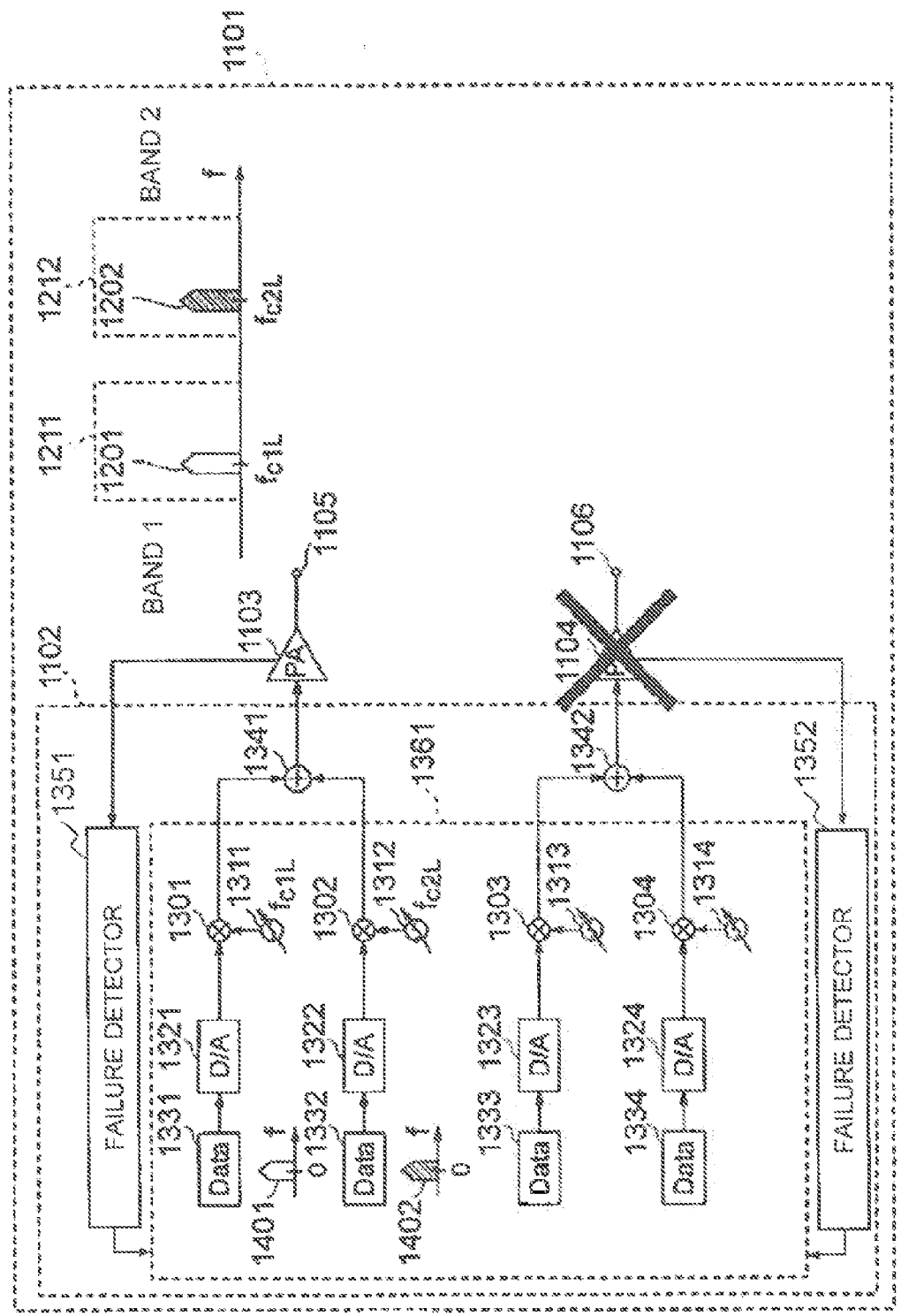
Figure 12:
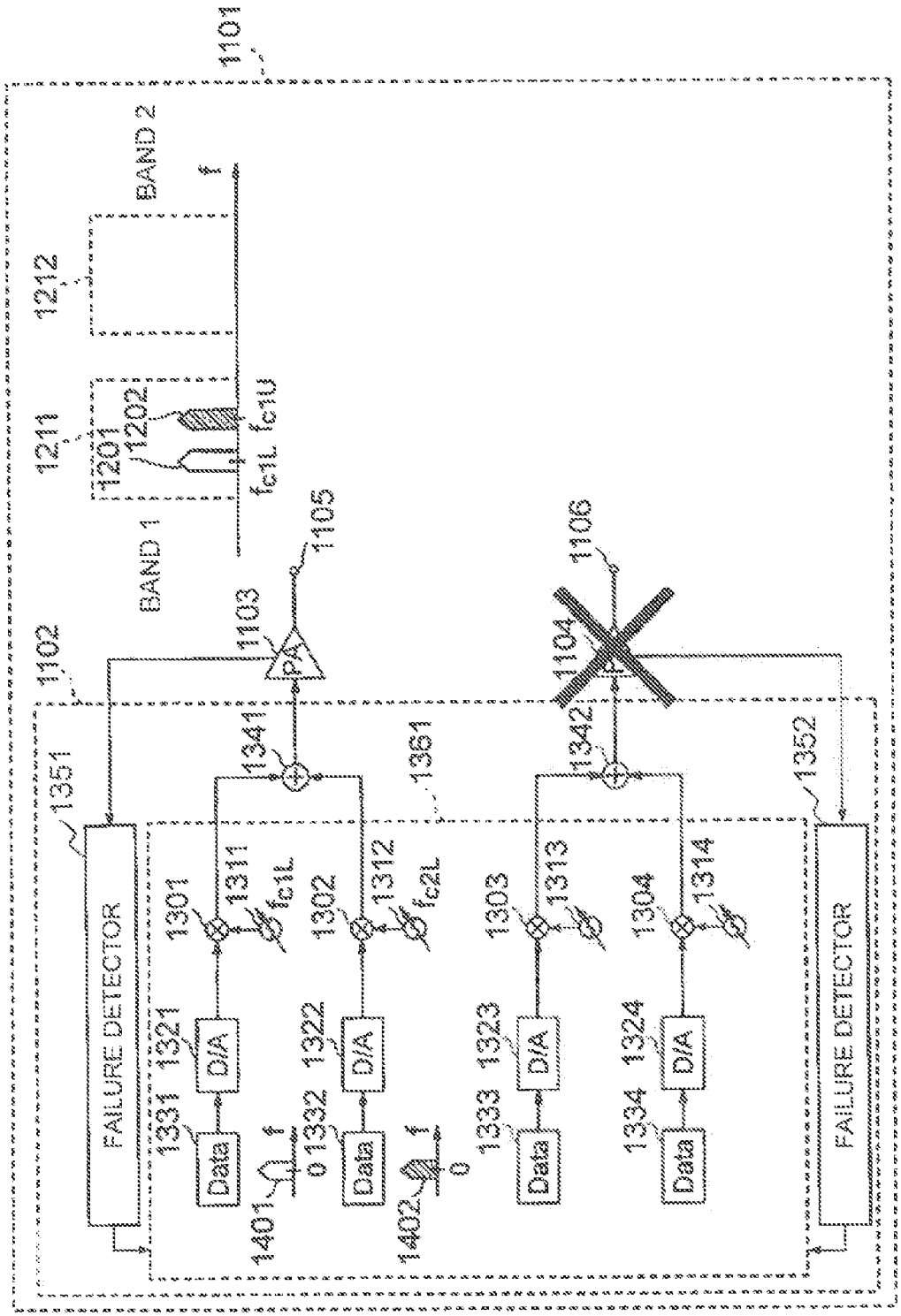
Figure 13:
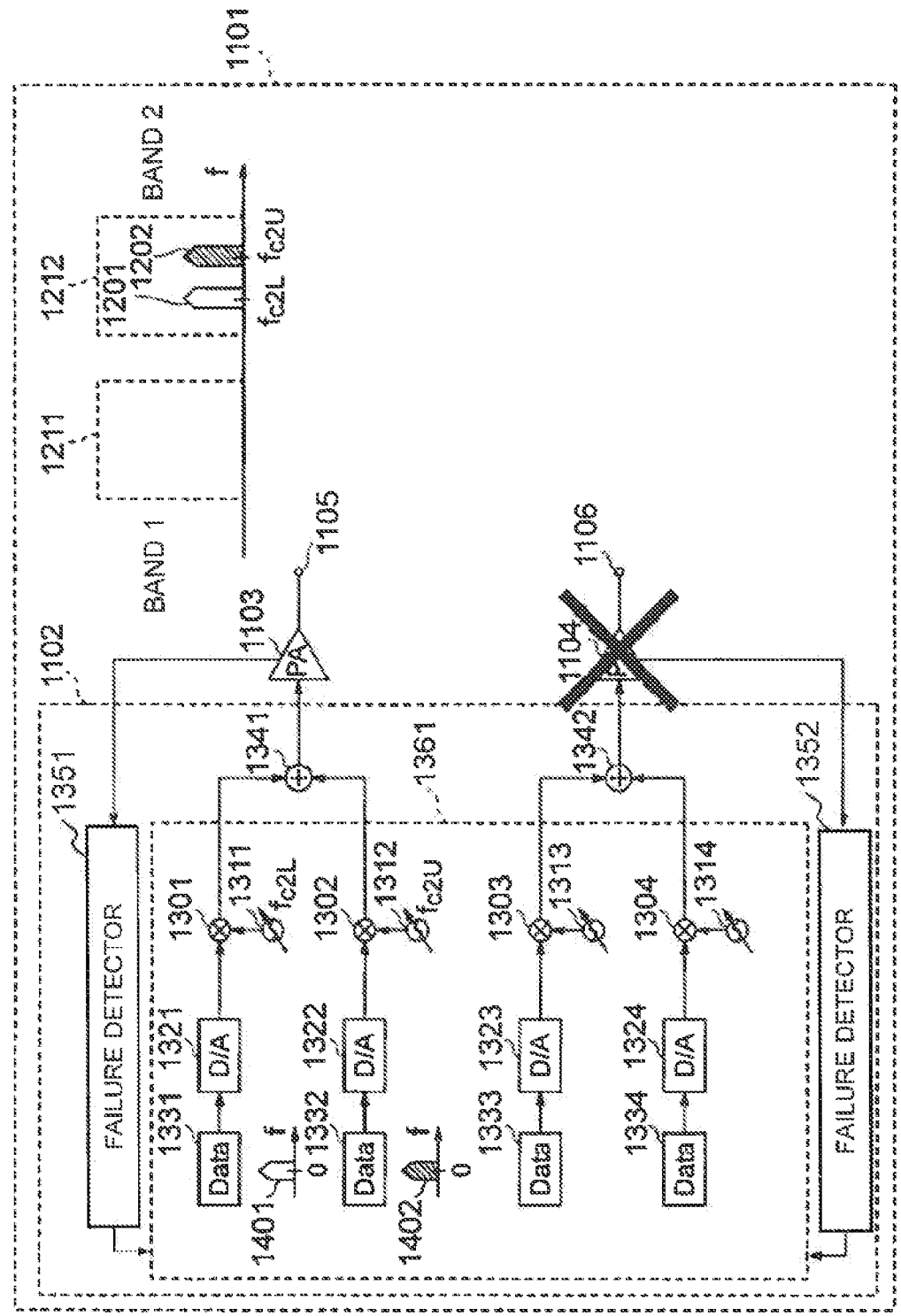

FIGS. 11 to 13 are diagrams each illustrating an example of operation in a case of failure of the broadband/multiband power amplifier 1104 in the present second exemplary embodiment. In FIGS. 11 to 13, the failure detector 1352 detects that the broadband/multiband power amplifier 1104 has failed.

At this time, in FIG. 11, the failure detector 1352 stops the operations of the digital baseband signal generators 1333 and 1334, the digital/analog converters 1323 and 1324, the mixers 1303 and 1304, and the variable LO signal generators 1313 and 1314 to stop the generation of the RF signals 1203 and 1204.

In FIG. 12, the failure detector 1352 not only stops the generation of the RF signals 1203 and 1204, but also changes an LO frequency output from the variable LO signal generator 1311 from $f_{c2L}$ to $f_{c1U}$ to thereby change the frequency of the RF signal 1202 from $f_{c2L}$ to $f_{c1U}$ and use only the band 1211 for communication.

In FIG. 13, the failure detector 1352 not only stops the generation of the RF signals 1203 and 1204, but also changes an LO frequency output from the variable LO signal generator 1311 from $f_{c1L}$ to $f_{c2L}$ and an LO frequency output from the variable LO signal generator 1312 from $f_{c2L}$ to $f_{c2U}$ to thereby change the frequency of the RF signal 1201 from $f_{c1L}$ to $f_{c2L}$ and the frequency of the RF signal 1202 from $f_{c2L}$ to $f_{c2U}$ and use only the band 1212 for communication.

In FIGS. 12 and 13, a band in a good communication state is selected from the bands 1211 and 1212 to be used for communication. The operations of FIGS. 11 to 13 in the present second exemplary embodiment correspond to the operations of FIGS. 5 to 7 in the first exemplary embodiment.

Third Exemplary Embodiment

Figure 14:
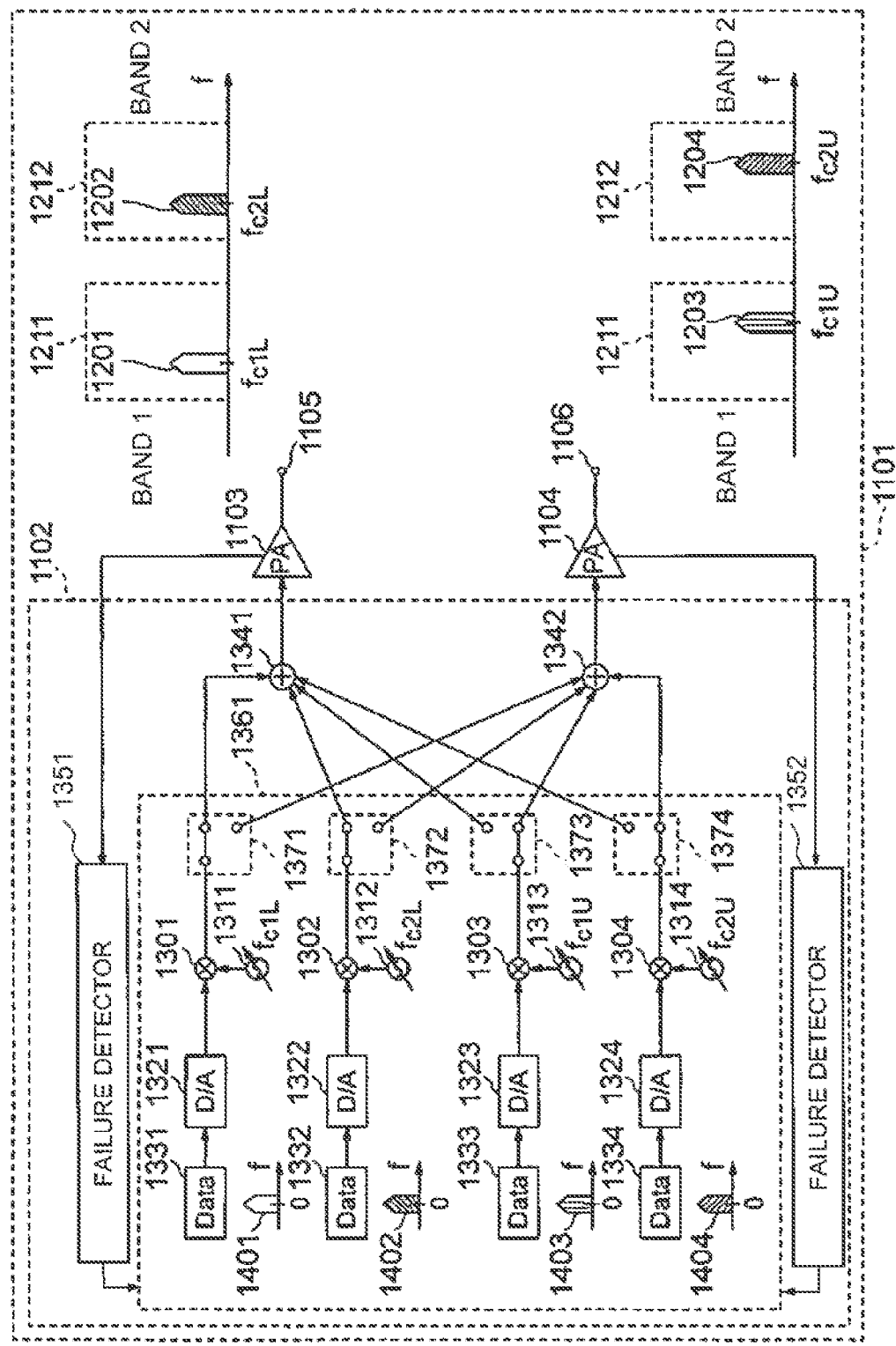

FIG. 14 is a block structural diagram illustrating a transmission device 1101 in the present third exemplary embodiment of the invention. In the present third exemplary embodiment of FIG. 14, the inner structure of the signal generator 1102 will be described in more detail.

In the present third exemplary embodiment of FIG. 14, switches 1371 to 1374 are added to the second exemplary embodiment of FIG. 10. The switches 1371 to 1374 are configured to each select either the synthesizer 1341 or 1342 to input output signals of the mixers 1301 to 1304 to either the synthesizer 1341 or 1342. The present third exemplary embodiment of FIG. 14 is all the same as the second exemplary embodiment of FIG. 10, except for the addition of the switches 1371 to 1374.

As illustrated in the present third exemplary embodiment of FIG. 14, during non-failing normal operation, the switches 1371 and 1372 are set such that the output signals of the mixers 1301 and 1302 are input to the synthesizer 1341. In addition, the switches 1373 and 1374 are set such that the output signals of the mixers 1303 and 1304 are input to the synthesizer 1342. With the above setting of the switches, the RF signals 1201 and 1202 allocated in the bands 1211 and 1212 are input to the broadband/multiband power amplifier 1103, and the RF signals 1203 and 1204 allocated in the bands 1211 and 1212 are input to the broadband/multiband power amplifier 1104. The operation at this time corresponds to the operation of FIG. 4 in the first exemplary embodiment and the operation of FIG. 10 in the second exemplary embodiment.

Figure 15:
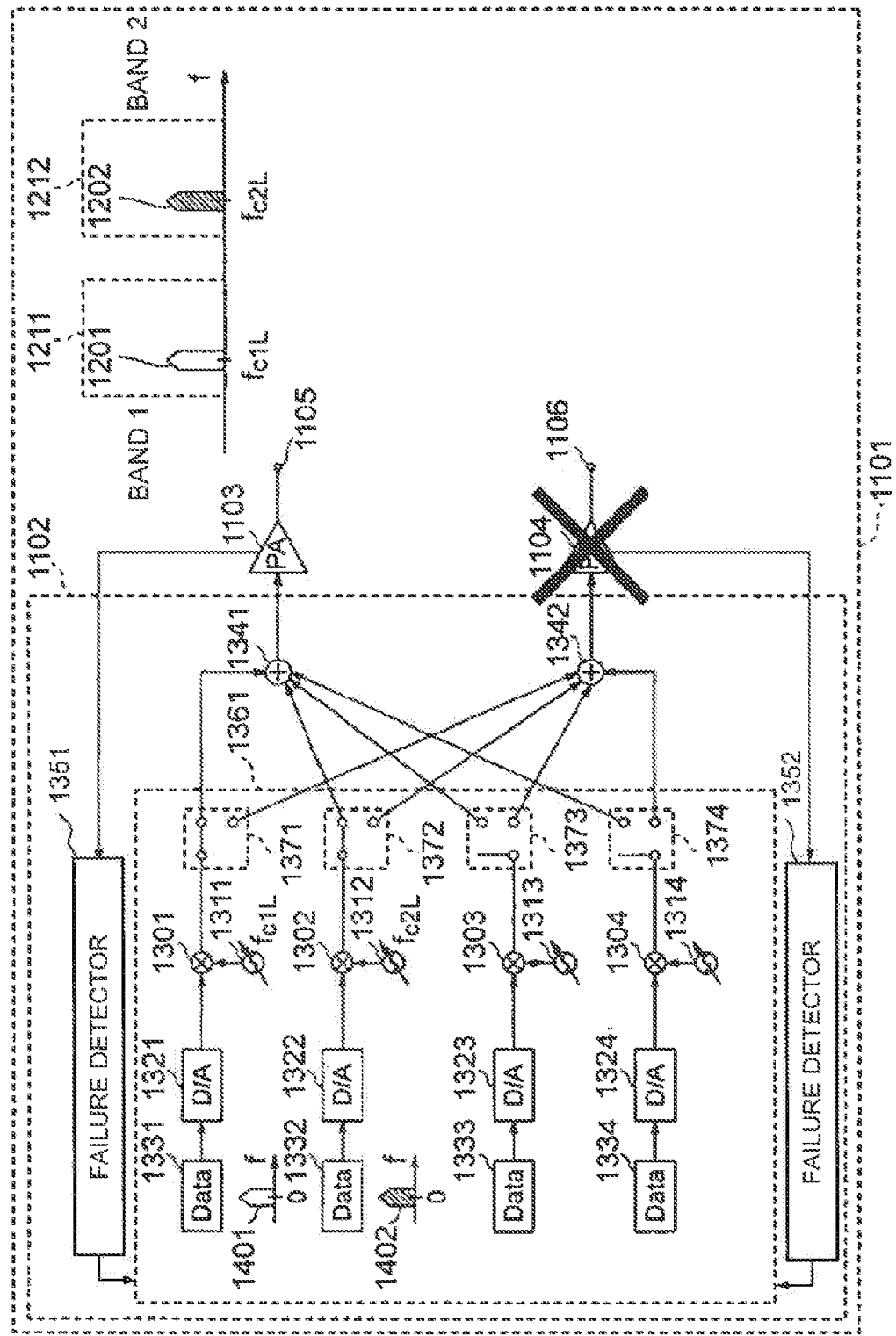
Figure 16:
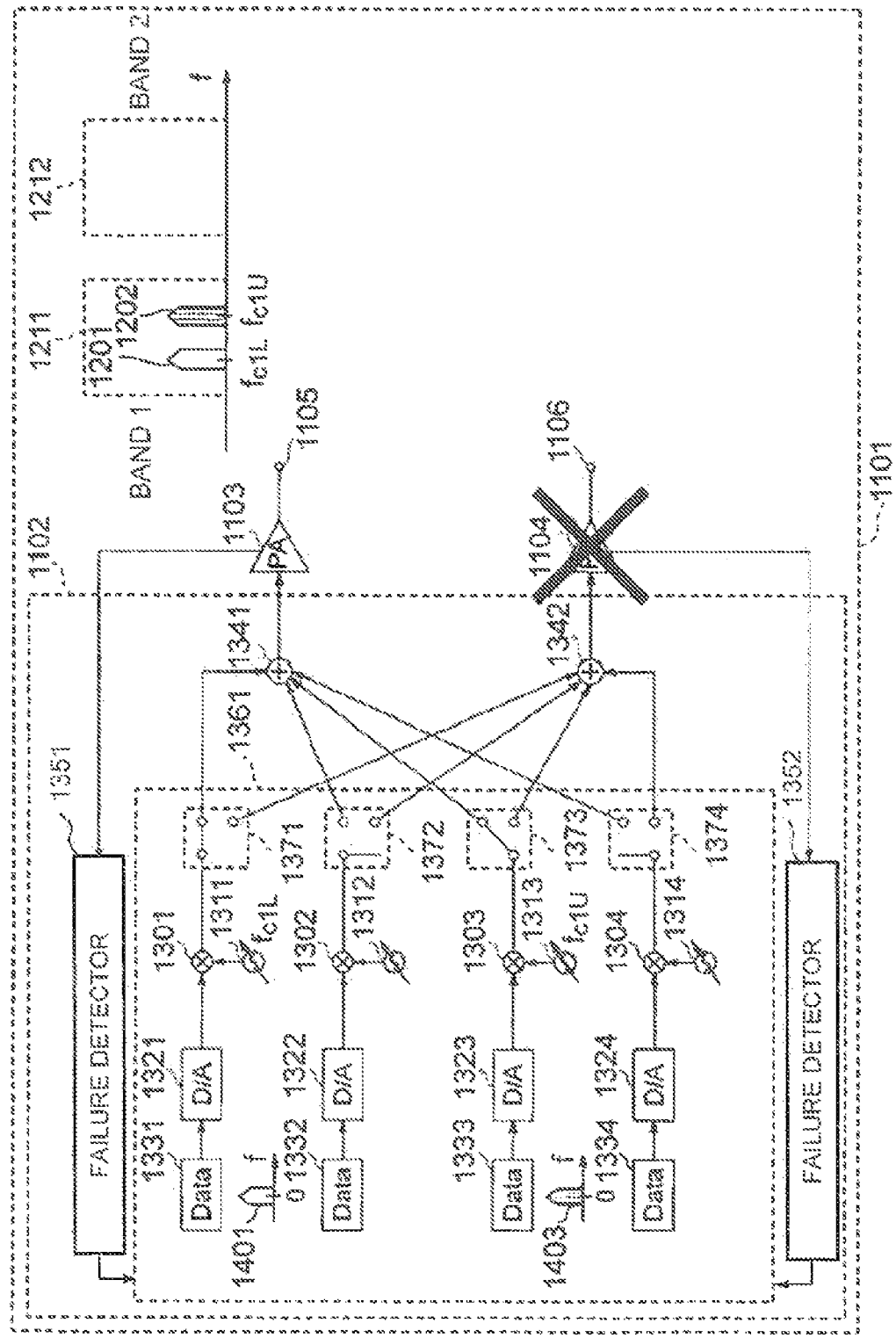
Figure 17:
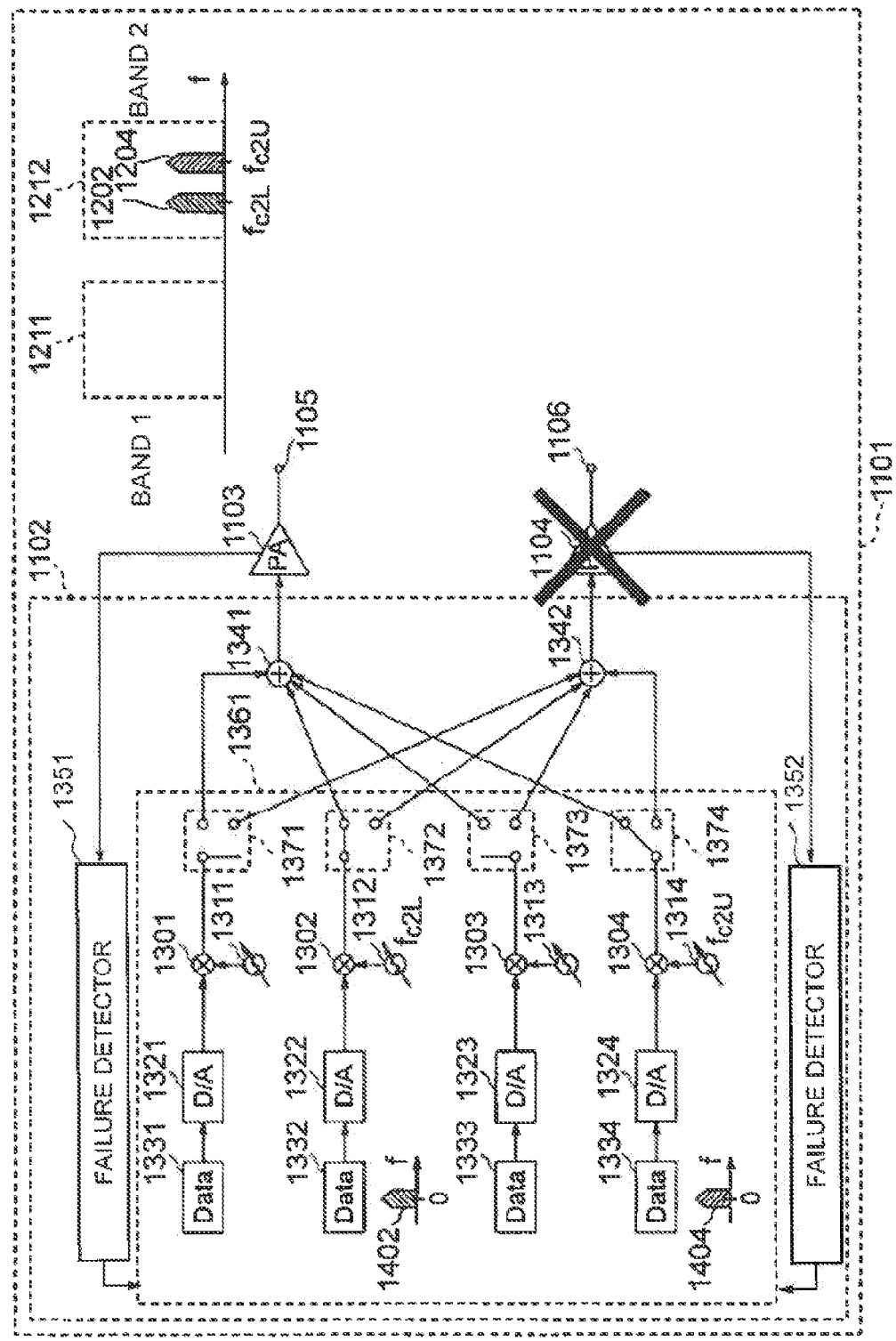

FIGS. 15 to 17 are diagrams each illustrating an example of operation in a case of failure of the broadband/multiband power amplifier 1104 in the present third exemplary embodiment. In FIGS. 15 to 17, the failure detector 1352 detects that the broadband/multiband power amplifier 1104 has failed.

At this time, in FIG. 15, the failure detector 1352 stops the operations of the digital baseband signal generation units 1333 and 1334, the digital/analog converters 1323 and 1324, the mixers 1303 and 1304, and the variable LO signal generators 1313 and 1314 to stop the generation of the RF signals 1203 and 1204.

In FIG. 16, the failure detector 1352 stops the operations of the digital baseband signal generation units 1333 and 1334, the digital/analog converters 1323 and 1324, the mixers 1303 and 1304, and the variable LO signal generators 1312 and 1314. Furthermore, the switches 1371 and 1373 are set such that the output signals of the mixers 1301 and 1303 are input to the synthesizer 1341. With the above setting of the switches, the RF signals 1201 and 1203 allocated in the band 1211 are input to the broadband/multiband power amplifier 1103.

In FIG. 17, the failure detector 1352 stops the operations of the digital baseband signal generators 1331 and 1333, the digital/analog converters 1321 and 1323, the mixers 1301 and 1303, and the variable LO signal generators 1311 and 1313. Furthermore, the switches 1372 and 1374 are set such that the output signals of the mixers 1302 and 1304 are input to the synthesizer 1341. With the above setting of the switches, the RF signals 1202 and 1204 allocated in the band 1212 are input to the broadband/multiband power amplifier 1103.

In FIGS. 16 and 17, a band in a good communication state is selected from the bands 1211 and 1212 to be used for communication. The operations of FIGS. 15 to 17 in the present third exemplary embodiment correspond to the operations of FIGS. 5 to 7 in the first exemplary embodiment. In the present third exemplary embodiment, the variable LO signal generators 1311 to 1314 may be replaced by fixed-frequency LO signal generators.

Fourth Exemplary Embodiment

Figure 18:
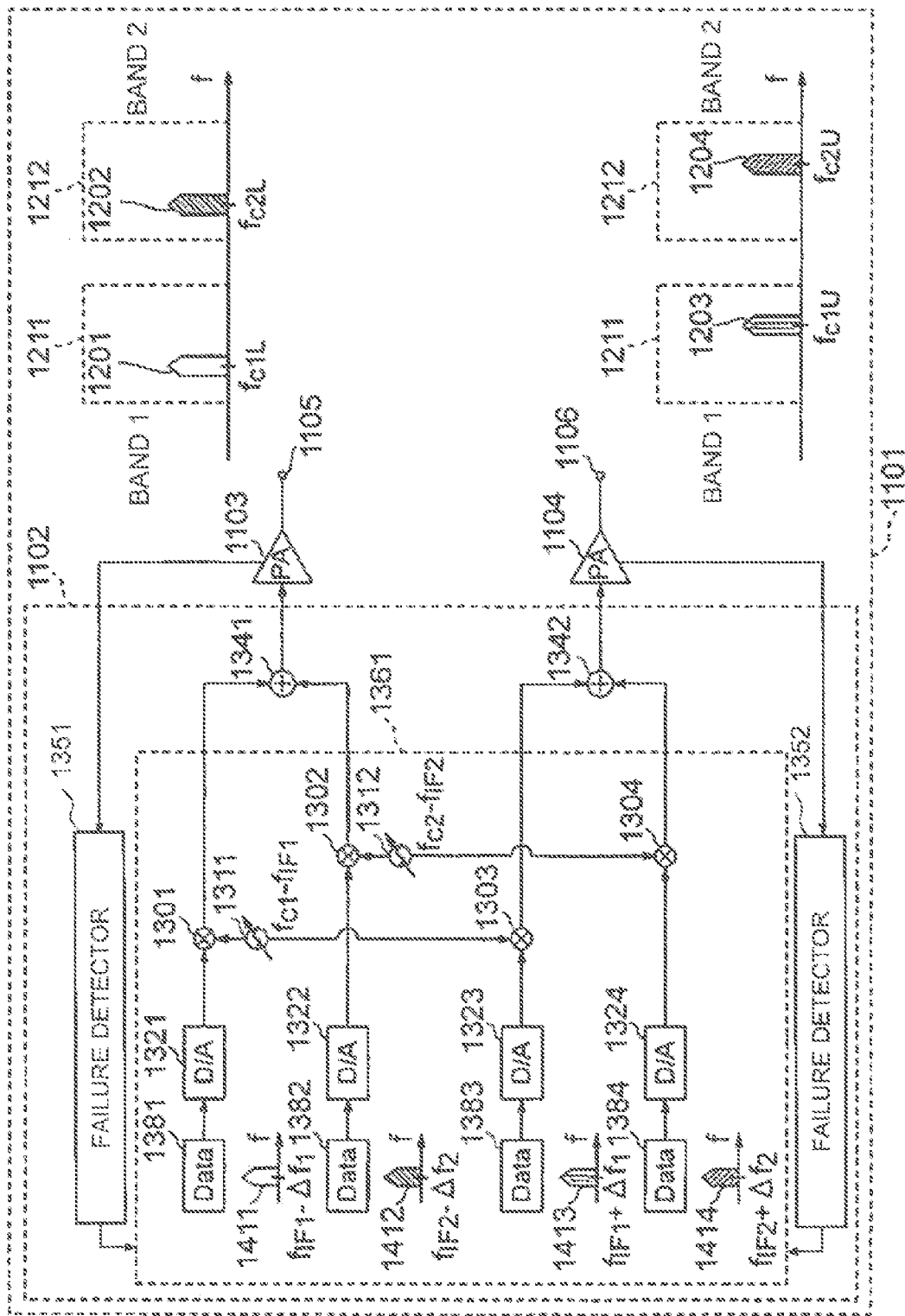

FIG. 18 is a block structural diagram illustrating a transmission device 1101 in the present fourth exemplary embodiment. In the present fourth exemplary embodiment of FIG. 18, the inner structure of the signal generator 1102 will be described in more detail.

In the present fourth exemplary embodiment, the digital baseband signal generation units 1331 to 1334 in the second exemplary embodiment are replaced by digital intermediate frequency signal generation units (hereinafter referred to as "digital IF (intermediate frequency) signal generation unit") 1381 to 1384. In addition, the variable LO signal generators 1313 and 1314 are removed, and an LO signal from the variable LO signal generator 1311 is input to the mixer 1303, whereas an LO signal from the variable LO signal generator 1312 is input to the mixer 1304.

In the structure of FIG. 18, the digital IF signal generation units 1381 to 1384 transmit digital IF signals 1411 to 1414 of each channel. The digital IF signals 1411 to 1414 are those generated by up-converting the digital baseband signals 1401 to 1404 into respective IF frequencies. For example, the digital IF signal 1411 is generated by up-converting the digital baseband signal 1401 into an IF frequency $f_{IF1}-\Delta f_1$. Likewise, the digital IF signal 1412 is generated by up-converting the digital baseband signal 1402 into an IF frequency $f_{IF2}-\Delta f_2$; the digital IF signal 1413 is generated by up-converting the digital baseband signal 1403 into an IF frequency $f_{IF1}+\Delta f_1$; and the digital IF signal 1414 is generated by up-converting the digital baseband signal 1404 into an IF frequency $f_{IF2}+\Delta f_2$, respectively.

The digital IF signals 1411 to 1414, respectively, are converted into analog IF signals in the digital/analog converters 1321 to 1324. The analog IF signals generated in the digital/analog converters 1321 and 1323 are up-converted into RF signals with the variable LO signal generator 1311 and the mixers 1301 and 1303. At this time, the RF signal 1201 is output from the mixer 1301, and the RF signal 1203 is output from the mixer 1303. Similarly, the analog IF signals generated in the digital/analog converters 1322 and 1324 are up-converted into RF signals with the variable LO signal generator 1312 and the mixers 1302 and 1304. At this time, the RF signal 1202 is output from the mixer 1302, and the RF signal 1204 is output from the mixer 1304.

The RF signals 1201 and 1202 are synthesized in the synthesizer 1341 and then simultaneously input to the broadband/multiband power amplifier 1103, followed by being amplified in the broadband/multiband power amplifier 1103 and then transmitted via the terminal 1105. In addition, the RF signals 1203 and 1204 are synthesized in the synthesizer 1342 and then simultaneously input to the broadband/multiband power amplifier 1104, followed by being amplified in the broadband/multiband power amplifier 1104 and then transmitted via the terminal 1106.

In the present fourth exemplary embodiment, the frequency of the LO signal output from the variable LO signal generator 1311 is set to $f_{c1}-f_{IF1}$. In addition, the frequency of the LO signal output from the variable LO signal generator 1312 is set to $f_{c2}-f_{IF2}$. At this time, the $f_{c1}$ is preferably set to a center frequency of the RF signals 1201 and 1203, i.e., $(f_{c1L}+f_{c1U})/2$. Additionally, the $f_{c2}$ is preferably set to a center frequency of the RF signals 1202 and 1204, i.e., $(f_{c2L}+f_{c2U})/2$. Furthermore, the frequency amount $\Delta f_1$ included in the IF frequencies is preferably set to ½ of a frequency difference between the RF signals 1201 and 1203, i.e., $(f_{c1U}-f_{c1L})/2$. Additionally, the frequency amount $\Delta f_2$ included in the IF frequencies is preferably set to ½ of a frequency difference between the RF signals 1202 and 1204, i.e., $(f_{c2U}-f_{c2L})/2$. With the above frequency setting, the frequencies of the RF signals 1201 to 1204, respectively, are set to desired values, i.e., $f_{c1L}$, $f_{c2L}$, $f_{c1U}$, and $f_{c2U}$, respectively.

In addition, $f_{IF1}$ and $f_{IF2}$ included in the IF frequencies may be set to arbitrary values. When $f_{IF1}$ and $f_{IF2}$ are set to high values, there is an advantage that a frequency difference between the desired RF signals 1201 to 1204 and undesired image frequency signals becomes large, which facilitates removal of the image frequency signals. On the other hand, when $f_{IF1}$ and $f_{IF2}$ are set to be low values, there is an advantage that an operation speed request of the digital/analog converters 1321 to 1324 can be mitigated. The values of the $f_{IF1}$ and $f_{IF2}$ are preferably set on the basis of the above advantages.

In order to remove image frequency signals generated by up-conversion in the mixers 1301 to 1304, a band pass filter may be set at output ports of the mixers 1301 to 1304.

The present fourth exemplary embodiment has an advantage that the number of the variable LO signal generators is reduced as compared to the second exemplary embodiment, thereby allowing circuit cost reduction and miniaturization.

Figure 19:
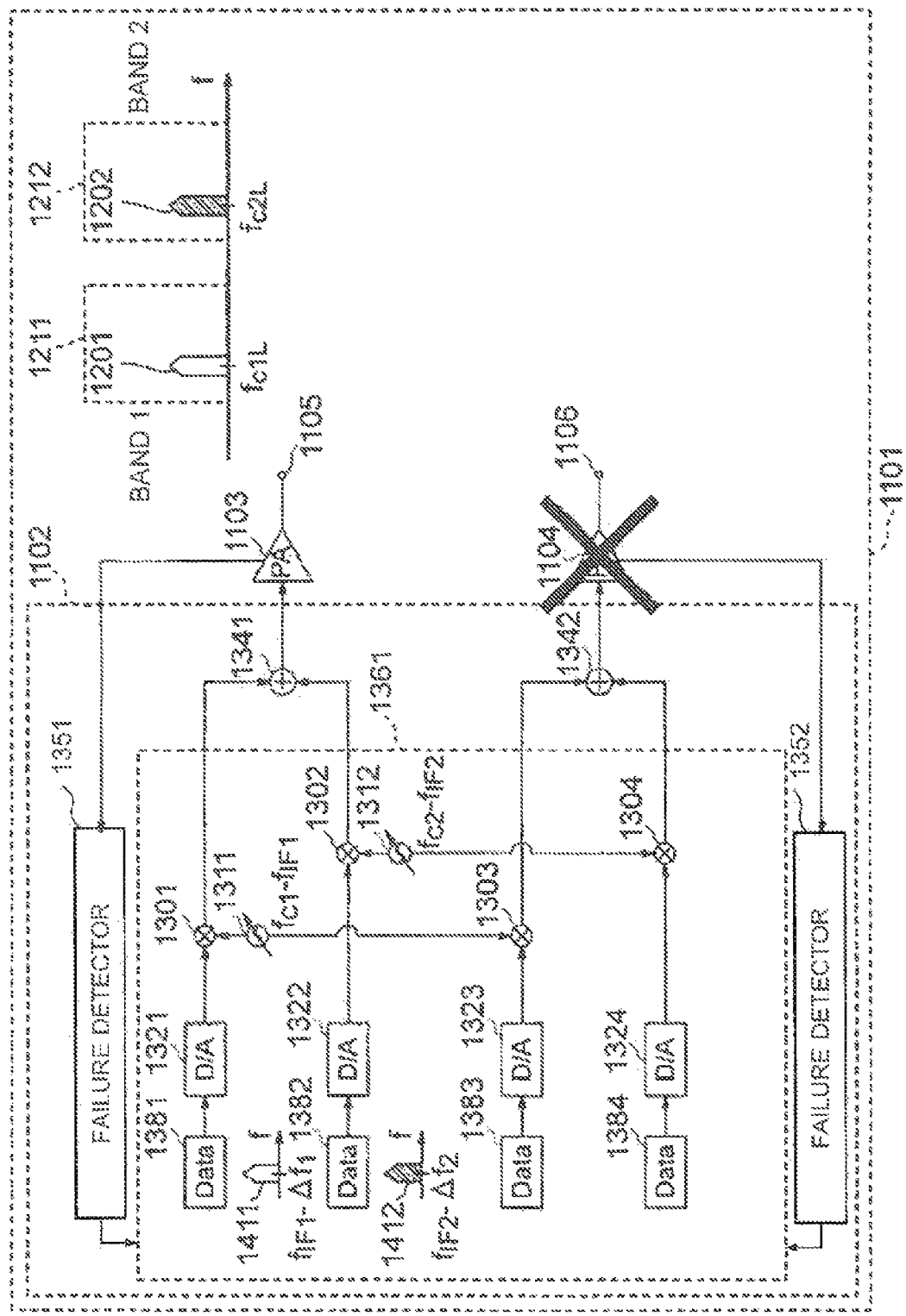
Figure 20:
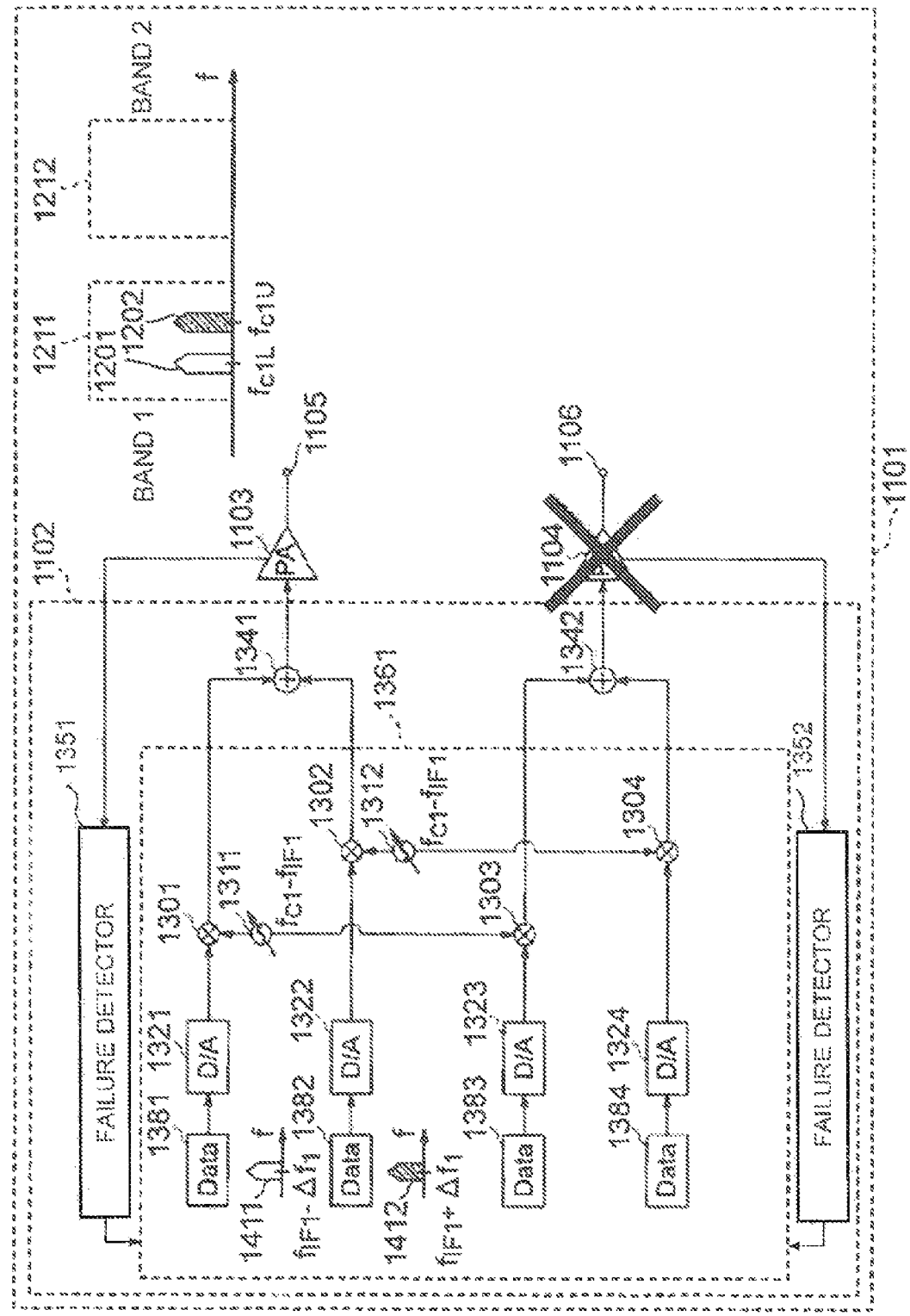
Figure 21:
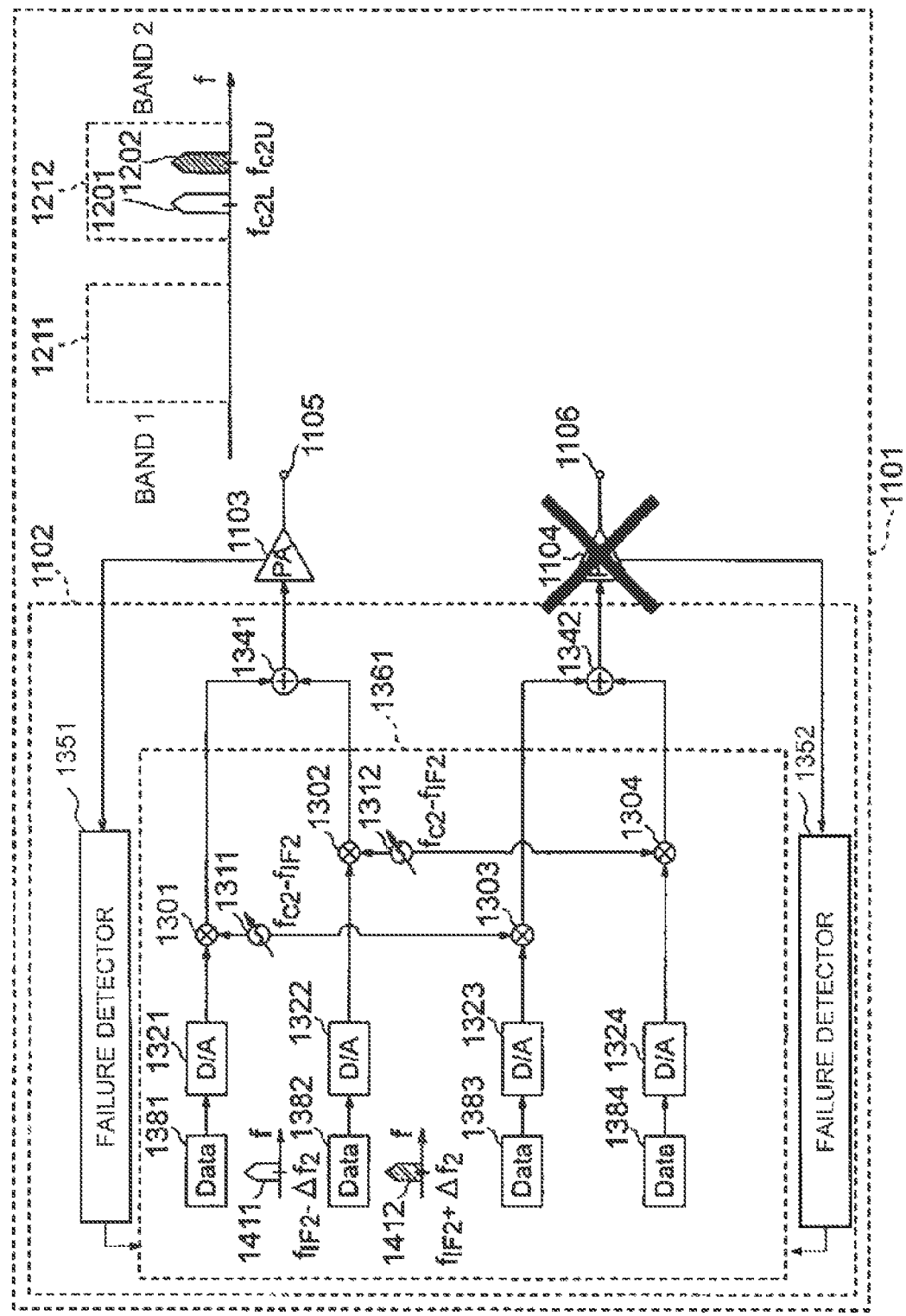

FIGS. 19 to 21 are diagrams each illustrating an example of operation in a case of failure of the broadband/multiband power amplifier 1104 in the present fourth exemplary embodiment. In FIGS. 19 to 21, the failure detector 1352 detects that the broadband/multiband power amplifier 1104 has failed.

At this time, in FIG. 19, the failure detector 1352 stops the operations of the digital IF signal generation units 1383 and 1384, the digital/analog converters 1323 and 1324, and the mixers 1303 and 1304. In addition, the variable LO signal generators 1311 and 1312 stop the supply of LO signals to the mixers 1303 and 1304. The above operation stops the generation of the RF signals 1203 and 1204.

In FIG. 20, the failure detector 1352 not only stops the generation of the RF signals 1203 and 1204 as illustrated in FIG. 19, but also changes an LO frequency output from the variable LO signal generator 1312 to $f_{c1}-f_{IF1}$ and an IF frequency of the digital IF signal 1412 to $f_{IF1}+\Delta f_1$, thereby changing the frequency of the RF signal 1202 to $f_{c1U}$ and using only the band 1211 for communication.

In FIG. 21, the failure detector 1352 not only stops the generation of the RF signals 1203 and 1204 as illustrated in FIG. 19, but also changes an LO frequency output from the variable LO signal generator 1311 to $f_{c2}-f_{IF2}$, an IF frequency of the digital IF signal 1411 to $f_{IF2}-\Delta f_2$, and an IF frequency of the digital IF signal 1412 to $f_{IF2}+\Delta f_2$, respectively, thereby changing the frequencies of the RF signals 1201 and 1202 to $f_{c2L}$ and $f_{c2U}$, respectively, and using only the band 1212 for communication.

In FIGS. 20 and 21, a band in a good communication state is selected from the bands 1211 and 1212 to be used for communication. The operations of FIGS. 19 to 21 in the present fourth exemplary embodiment correspond to the operations of FIGS. 5 to 7 in the first exemplary embodiment.

Fifth Exemplary Embodiment

Figure 22:
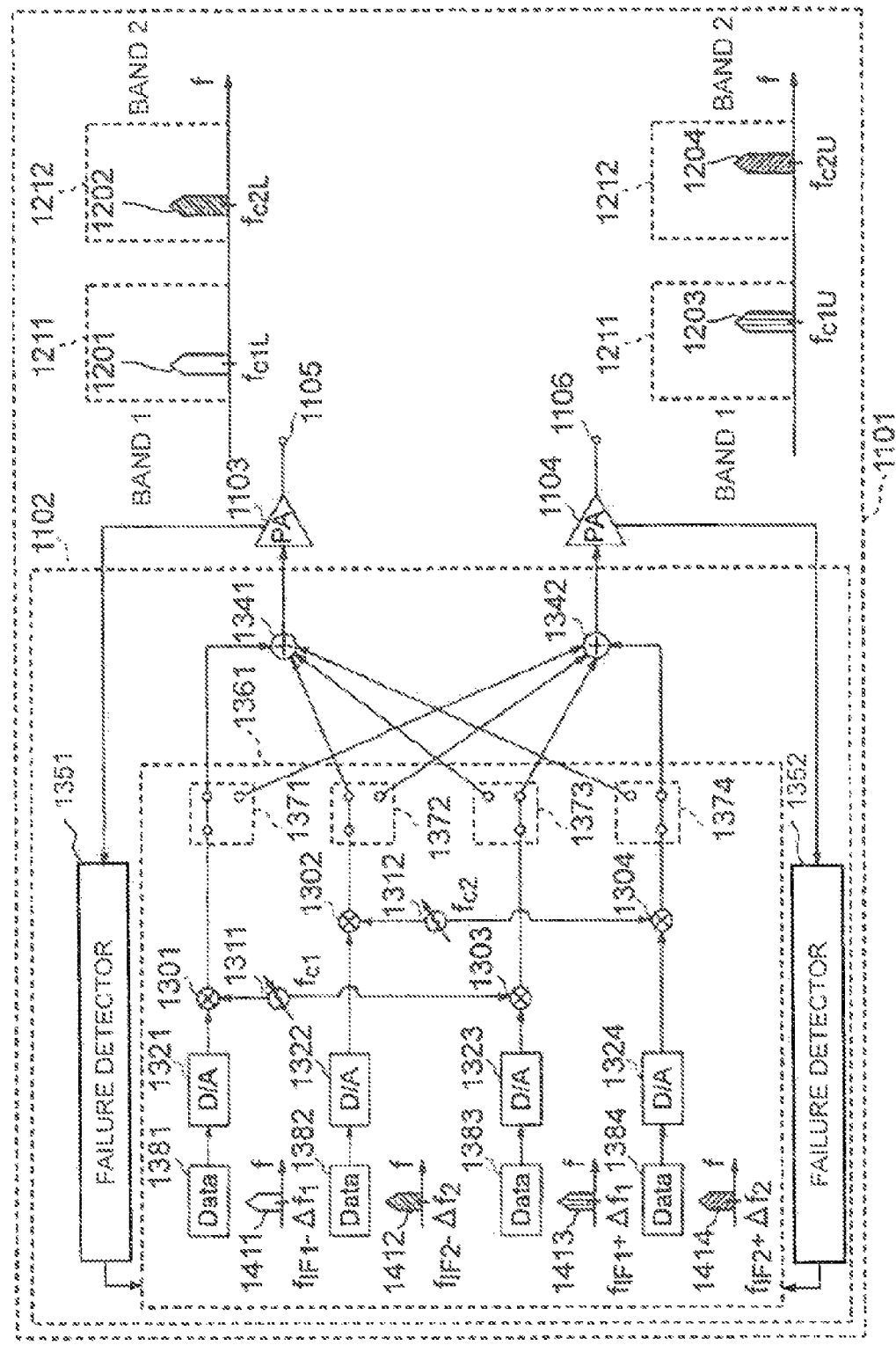

FIG. 22 is a block structural diagram illustrating a transmission device 1101 in the present fifth exemplary embodiment. In the present fifth exemplary embodiment of FIG. 22, the inner structure of the signal generator 1102 will be described in more detail.

In the present fifth exemplary embodiment of FIG. 22, the switches 1371 to 1374 are added to the fourth exemplary embodiment of FIG. 18. The present fifth exemplary embodiment of FIG. 22 is all the same as the fourth exemplary embodiment of FIG. 18, except for the addition of the switches 1371 to 1374.

As illustrated in the present fifth exemplary embodiment of FIG. 22, during non-failing normal operation, the switches 1371 and 1372 are set such that the output signals of the mixers 1301 and 1302 are input to the synthesizer 1341. In addition, the switches 1373 and 1374 are set such that the output signals of the mixers 1303 and 1304 are input to the synthesizer 1342. With the above setting of the switches, the RF signals 1201 and 1202 allocated in the bands 1211 and 1212 are input to the broadband/multiband power amplifier 1103. Additionally, the RF signals 1203 and 1204 allocated in the bands 1211 and 1212 are input to the broadband/multiband power amplifier 1104. The operation at this time corresponds to the operation of FIG. 4 in the first exemplary embodiment and the operation of FIG. 18 in the fourth exemplary embodiment.

The present fifth exemplary embodiment has an advantage that the number of the variable LO signal generators is reduced as compared to the third exemplary embodiment, thereby allowing circuit cost reduction and miniaturization.

Figure 23:
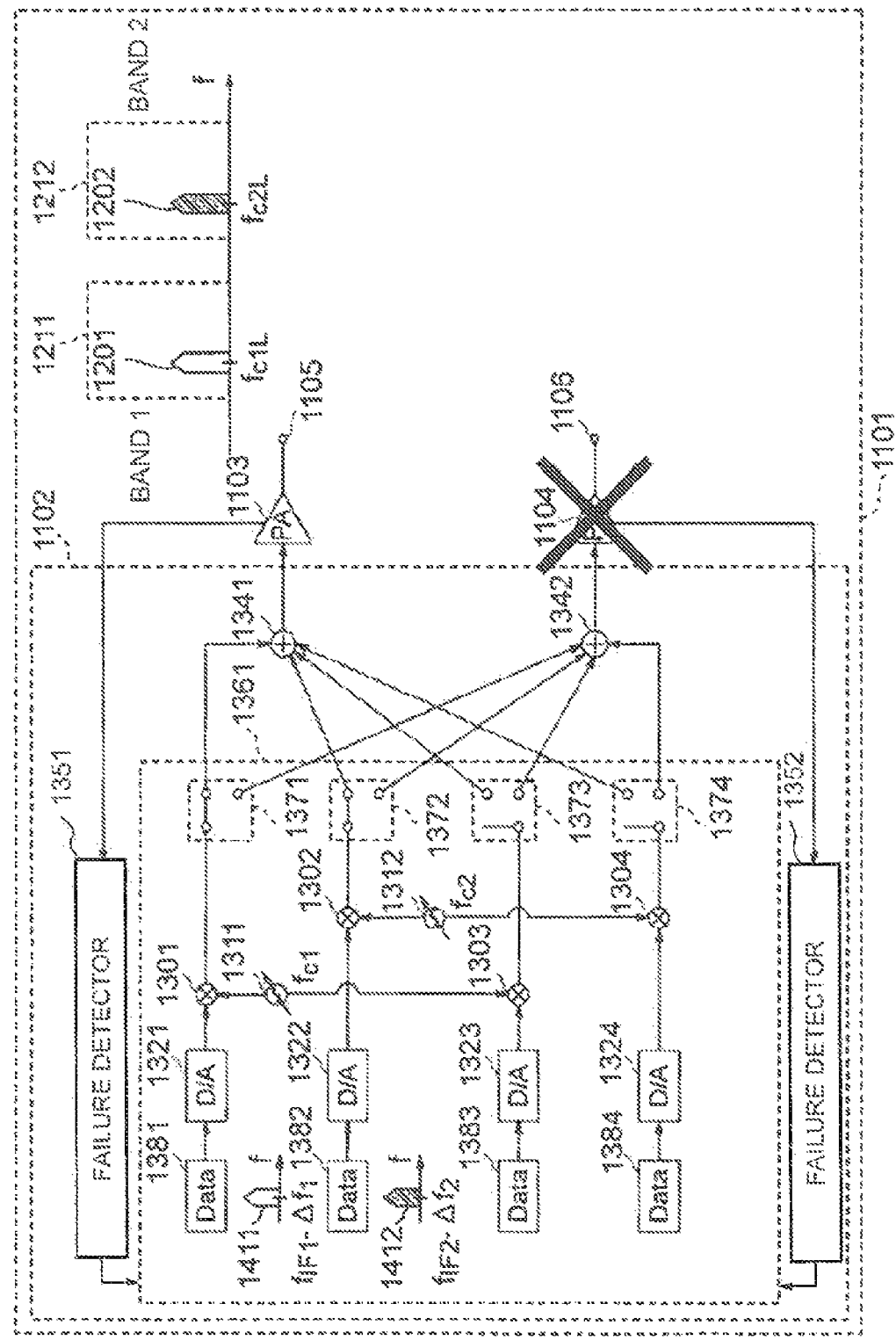
Figure 24:
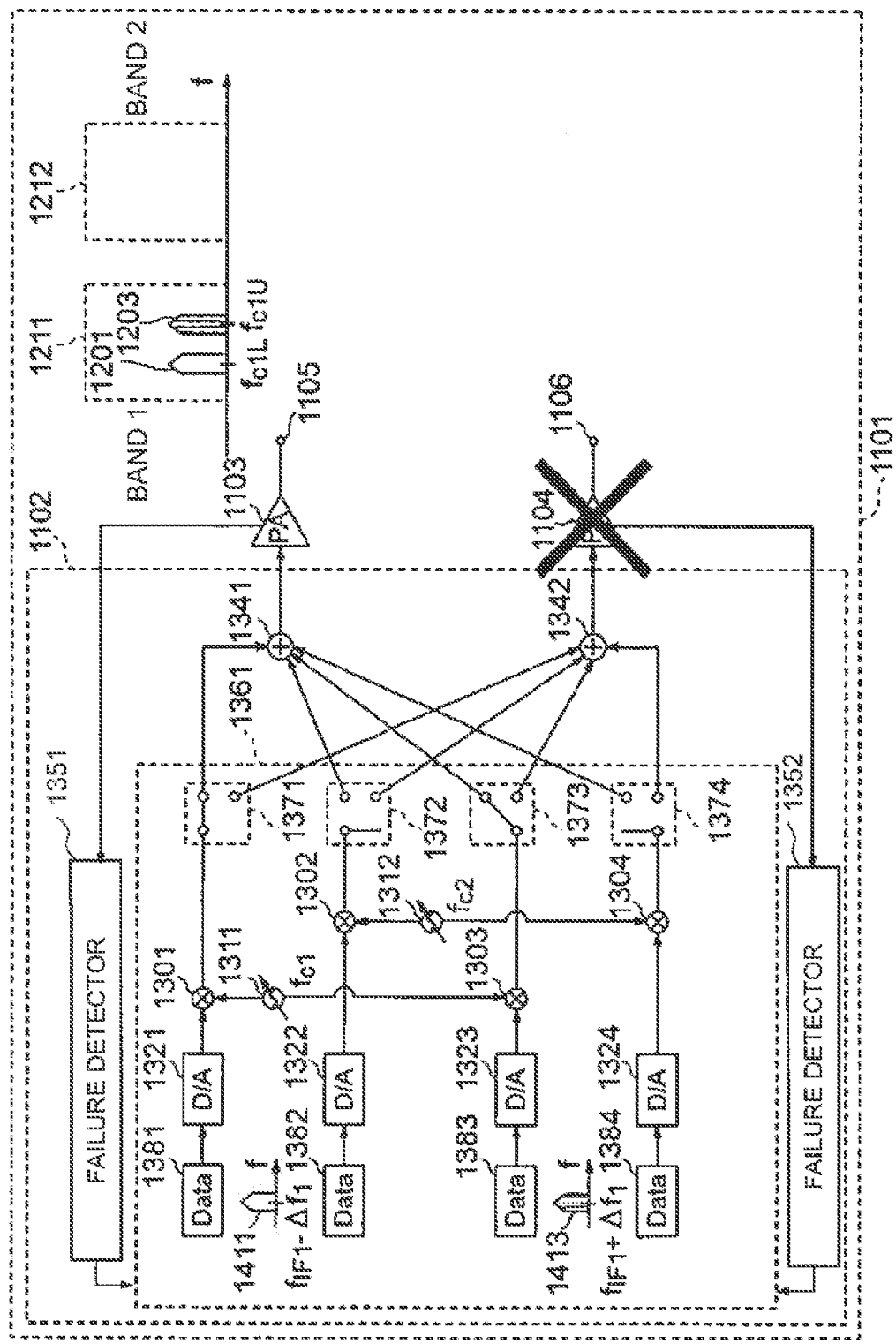
Figure 25:
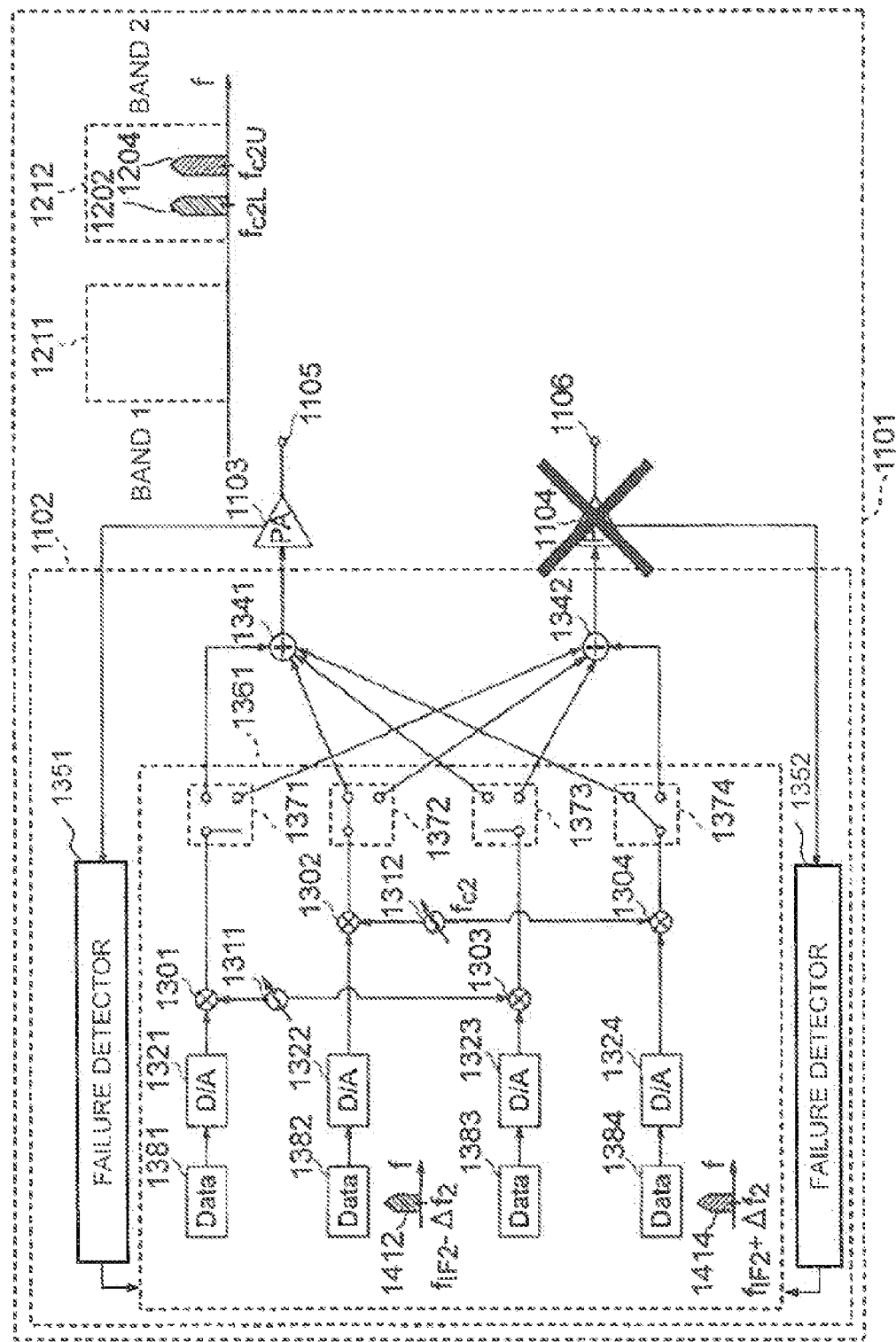

FIGS. 23 to 25 are diagrams each illustrating an example of operation in a case of failure of the broadband/multiband power amplifier 1104 in the present fifth exemplary embodiment. In FIGS. 23 to 25, the failure detector 1352 detects that the broadband/multiband power amplifier 1104 has failed At this time, in FIG. 23, the failure detector 1352 stops the operations of the digital IF signal generators 1383 and 1384, the digital/analog converters 1323 and 1324, and the mixers 1303 and 1304. In addition, the variable LO signal generators 1311 and 1312 stop the supply of LO signals to the mixers 1303 and 1304. The above operation stops the generation of the RF signals 1203 and 1204.

In FIG. 24, the failure detector 1352 stops the operations of the digital IF signal generators 1382 and 1384, the digital/analog converters 1322 and 1324, and the mixers 1302 and 1304. Additionally, the variable LO signal generators 1311 and 1312 stop the supply of LO signals to the mixers 1302 and 1304. Furthermore, the switches 1371 and 1373 are set such that the output signals of the mixers 1301 and 1303 are input to the synthesizer 1341. With the above setting of the switches, the RF signals 1201 and 1203 allocated in the band 1211 are input to the broadband/multiband power amplifier 1103.

In FIG. 25, the failure detector 1352 stops the operations of the digital IF signal generators 1381 and 1383, the digital/analog converters 1321 and 1323, and the mixers 1301 and 1303. In addition, the variable LO signal generators 1311 and 1312 stop the supply of LO signals to the mixers 1301 and 1303. Furthermore, the switches 1372 and 1374 are set such that the output signals of the mixers 1302 and 1304 are input to the synthesizer 1341. With the above setting of the switches, the RF signals 1202 and 1204 allocated in the band 1212 are input to the broadband/multiband power amplifier 1103.

In FIGS. 24 and 25, a band in a good communication state is selected from the bands 1211 and 1212 to be used for communication. The operations of FIGS. 23 to 25 in the present fifth exemplary embodiment correspond to the operations of FIGS. 5 to 7 in the first exemplary embodiment.

In the present fifth exemplary embodiment, the variable LO signal generators 1311 and 1312 may be replaced by fixed-frequency LO signal generators. The exemplary embodiments 1 to 5 may be used for either a base station device or a terminal device (a mobile station device).

Sixth Exemplary Embodiment

Figure 26:
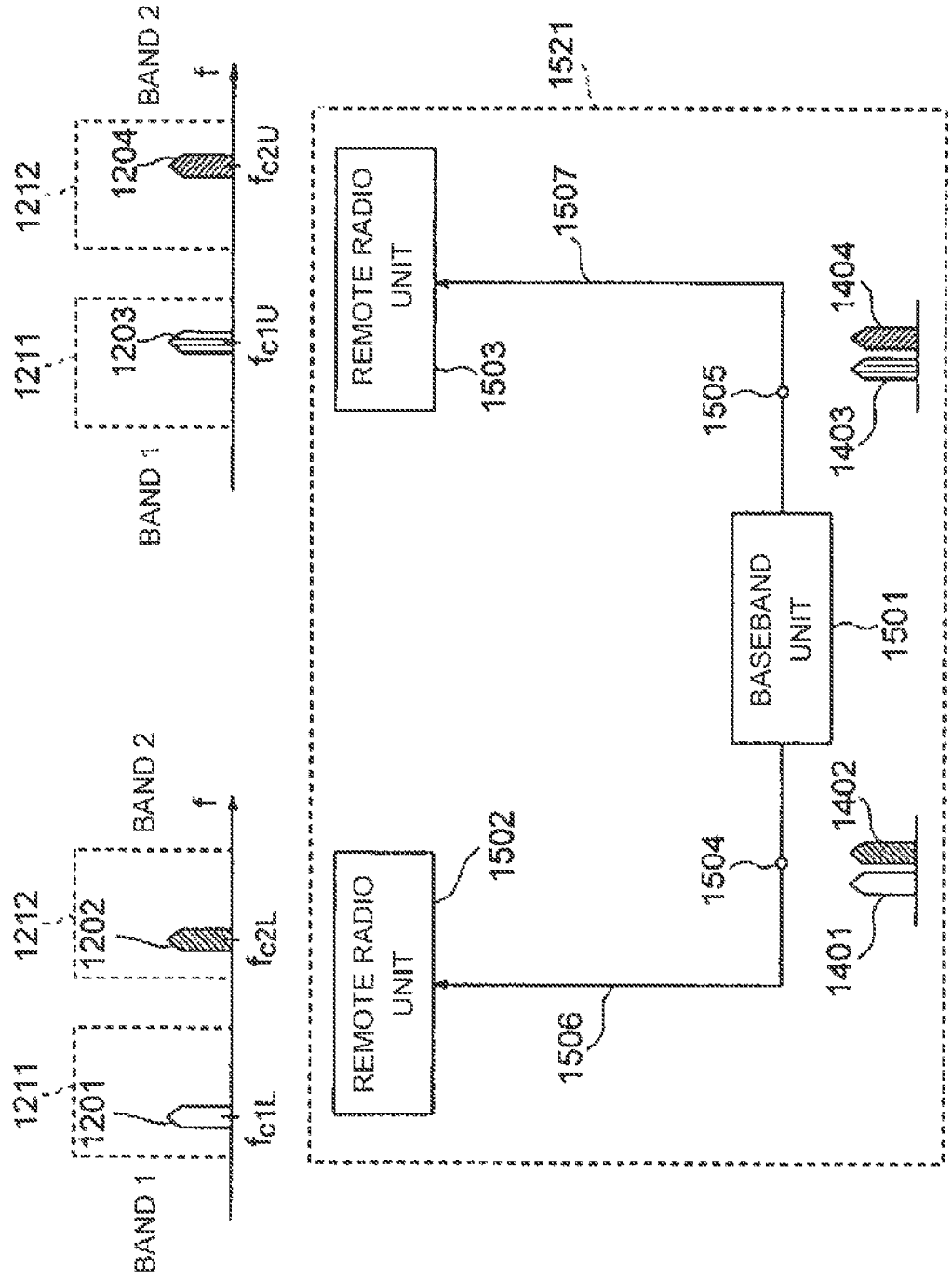

FIG. 26 is a block structural diagram illustrating a transmission device 1521 in the present sixth exemplary embodiment. An example illustrated in FIG. 26 is a transmission device in which a concept of the present sixth exemplary embodiment has been applied to a distribution-type base station device.

The transmission device 1521 in the present sixth exemplary embodiment of FIG. 26 is configured by including a baseband unit 1501, remote radio units 1502, 1503, and optical fibers 1506, 1507. The baseband unit 1501 and the remote radio unit 1502 are connected by the optical fiber 1506 via the terminal 1504, and the baseband unit 1501 and the remote radio unit 1503 are connected by the optical fiber 1507 via the terminal 1505. The baseband unit 1501 transmits the digital baseband signals 1401 and 1402 to the remote radio 1502 via the terminal 1504 and the optical fiber 1506. In addition, the baseband unit 1501 transmits the digital baseband signals 1403 and 1404 to the remote radio unit 1503 via the terminal 1505 and the optical fiber 1507. The remote radio unit 1502 up-converts (frequency-converts) the digital baseband signals 1401 and 1402 received from the baseband unit 1501 into the RF signal 1201 in the band 1211 and the RF signal 1202 in the band 1212, respectively, and performs transmission by using the RF signals 1201 and 1202. Similarly, the remote radio unit 1503 up-converts (frequency-converts) the digital baseband signals 1403 and 1404 received from the baseband unit 1501 into the RF signal 1203 in the band 1211 and the RF signal 1204 in the band 1212, respectively, and performs transmission by using the RF signals 1203 and 1204.

Figure 27:
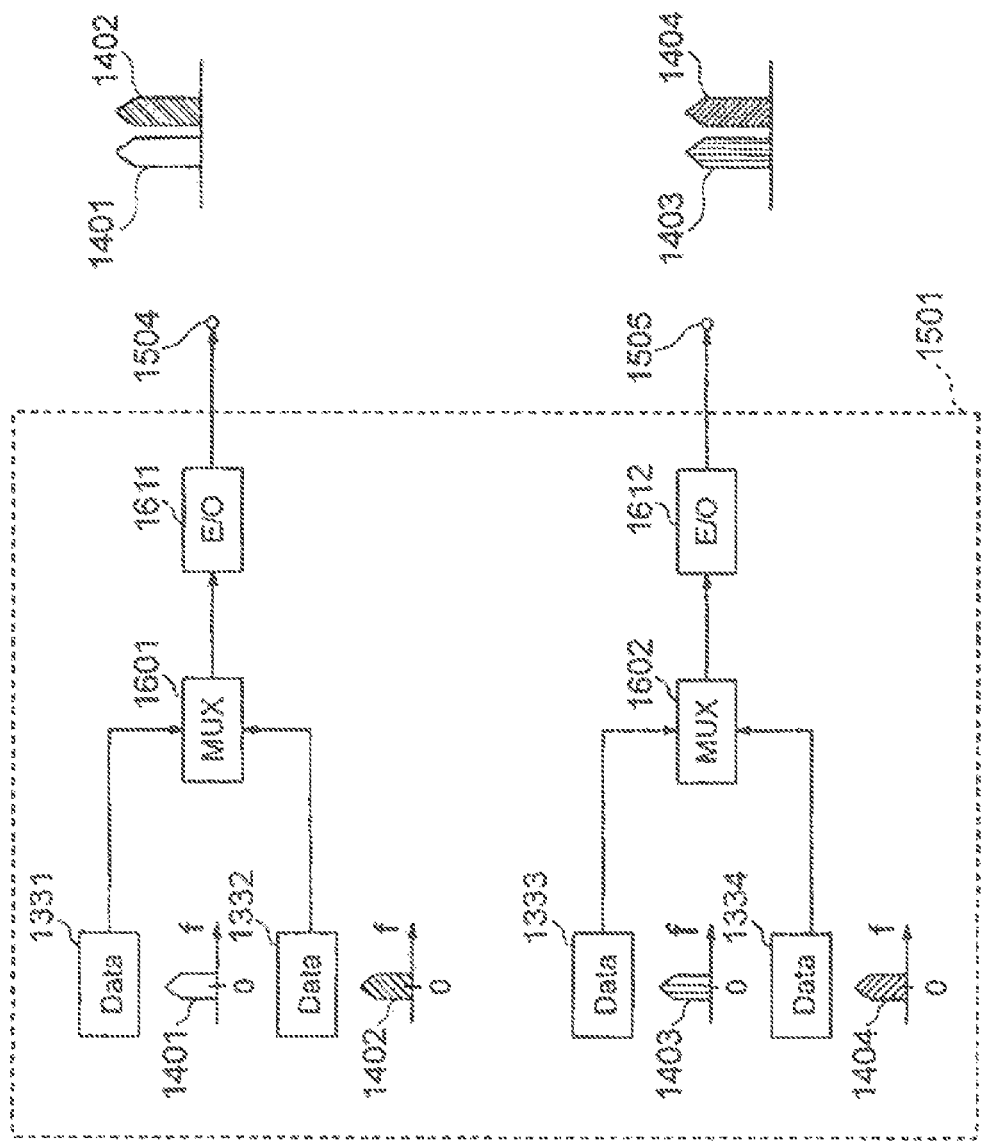

FIG. 27 is a block structural diagram illustrating an inner structure of the baseband unit 1501. As illustrated in FIG. 27, the baseband unit 1501 is configured by including the digital baseband signal generation units 1331 to 1334, multiplexers (MUX) 1601, 1602, and electrical-to-optical converters (E/O) 1611, 1612. The digital baseband signal generation unit 1331 generates a digital baseband signal 1401, and the digital baseband signal generation unit 1332 generates a digital baseband signal 1402. The digital baseband signals 1401 and 1402 are aggregated into a single signal in the multiplexer 1601, then converted into an optical signal that can be transmitted by the optical fiber in the electrical-to-optical converter 1611, and then transmitted to the terminal 1504. Similarly, the digital baseband signal generation unit 1333 generates a digital baseband signal 1403, and the digital baseband signal generation unit 1334 generates a digital baseband signal 1404. The digital baseband signals 1403 and 1404 are aggregated into a single signal in the multiplexer 1602, then converted into an optical signal that can be transmitted by the optical fiber in the electrical-to-optical converter 1612, and then transmitted to the terminal 1505.

Figure 28:
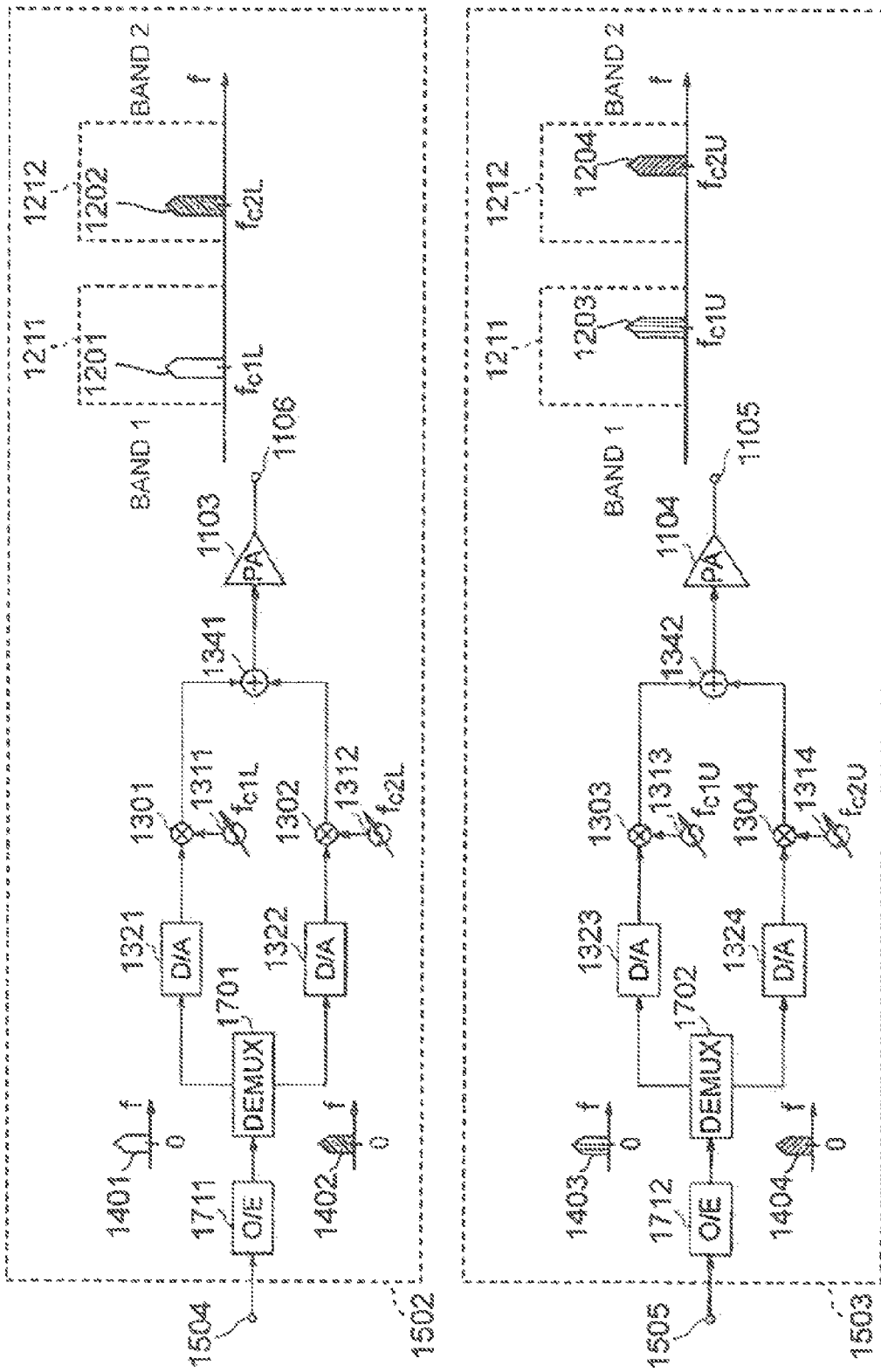

FIG. 28 is a block diagram illustrating inner structures of the remote radio units 1502 and 1503. The remote radio unit 1502 is configured by including an optical-to-electrical converter (O/E) 1711, a demultiplexer (DEMUX) 1701, the digital/analog converters 1321 and 1322, the mixers 1301 and 1302, the variable LO signal generators 1311 and 1312, the synthesizer 1341, and the broadband/multiband power amplifier 1103. In addition, the remote radio unit 1503 is configured by including an optical-to-electrical converter (O/E) 1712, a demultiplexer (DEMUX) 1702, the digital/ analog converters 1323 and 1324, the mixers 1303 and 1304, the variable LO signal generators 1313 and 1314, the synthesizer 1342, and the broadband/multiband power amplifier 1104.

In the structure of the remote radio unit 1502 illustrated in FIG. 28, the digital baseband signals 1401 and 1402 input via the terminal 1504 are converted from the optical signal to an electrical signal in the optical-to-electrical converter 1711. The demultiplexer 1701 separates the signal into the digital baseband signals 1401 and 1402, then outputs the digital baseband signal 1401 to the digital/analog converter 1321, and outputs the digital baseband signal 1402 to the digital/analog converter 1322. The digital baseband signal 1401 is up-converted into the RF signal 1201 with the carrier frequency $f_{c1L}$ in the mixer 1301 and the variable LO signal generator 1311. The digital baseband signal 1402 is up-converted into the RF signal 1202 with the carrier frequency $f_{c2L}$ in the mixer 1302 and the variable LO signal generator 1312. The RF signals 1201 and 1202 are synthesized in the synthesizer 1341 and then simultaneously input to the broadband/multiband power amplifier 1103. The RF signals 1201 and 1202 are amplified in the broadband/multiband power amplifier 1103 and then transmitted via the terminal 1105.

The same processing as in the remote radio unit 1502 is performed also in the remote radio unit 1503 illustrated in FIG. 28, whereby the RF signal 1203 with the carrier frequency $f_{c1U}$ and the RF signal 1204 with the carrier frequency $f_{c2U}$ are transmitted via the terminal 1106.

The present sixth exemplary embodiment is characterized in that at least one of the plurality of remote radio units provided in the transmission device 1521 simultaneously transmits a plurality of RF signals allocated in at least two different bands in the plurality of bands. The above characteristics are essentially the same as the characteristics of the first exemplary embodiment in which the plurality of RF signals allocated in the at least two different bands among the plurality of bands are simultaneously input to at least one of the plurality of broadband/multiband power amplifiers provided in the transmission device 1101 and those RF signals are simultaneously transmitted. Accordingly, the present sixth exemplary embodiment can provide the same advantages as those of the first exemplary embodiment.

Seventh Exemplary Embodiment

Figure 29:
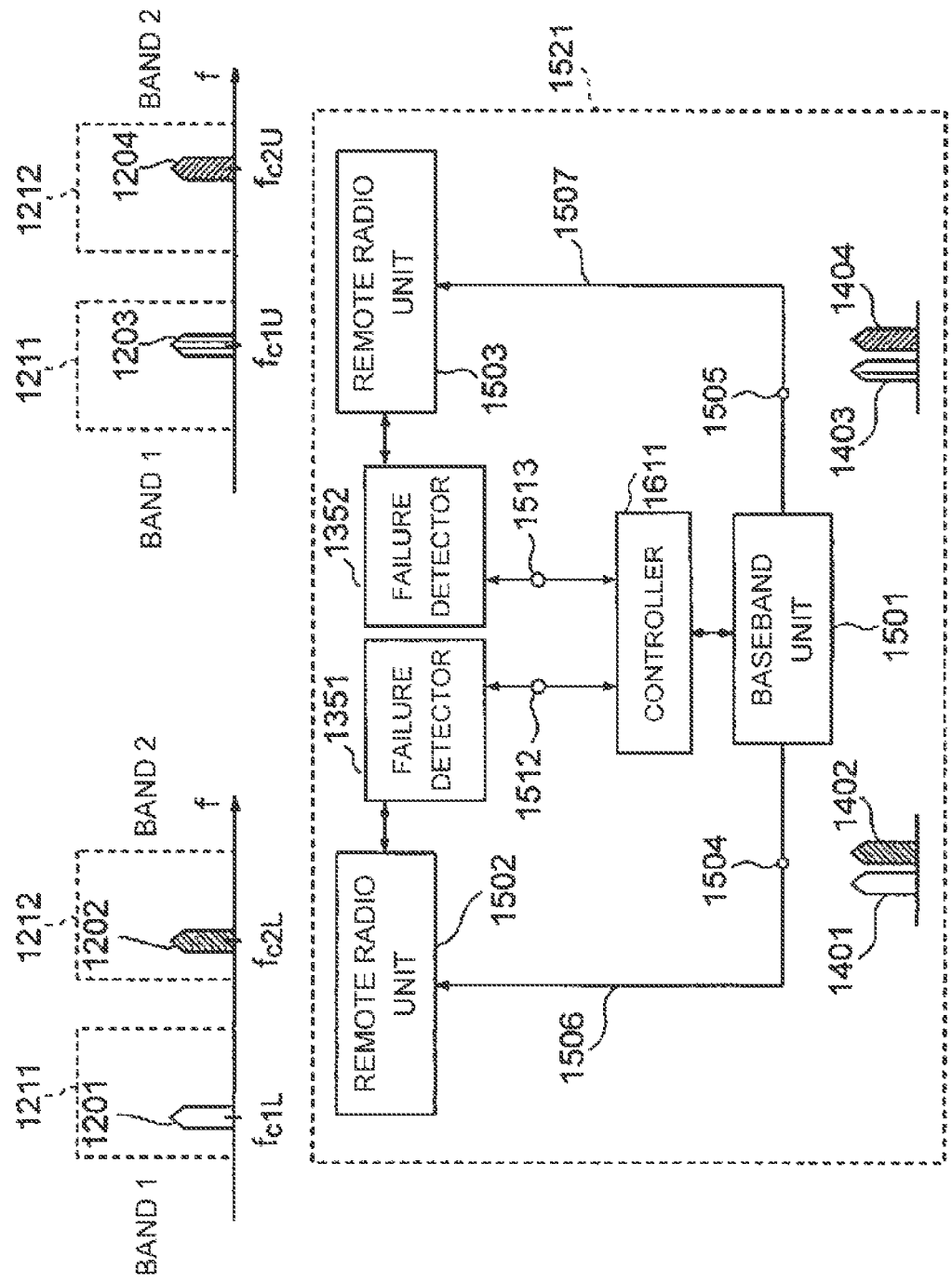

FIG. 29 is a block structural diagram illustrating a transmission device 1521 in the present seventh exemplary embodiment. In the present seventh exemplary embodiment of FIG. 29, failure detection functions for the remote radio units and a function of control in the event of failure have been added to the sixth exemplary embodiment.

In the transmission device 1521 in the present seventh exemplary embodiment illustrated in FIG. 29, the failure detectors 1351, 1352 and a controller 1511 have been added to the transmission device 1521 in the sixth exemplary embodiment of FIG. 26. The failure detector 1351 is connected to the controller 1511 via a terminal 1512, and the failure detector 1352 is connected to the controller 1511 via a terminal 1513. The failure detector 1351 has a function of detecting failure of the remote radio unit 1502 to notify the controller 1511 of a failure state and also control operation of the remote radio unit 1502. The failure detector 1352 has a function of detecting failure of the remote radio unit 1503 to notify the controller 1511 of a failure state and also control operation of the remote radio unit 1503. In addition, the controller 1511 has a function of controlling the baseband unit 1501 and the failure detectors 1351 and 1352 according to the failure states notified from the failure detectors 1351 and 1352.

Figure 30:
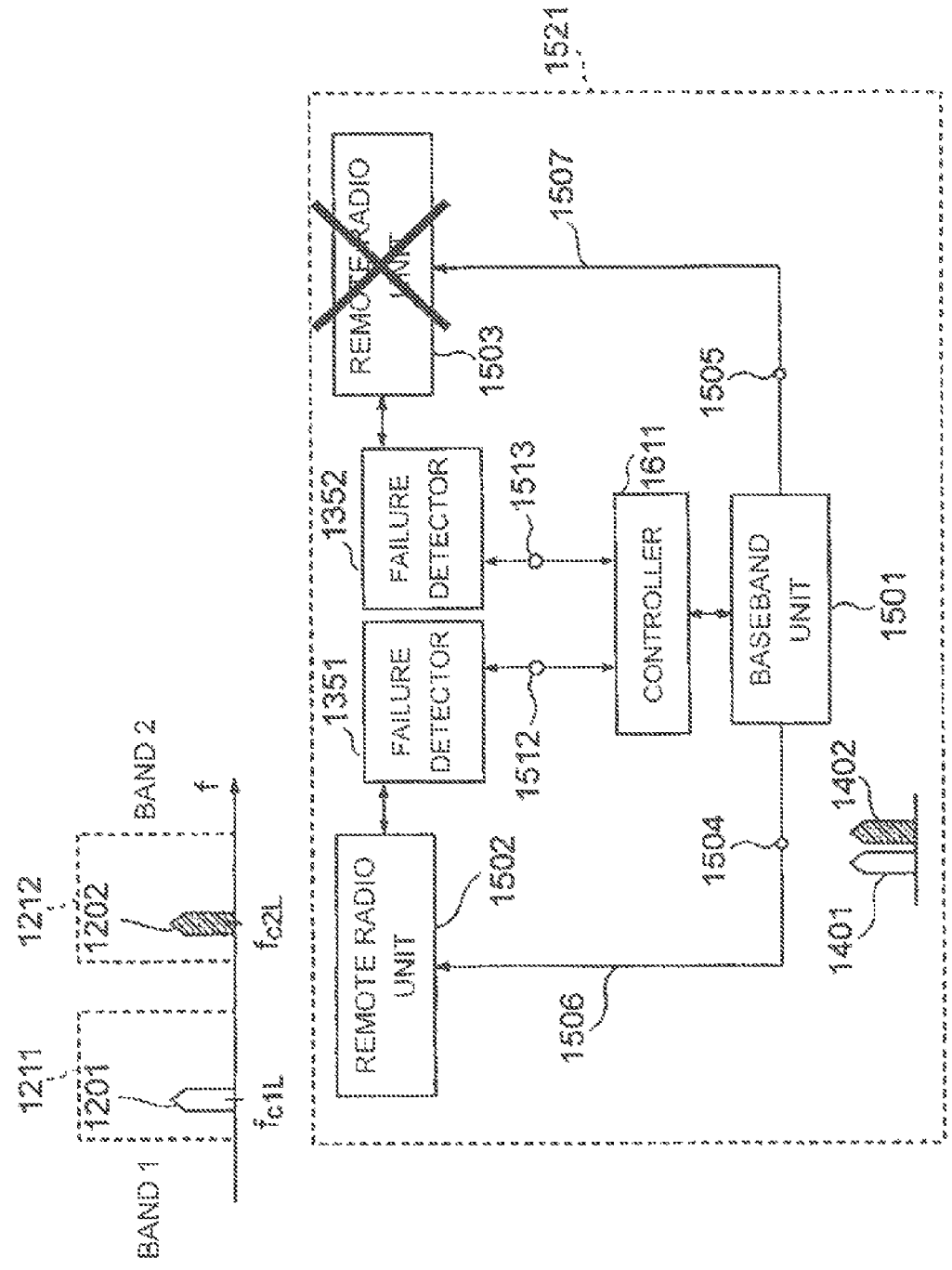
Figure 31:
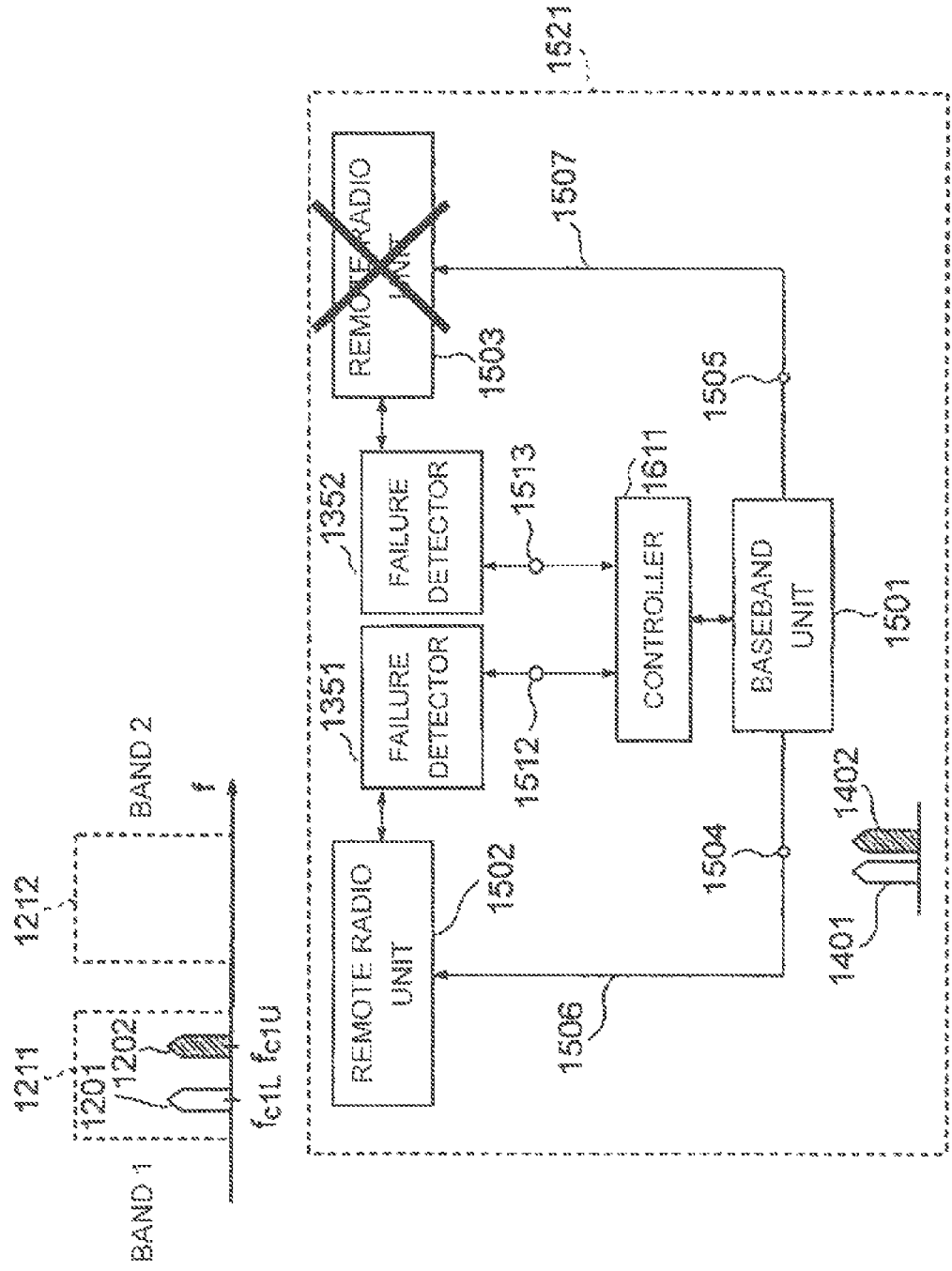
Figure 32:
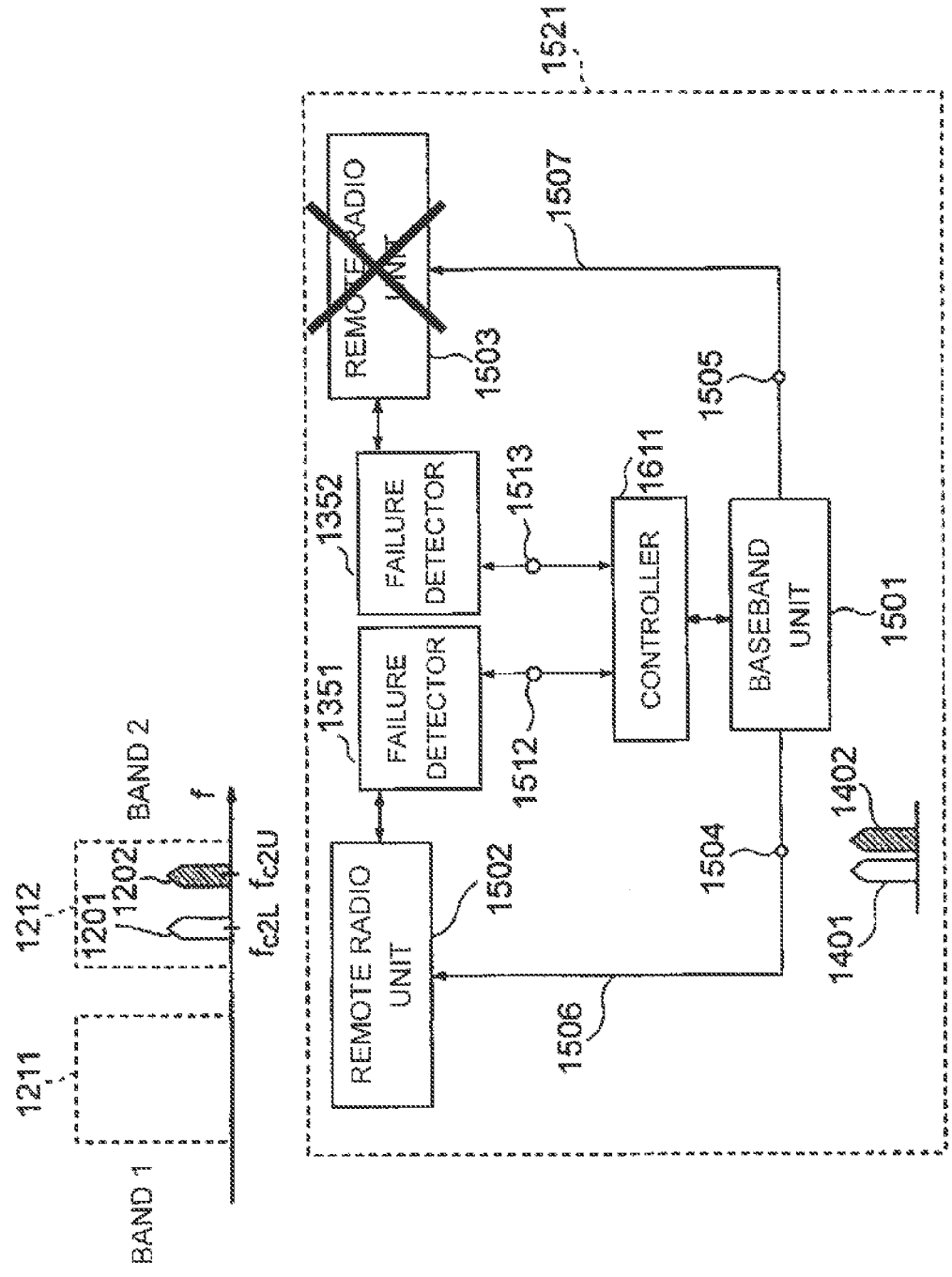

FIGS. 30 to 32 are diagrams each illustrating an example of operation in a case of failure of the remote radio unit 1503 in the present seventh exemplary embodiment. In FIGS. 30 to 32, the failure detector 1352 detects that the remote radio unit 1503 has failed.

At this time, in FIG. 30, the failure detector 1352 stops the operation of the remote radio unit 1503. In addition, the failure detector 1352 notifies the controller 1511 that the remote radio unit 1503 has failed. The controller 1511 receives the notification of the failure of the remote radio unit 1503 and stops the operations of the digital baseband signal generation units 1333 and 1334, the multiplexer 1602, and the electrical-to-optical converter 1612 in the baseband unit 1501 (FIG. 27) to stop the transmission of the digital baseband signals 1403 and 1404 from the baseband unit 1501.

In FIG. 31, the failure detector 1352 not only stops the operation of the remote radio unit 1503 and the transmission of the digital baseband signals 1403 and 1404 from the baseband unit 1501, but also changes an LO frequency output from the variable LO signal generator 1312 in the remote radio unit 1502 (FIG. 28) from $f_{c2L}$ to $f_{c1U}$ to thereby change the frequency of the RF signal 1202 from $f_{c2L}$ to $f_{c1U}$ and use only the band 1211 for communication.

In FIG. 32, the failure detector 1352 not only stops the operation of the remote radio unit 1503 and the transmission of the digital baseband signals 1403 and 1404 from the baseband unit 1501, but also changes an LO frequency output from the variable LO signal generator 1311 in the remote radio unit 1502 (FIG. 28) from $f_{c1L}$ to $f_{c2L}$ and an LO frequency output from the variable LO signal generator 1312 from $f_{c2L}$ to $f_{c2U}$ to thereby change the frequency of the RF signal 1201 from $f_{c1L}$ to $f_{c2L}$ and the frequency of the RF signal 1202 from $f_{c2L}$ to $f_{c2U}$ and use only the band 1212 for communication.

In FIGS. 31 and 32, a band in a good communication state is selected from the bands 1211 and 1212 to be used for communication. The operations of FIGS. 30 to 32 in the present seventh exemplary embodiment correspond to the operations of FIGS. 5 to 7 in the first exemplary embodiment.

In the second exemplary embodiment, since the broadband/multiband power amplifiers 1103 and 1104 are housed in the same transmission device 1101, the broadband/multiband power amplifiers 1103 and 1104 can be simultaneously broken in the event of disaster. On the other hand, in the present seventh exemplary embodiment, the broadband/multiband power amplifiers 1103 and 1104 are housed in the different remote radio units 1502 and 1503. Accordingly, specifically, the broadband/multiband power amplifier 1103 is housed in the remote radio unit 1502, and the broadband/multiband power amplifier 1104 is housed in the remote radio unit 1503. This is advantageous in that there is less risk of simultaneous breakage of the power amplifiers in the event of disaster.

In the exemplary embodiments 6 and 7, the connections between the baseband unit 1501 and the remote radio units 1502, 1503 may be made using radio communication instead of the optical fibers 1506 and 1507. Although the optical fibers can be disconnected in the event of disaster, radio communication reduces the risk of disconnection.

The transmission devices according to the present invention have the following advantages as compared to the transmission devices disclosed in PTL 1 to PTL 3.

In the cases of the transmitters described in PTL 1 and PTL 3, there has been the problem where when one of the power amplifiers or transmitters fails, it is impossible to perform communication in a band to which the power amplifier or transmitter is assigned. Meanwhile, in the case of the transmission device according to each exemplary embodiment of the present invention, there can be obtained the advantages that even when one of the power amplifiers fails, communication can be continued by the RF signals allocated in the plurality of bands or the number of the bands usable for communication is not reduced; and even when one of the power amplifiers fails, communication can be performed by selecting a band that allows good communication from the plurality of the bands.

In the case of the transmitter described in PTL 2, there has been the problem where when any one of the transmission amplifiers fails, transmission to the sector to which the transmission amplifier is assigned is completely shut off. Meanwhile, in the case of the transmission device of each exemplary embodiment of the present invention, the RF signals with the different frequencies are allocated to the different broadband/multiband power amplifiers. Thus, the different broadband/multiband power amplifiers can be assigned to transmission to the same sector. As a result, there can be obtained the advantage that even when one of the broadband/multiband power amplifiers fails, transmission to the sector can be continued by a non-failing one of the broadband/multiband power amplifiers.

In the case of the transmitter described in PTL 3, there has been the problem where when any one of the transmission amplifiers fails, the communication distance of the transmission device is reduced, which makes it impossible to communicate with a user distant from the transmission device. Meanwhile, in the case of the transmission device of each exemplary embodiment of the present invention, even when any one of the transmission amplifiers fails, transmission power per RF signal does not change and, accordingly, communication distance is not reduced, although communication speed is lowered due to the reduced number of the RF signals used for transmission. Thus, there can be obtained the advantage that communication with a user distant from the transmission device can be continued.

In the case of the transmitter described in PTL 3, there has been the problem where there is the trade-off between the number of the RF signals to be transmitted and PAPR and the only way to reduce PAPR to improve output power and power efficiency is to reduce the number of the RF signals to lower communication speed. Meanwhile, in the case of the transmission device of each exemplary embodiment of the present invention, the trade-off between the number of the RF signals to be transmitted and PAPR is eliminated. Thus, there can be obtained the advantage that both high-speed communication, and improvement in output power and power efficiency can be achieved simultaneously.

Hereinabove, the structures of the preferable exemplary embodiments of the present invention have been described. However, the contents disclosed in each piece of the Patent literature and the like described above can be incorporated into the invention by reference. The exemplary embodiments and the examples can be changed or adjusted within the scope of the entire disclosure of the invention (including the claims) and on the basis of the basic technical idea thereof. Furthermore, various combinations or selections of any various disclosed elements can also be made within the scope of the claims of the invention. In other words, it is obvious that the invention includes any variations and modifications that may be made by those skilled in the art on the basis of the entire disclosure including the claims and the technical idea.

Parts or the whole of the above-described exemplary embodiments may be described as in the following supplementary notes, but the present invention is not limited thereto.

[Supplementary Note 1] A transmission device including:
a signal generator for converting baseband signals of a plurality of channels into a plurality of RF signals allocated in a plurality of discrete bands to output the RF signals; and
the same number of power amplifiers as the number of the bands, wherein
at least one of the power amplifiers simultaneously amplifies a plurality of RF signals allocated in at least two different bands among the bands, and
the transmission device performs transmission by simultaneously using the plurality of RF signals belonging to the plurality of discrete bands.

[Supplementary Note 2] The transmission device according to the Supplementary Note 1,
wherein the signal generator includes a failure detector for detecting the presence or absence of failure of the power amplifiers, and
when the failure detector detects failure of one of the power amplifiers, the failure detector controls the signal generator so as to stop the output of the RF signals to the power amplifier.

[Supplementary Note 3] The transmission device according to the Supplementary Note 2,
wherein when the failure detector detects failure of one of the power amplifiers, the failure detector controls the signal generator so as to output the RF signals of the plurality of bands to a non-failing power amplifier that is a power amplifier not in failure in the power amplifiers,
the non-failing power amplifier amplifies the RF signals and then transmits the amplified RF signals, and
the signal generator receives a reception state notification from a reception apparatus that receives the RF signals transmitted from the transmission device, and, based on the notification, selects a best band that is a band in a best communication state to switch frequencies of the RF signals to be output to the non-failing power amplifier to frequencies belonging to the best band.

[Supplementary Note 4] The transmission device according to the Supplementary Note 1,
wherein the signal generator includes the same numbers of digital baseband signal generation units, digital/analog converters, mixers, and variable local oscillator signal generators as the number of the channels, and the same number of synthesizers as the number of the bands,
each of the digital baseband signal generation units outputs a digital baseband signal of each channel,
each of the digital/analog converters converts the digital baseband signal of each channel into each analog baseband signal,
the mixers and the variable local oscillator signal generators up-convert the each analog baseband signal into each of the RF signals, and
the synthesizer synthesizes the RF signals to be input to each of the power amplifiers and then outputs to the power amplifiers.

[Supplementary Note 5] The transmission device according to the Supplementary Note 4,
wherein the signal generator includes a failure detector for detecting the presence or absence of failure of the power amplifiers, and when the failure detector detects failure of one of the power amplifiers, the failure detector stops operations of the digital baseband signal generation units, the digital/analog signal converters, the mixers, and the variable local oscillator signal generators that are involved in the generation of the RF signals to be output to the one of the power amplifiers, so as to stop the output of the RF signals to the one of the power amplifiers.

[Supplementary Note 6] The transmission device according to the Supplementary Note 1, wherein the signal generator includes the same numbers of digital intermediate frequency signal generation units, digital/analog converters, and mixers as the number of the channels and the same numbers of variable local oscillator signal generators and synthesizers as the number of the bands, each of the digital intermediate frequency signal generation units outputs a digital intermediate frequency signal generated by up-converting the digital baseband signal of each channel into each intermediate frequency, each of the digital/analog converters converts the digital intermediate frequency signal of each channel into each analog intermediate frequency signal, the mixers and the variable local oscillator signal generators up-convert the each analog intermediate frequency signal into each of the RF signals belonging to each of the bands, and the synthesizers synthesize the RF signals to be input to each of the power amplifiers and then output to the power amplifiers.

[Supplementary Note 7] The transmission device according to the Supplementary Note 6, wherein the signal generator includes a failure detector for detecting the presence or absence of failure of the power amplifiers, and when the failure detector detects failure of one of the power amplifiers, the failure detector stops operations of the digital intermediate frequency signal generation units, the digital/analog converters, the mixers, and the variable local oscillator signal generators that are involved in the generation of the RF signals to be output to the power amplifier, so as to stop the output of the RF signals to the power amplifier.

[Supplementary Note 8] The transmission device according to the Supplementary Note 5 or 7, wherein when the failure detector detects failure of one of the power amplifiers, the failure detector sets frequencies of local oscillator signals to be output from the variable local oscillator signal generators so as to output the RF signals of the plurality of bands to a non-failing power amplifier that is a power amplifier not in failure in the power amplifiers, the non-failing power amplifier amplifies the RF signals and then transmits the amplified RF signals, and the signal generator receives a reception state notification from a reception apparatus that receives the RF signals transmitted from the transmission device, and, based on the notification, selects a best band that is a band in a best communication state to switch the frequencies of the local oscillator signals to be output from the variable local oscillator signal generators such that the frequencies of the RF signals to be output to the non-failing power amplifier become frequencies belonging to the best band.

[Supplementary Note 9] The transmission device according to the Supplementary Note 1, wherein the signal generator includes the same numbers of digital baseband signal generation units, digital/analog converters, mixers, local oscillator signal generators, and switches as the number of the channels and the same number of synthesizers as the number of the bands, each of the digital baseband signal generation units outputs a digital baseband signal of each channel, each of the digital/analog converters converts the digital baseband signal of each channel into each analog baseband signal, the mixers and the local oscillator signal generators up-convert the each analog baseband signal into each of the RF signals, the switches select each synthesizer that is an output destination of each of the RF signals from the synthesizers, and the synthesizers synthesize the RF signals to be input to each of the power amplifiers and then output to the power amplifiers.

[Supplementary Note 10] The transmission device according to the Supplementary Note 1, wherein the signal generator includes the same numbers of digital intermediate frequency signal generation units, digital/analog converters, mixers, and switches as the number of the channels, and the same numbers of variable local oscillator signal generation units and synthesizers as the number of the bands, each of the digital intermediate frequency signal generation units outputs a digital intermediate frequency signal generated by up-converting the digital baseband signal of each channel into an intermediate frequency, each of the digital/analog converters converts the digital intermediate frequency signal of each channel to each analog intermediate frequency signal, the mixers and the variable local oscillator signal generators up-convert the each analog intermediate frequency signal into each of the RF signals belonging to each of the bands, the switches select each synthesizer that is an output destination of each of the RF signals from the synthesizers to output the RF signals, and the synthesizers synthesize the RF signals to be input to each of the power amplifiers and then output to the power amplifiers.

[Supplementary Note 11] The transmission device according to the Supplementary Note 9 or 10, wherein the signal generator includes a failure detector for detecting the presence or absence of failure of the power amplifiers, when the failure detector detects failure of one of the power amplifiers, the switches select the synthesizer that is not connected to the failed power amplifier so as not to output the RF signals to the failed power amplifier, and the switches output the RF signals to the selected synthesizer.

[Supplementary Note 12] The transmission device according to the Supplementary Note 11, wherein when the failure detector detects failure of one of the power amplifiers, the switches select the synthesizer connected to a non-failing power amplifier that is a power amplifier not in failure in the power amplifiers so as to output the RF signals of the plurality of bands to the non-failing power amplifier, and output the RF signals to the synthesizer, the non-failing power amplifier amplifies and then transmits the RF signals, the signal generator receives a reception state notification from a reception apparatus that receives the RF signals transmitted from the transmission device, and, based on the notification, selects a best band that is a band in a best communication state, and the switches switch so as to supply the RF signals belonging to the best band to the synthesizer connected to the non-failing power amplifier.

[Supplementary Note 13] The transmission device according to the Supplementary Note 1, including:

a baseband unit that includes the signal generator to output a plurality of baseband signals; and a plurality of remote radio units that include the power amplifiers and convert the baseband signals into the RF signals to transmit the RF signals, wherein the baseband unit outputs the baseband signals of a plurality of channels to at least one of the remote radio units, and at least one of the remote radio units causes one of the power amplifiers to simultaneously amplify the plurality of RF signals allocated in the at least two different bands and then transmit the amplified RF signals.

[Supplementary Note 14] The transmission device according to the Supplementary Note 13, wherein the remote radio units include a failure detector for detecting the presence or absence of failure of the remote radio units, the baseband unit includes a controller for controlling the baseband unit and the remote radio units on the basis of failure information from the failure detector, and the controller stops operation of one of the remote radio units that is in failure and also stops the output of the baseband signals to the failed remote radio unit from the baseband unit.

[Supplementary Note 15] The transmission device according to the Supplementary Note 13 or 14, wherein the baseband unit includes the same number of digital baseband signal generation units as the number of the channels and the same number of multiplexers as the number of the remote radio units, each of the remote radio units includes a single demultiplexer, a single synthesizer, a single power amplifier, the same numbers of digital/analog converters, mixers and variable local oscillator signal generators as the number of the bands, each of the digital baseband signal generation units in the baseband unit outputs a digital baseband signal of each channel, each of the multiplexers in the baseband unit aggregates the plurality of digital baseband signals to be output to each of the remote radio units into a single signal to output the single signal, the demultiplexer in the each of the remote radio units separates the single signal aggregated by the each of the multiplexers into the original plurality of digital baseband signals, each of the digital/analog converters in the each of the remote radio units converts the digital baseband signals of each channel separated by the demultiplexer into analog baseband signals, the mixers and the variable local oscillator signal generators up-convert the analog baseband signals into the RF signals, and the synthesizers synthesize the RF signals to be input to the power amplifiers and then output to the power amplifiers.

[Supplementary Note 16] The transmission device according to any one of the Supplementary Notes 13 to 15, wherein the baseband unit includes electrical-to-optical converters, each of the remote radio units includes an optical-to-electrical converter, the baseband unit and the remote radio are connected by optical fibers, and signal transmissions between the baseband unit and the remote radio units are performed by optical communication.

[Supplementary Note 17] The transmission device according to any one of the Supplementary Notes 13 to 15, wherein the signal transmissions between the baseband unit and the remote radio units are performed by radio communication.

[Supplementary Note 18] A radio signal transmission method including:

by a signal generator, converting baseband signals of a plurality of channels into a plurality of RF signals allocated in a plurality of discrete bands and outputting the RF signals;

by at least one power amplifier, simultaneously amplifying a plurality of RF signals allocated in at least two different bands among the bands; and performing transmission by simultaneously using the plurality of RF signals belonging to the plurality of discrete bands.

[Supplementary Note 19] The radio signal transmission method according to the Supplementary Note 18, including:

detecting the presence or absence of failure of the at least one power amplifier; and when detecting failure of the at least one power amplifier, controlling the signal generator so as to stop input to the RF signals to the at least one power amplifier.

[Supplementary Note 20] The radio signal transmission method according to the Supplementary Note 18, including:

detecting the presence or absence of failure of the at least one power amplifier;

when detecting failure of one of the power amplifiers, controlling the signal generator so as to input the RF signals of the plurality of bands to a non-failing power amplifier that is a power amplifier not in failure in the at least one power amplifier;

by the non-failing power amplifier, amplifying and then transmitting the RF signals, receiving a reception state notification from a reception apparatus that receives the RF signals transmitted from the transmission device;

selecting, based on the notification, a best band that is a band in a best communication state; and switching frequencies of the RF signals to be input to the non-failing power amplifier to frequencies belonging to the best band.

This application claims the benefit of priority based on Japanese Patent Application No. 2012-268801 filed on Dec. 7, 2012, the disclosure of which is incorporated herein by reference in its entirety.

INDUSTRIAL APPLICABILITY

The transmission device and the radio signal transmission method according to each exemplary embodiment of the present invention are applicable to any radio communication technique, and specific examples of the any radio communication technique include terrestrial digital broadcasting and mobile phone.

REFERENCE SIGNS LIST

1001, 1002, 1003, 1004, 1005, 1006, 1007, 1008, 1009, 1010, 1201, 1202, 1203, 1204 RF signal 1011, 1012, 1013, 1014, 1211, 1212 Band
1101, 1111, 1521 Transmission device
1102, 1112 Signal generator
1103, 1104 Broadband/multiband power amplifier
1105, 1106, 1115, 1116, 1504, 1505, 1512, 1513 Terminal
1113, 1114 Narrowband power amplifier
1301, 1302, 1303, 1304 Mixer
1311, 1312, 1313, 1314 Variable LO signal generator
1321, 1322, 1323, 1324 Digital/analog converter
1331, 1332, 1333, 1334 Digital baseband signal generation unit
1341, 1342 Synthesizer
1351, 1352 Failure detector
1361 Each channel RF signal generator
1371, 1372, 1373, 1374 Switch
1381, 1382, 1383, 1384 Digital IF signal generation unit
1401, 1402, 1403, 1404 Digital baseband signal
1411, 1412, 1413, 1414 Digital IF signal
1501 Baseband unit
1502, 1503 Remote radio unit
1506, 1507 Optical fiber
1511 Controller
1601, 1602 Multiplexer
1611, 1612 Electrical-to-optical converter
1701, 1702 Demultiplexer
1711, 1712 Optical-to-electrical converter
1801 Reception apparatus

The invention claimed is:

1. A transmission device comprising:
a signal generator configured to convert baseband signals of a plurality of channels into a plurality of RF signals allocated in a plurality of discrete bands to output the Radio Frequency RF signals; and
a plurality of power amplifiers, at least one of the plurality of power amplifiers configured to simultaneously amplify the plurality of RF signals allocated in at least two different bands among the bands,
wherein the signal generator includes a failure detector configured to detect the presence or absence of failure of the power amplifiers,
when the failure detector detects failure of one of the power amplifiers, the failure detector is further configured to control the signal generator so as to stop the output of the RF signals to the power amplifier, and
wherein when the failure detector detects failure of one of the power amplifiers, the failure detector is further configured to control the signal generator so as to output the RF signals of the plurality of bands to a non-failing power amplifier that is a power amplifier not in failure in the power amplifiers,
the non-failing power amplifier configured to amplify the RF signals and then transmits the amplified RF signals, and
the signal generator further configured to receive a reception state notification from a reception apparatus that receives the RF signals transmitted from the transmission device, and, based on the notification, select a best band that is a band in a best communication state to switch frequencies of the RF signals to be output to the non-failing power amplifier to frequencies belonging to the best band.

2. A transmission device comprising:
a signal generator configured to convert baseband signals of a plurality of channels into a plurality of RF signals allocated in a plurality of discrete bands to output the Radio Frequency RF signals; and
a plurality of power amplifiers, at least one of the plurality of power amplifiers configured to simultaneously amplify the plurality of RF signals allocated in at least two different bands among the bands,
wherein the signal generator includes a failure detector configured to detect the presence or absence of failure of the power amplifiers, and
when the failure detector detects failure of one of the power amplifiers, the failure detector is further configured to control the signal generator so as to stop the output of the RF signals to the power amplifier, and
wherein the signal generator includes the same numbers of digital baseband signal generation units, digital/analog converters, mixers, and variable local oscillator signal generators as the number of the channels, and the same number of synthesizers as the number of the bands,
each of the digital baseband signal generation units is configured to output a digital baseband signal of each channel,
each of the digital/analog converters is configured to convert the digital baseband signal of each channel into each analog baseband signal,
the mixers and the variable local oscillator signal generators are configured to up-convert the each analog baseband signal into each of the RF signals, and
the synthesizer is configured to synthesize the RF signals to be input to each of the power amplifiers and then outputs to the power amplifiers.

3. The transmission device according to claim 2,
wherein the signal generator includes a failure detector that is configured to detect the presence or absence of failure of the power amplifiers, and
when the failure detector detects failure of one of the power amplifiers, the failure detector is further configured to stop operations of the digital baseband signal generation units, the digital/analog signal converters, the mixers, and the variable local oscillator signal generators that are involved in the generation of the RF signals to be output to the one of the power amplifiers, so as to stop the output of the RF signals to the one of the power amplifiers.

4. The transmission device according to claim 3,
wherein when the failure detector detects failure of one of the power amplifiers, the failure detector is configured to set frequencies of local oscillator signals to be output from the variable local oscillator signal generators so as to output the RF signals of the plurality of bands to a non-failing power amplifier that is a power amplifier not in failure in the power amplifiers,
the non-failing power amplifier configured to amplify the RF signals and then transmit the amplified RF signals, and
the signal generator is configured to receive a reception state notification from a reception apparatus that receives the RF signals transmitted from the transmission device, and, based on the notification, select a best band that is a band in a best communication state to switch the frequencies of the local oscillator signals to be output from the variable local oscillator signal generators such that the frequencies of the RF signals to be output to the non-failing power amplifier become frequencies belonging to the best band.

5. The transmission device according to claim 2,
wherein the signal generator includes the same numbers of digital baseband signal generation units, digital/analog converters, mixers, local oscillator signal generators, and switches as the number of the channels and the same number of synthesizers as the number of the bands, each of the digital baseband signal generation units is configured to output a digital baseband signal of each channel, each of the digital/analog converters is configured to convert the digital baseband signal of each channel into each analog baseband signal, the mixers and the local oscillator signal generators are configured to up-convert the each analog baseband signal into each of the RF signals, the switches are configured to select each synthesizer that is an output destination of each of the RF signals from the synthesizers, and the synthesizers are configured to synthesize the RF signals to be input to each of the power amplifiers and then output to the power amplifiers.

6. The transmission device according to claim 5, wherein the signal generator includes a failure detector that detects the presence or absence of failure of the power amplifiers, when the failure detector detects failure of one of the power amplifiers, the switches are configured to select the synthesizer that is not connected to the failed power amplifier so as not to output the RF signals to the failed power amplifier, and the switches are configured to output the RF signals to the selected synthesizer.

7. The transmission device according to claim 6, wherein when the failure detector detects failure of one of the power amplifiers, the switches are configured to select the synthesizer connected to a non-failing power amplifier that is a power amplifier not in failure in the power amplifiers so as to output the RF signals of the plurality of bands to the non-failing power amplifier, and output the RF signals to the synthesizer, the non-failing power amplifier is configured to amplify and then transmit the RF signals, the signal generator is configured to receive a reception state notification from a reception apparatus that receives the RF signals transmitted from the transmission device, and, based on the notification, select a best band that is a band in a best communication state, and the switches are configured to switch so as to supply the RF signals belonging to the best band to the synthesizer connected to the non-failing power amplifier.

8. The transmission device according to claim 2, further comprising:

a transmitter configured to transmit the amplified plurality of the RF signals.

9. A transmission device comprising:

a signal generator configured to convert baseband signals of a plurality of channels into a plurality of RF signals allocated in a plurality of discrete bands to output the Radio Frequency RF signals;

a plurality of power amplifiers, at least one of the plurality of power amplifiers configured to simultaneously amplify the plurality of RF signals allocated in at least two different bands among the bands, wherein the signal generator includes a failure detector configured to detect the presence or absence of failure of the power amplifiers, and when the failure detector detects failure of one of the power amplifiers, the failure detector is further configured to control the signal generator so as to stop the output of the RF signals to the power amplifier, and wherein the signal generator includes the same numbers of digital intermediate frequency signal generation units, digital/analog converters, and mixers as the number of the channels and the same numbers of variable local oscillator signal generators and synthesizers as the number of the bands, each of the digital intermediate frequency signal generation units is configured to output a digital intermediate frequency signal generated by up-converting the digital baseband signal of each channel into each intermediate frequency, each of the digital/analog converters is configured to convert the digital intermediate frequency signal of each channel into each analog intermediate frequency signal, the mixers and the variable local oscillator signal generators are configured to up-convert the each analog intermediate frequency signal into each of the RF signals belonging to each of the bands, and the synthesizers are configured to synthesize the RF signals to be input to each of the power amplifiers and then output to the power amplifiers.

10. The transmission device according to claim 9, wherein the signal generator includes a failure detector that detects the presence or absence of failure of the power amplifiers, and when the failure detector detects failure of one of the power amplifiers, the failure detector is further configured to stop operations of the digital intermediate frequency signal generation units, the digital/analog converters, the mixers, and the variable local oscillator signal generators that are involved in the generation of the RF signals to be output to the power amplifier, so as to stop the output of the RF signals to the power amplifier.

11. The transmission device according to claim 9, wherein the signal generator includes the same numbers of digital intermediate frequency signal generation units, digital/analog converters, mixers, and switches as the number of the channels, and the same numbers of variable local oscillator signal generation units and synthesizers as the number of the bands, each of the digital intermediate frequency signal generation units is configured to output a digital intermediate frequency signal generated by up-converting the digital baseband signal of each channel into an intermediate frequency, each of the digital/analog converters is configured to convert the digital intermediate frequency signal of each channel to each analog intermediate frequency signal, the mixers and the variable local oscillator signal generators are configured to up-convert the each analog intermediate frequency signal into each of the RF signals belonging to each of the bands, the switches are configured to select each synthesizer that is an output destination of each of the RF signals from the synthesizers to output the RF signals, and the synthesizers are configured to synthesize the RF signals to be input to each of the power amplifiers and then output to the power amplifiers.

12. A transmission device comprising:

a signal generator configured to convert baseband signals of a plurality of channels into a plurality of RF signals allocated in a plurality of discrete bands to output the Radio Frequency RF signals;

a plurality of power amplifiers, at least one of the plurality of power amplifiers configured to simultaneously amplify the plurality of RF signals allocated in at least two different bands among the bands, wherein the signal generator includes a failure detector configured to detect the presence or absence of failure of the power amplifiers, and when the failure detector detects failure of one of the power amplifiers, the failure detector is further configured to control the signal generator so as to stop the output of the RF signals to the power amplifier;

a baseband unit that includes the signal generator to output a plurality of baseband signals; and a plurality of remote radio units that include the power amplifiers, the plurality of remote radio units configured to convert the baseband signals into the RF signals to transmit the RF signals, wherein the baseband unit is configured to output the baseband signals of a plurality of channels to at least one of the remote radio units, and at least one of the remote radio units causes one of the power amplifiers to simultaneously amplify the plurality of RF signals allocated in the at least two different bands and then transmit the amplified RF signals.

13. The transmission device according to claim 12, wherein the remote radio units include a failure detector that detects the presence or absence of failure of the remote radio units, the baseband unit includes a controller that is configured to control the baseband unit and the remote radio units on the basis of failure information from the failure detector, and the controller is configured to stop operation of one of the remote radio units that is in failure and also stops the output of the baseband signals to the failed remote radio unit from the baseband unit.

14. The transmission device according to claim 12, wherein the baseband unit includes the same number of digital baseband signal generation units as the number of the channels and the same number of multiplexers as the number of the remote radio units, each of the remote radio units includes a single demultiplexer, a single synthesizer, a single power amplifier, the same numbers of digital/analog converters, mixers and variable local oscillator signal generators as the number of the bands, each of the digital baseband signal generation units in the baseband unit is configured to output a digital baseband signal of each channel, each of the multiplexers in the baseband unit is configured to aggregate the plurality of digital baseband signals to be output to each of the remote radio units into a single signal to output the single signal, the demultiplexer in the each of the remote radio units is configured to separate the single signal aggregated by the each of the multiplexers into the original plurality of digital baseband signals, each of the digital/analog converters in the each of the remote radio units is configured to convert the digital baseband signals of each channel separated by the demultiplexer into analog baseband signals, the mixers and the variable local oscillator signal generators are configured to up-convert the analog baseband signals into the RF signals, and the synthesizers are configured to synthesize the RF signals to be input to the power amplifiers and then output to the power amplifiers.

15. The transmission device according to claim 12, wherein the baseband unit includes electrical-to-optical converters, each of the remote radio units includes an optical-to-electrical converter, the baseband unit and the remote radio are connected by optical fibers, and signal transmissions between the baseband unit and the remote radio units are performed by optical communication.

16. The transmission device according to claim 12, wherein the signal transmissions between the baseband unit and the remote radio units are performed by radio communication.

17. A radio signal transmission method comprising:

converting baseband signals of a plurality of channels into a plurality of Radio Frequency RF signals allocated in a plurality of discrete bands and outputting the RF signals;

simultaneously amplifying, by at least one power amplifier, a plurality of RF signals allocated in at least two different bands among the bands; and detecting the presence or absence of failure of the at least one power amplifier;

when detecting failure of one of the power amplifiers, controlling the signal generator so as to input the RF signals of the plurality of bands to a non-failing power amplifier that is a power amplifier not in failure in the at least one power amplifier;

by the non-failing power amplifier, amplifying and then transmitting the RF signals;

receiving a reception state notification from a reception apparatus that receives the RF signals transmitted from the transmission device;

selecting, based on the notification, a best band that is a band in a best communication state; and switching frequencies of the RF signals to be input to the non-failing power amplifier to frequencies belonging to the best band.

* * * * *